US009523795B2

(12) United States Patent
Wakizaka et al.

(10) Patent No.: US 9,523,795 B2
(45) Date of Patent: Dec. 20, 2016

(54) ANTISTATIC ANTIREFLECTION FILM, METHOD FOR MANUFACTURING ANTISTATIC ANTIREFLECTION FILM, POLARIZING PLATE AND IMAGE DISPLAY DEVICE

(71) Applicant: FUJIFILM CORPORATION, Tokyo (JP)

(72) Inventors: Daiki Wakizaka, Kanagawa (JP); Kenichi Fukuda, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 566 days.

(21) Appl. No.: 13/682,164

(22) Filed: Nov. 20, 2012

(65) Prior Publication Data

US 2013/0135726 A1 May 30, 2013

(30) Foreign Application Priority Data

Nov. 25, 2011 (JP) ................................ 2011-258321

(51) Int. Cl.

| | |
|---|---|
| ***G02B 1/10*** | (2015.01) |
| ***G02B 1/11*** | (2015.01) |
| ***C08K 3/36*** | (2006.01) |
| ***C08K 7/26*** | (2006.01) |
| ***C08K 7/18*** | (2006.01) |
| ***C08K 5/17*** | (2006.01) |
| ***C09D 5/24*** | (2006.01) |
| ***C09D 127/12*** | (2006.01) |
| ***C09D 133/14*** | (2006.01) |
| ***C09D 133/16*** | (2006.01) |
| ***C09D 183/04*** | (2006.01) |
| ***C09D 183/06*** | (2006.01) |
| ***C08L 27/12*** | (2006.01) |
| ***C08L 33/14*** | (2006.01) |
| ***C08L 33/16*** | (2006.01) |
| ***C08L 83/04*** | (2006.01) |
| ***C08L 83/06*** | (2006.01) |
| ***G02B 5/30*** | (2006.01) |
| ***C08G 77/14*** | (2006.01) |
| ***G02B 1/18*** | (2015.01) |
| ***C08G 77/24*** | (2006.01) |
| ***G02B 1/14*** | (2015.01) |
| ***G02B 1/16*** | (2015.01) |
| ***C08G 77/04*** | (2006.01) |

(Continued)

(52) U.S. Cl.

CPC ................ *G02B 1/11* (2013.01); *C08G 77/04* (2013.01); *C08G 77/14* (2013.01); *C08G 77/24* (2013.01); *C08K 3/36* (2013.01); *C08K 5/175* (2013.01); *C08K 7/18* (2013.01); *C08K 7/26* (2013.01); *C08L 27/12* (2013.01); *C08L 33/14* (2013.01); *C08L 33/16* (2013.01); *C08L 83/04* (2013.01); *C08L 83/06* (2013.01); *C09D 5/24* (2013.01); *C09D 127/12* (2013.01); *C09D 133/14* (2013.01); *C09D 133/16* (2013.01); *C09D 183/04* (2013.01); *C09D 183/06* (2013.01); *G02B 1/04* (2013.01); *G02B 1/10* (2013.01); *G02B 1/105* (2013.01); *G02B 1/111* (2013.01); *G02B 1/14* (2015.01); *G02B 1/16* (2015.01); *G02B 1/18* (2015.01); *G02B 5/30* (2013.01); *C08G 65/007* (2013.01); *C09D 5/006* (2013.01); *G02B 27/0006* (2013.01); *G02B 2207/121* (2013.01); *Y10T 428/249974* (2015.04); *Y10T 428/259* (2015.01); *Y10T 428/3154* (2015.04); *Y10T 428/31935* (2015.04)

(58) Field of Classification Search

None

See application file for complete search history.

(56) References Cited

U.S. PATENT DOCUMENTS 5,717,048 A * 2/1998 Tsubaki ................. B32B 27/08 526/287
7,691,459 B2 * 4/2010 Nishimura et al. .......... 428/1.32

(Continued)

FOREIGN PATENT DOCUMENTS

JP 2005-283849 * 10/2005
JP 2006-103071 * 4/2006

(Continued)

OTHER PUBLICATIONS

JP 2007-301970 A (Yoneyama et al) (partial translation) (published Nov. 11, 2007).*

(Continued)

*Primary Examiner* — Vivian Chen
(74) *Attorney, Agent, or Firm* — Jean C. Edwards, Esq.; Edwards Neils LLC

(57) ABSTRACT

An antistatic antireflection film, including; a support; a hardcoat layer formed from a composition for a hardcoat layer containing at least a compound having a quaternary ammonium salt group; and a low refractive index layer formed from a composition for a low refractive index layer containing at least the following (a), (b), (c) and (d), in this order, wherein, (a) is an ethylenically unsaturated group-containing fluoropolymer, (b) is a fluorine-containing polyfunctional monomer having a surface free energy of 23 mN/m or more when a film is formed alone, four or less —$CF_3$ groups in a molecule, a fluorine content of 30% or more, and at least three reactive functional groups in one molecule, (c) is hollow silica fine particles having an average particle size of 10 nm to 100 nm, and (d) is a compound having a dimethylsiloxane structure.

17 Claims, No Drawings

(51) Int. Cl.

| | |
|---|---|
| ***G02B 1/111*** | (2015.01) |
| ***G02B 1/04*** | (2006.01) |
| *C08G 65/00* | (2006.01) |
| *C09D 5/00* | (2006.01) |
| *G02B 27/00* | (2006.01) |

(56) References Cited

U.S. PATENT DOCUMENTS

| | | | | |
|---|---|---|---|---|
| 7,846,511 | B2 * | 12/2010 | Fukushige | C08F 214/18 427/496 |
| 8,697,246 | B2 * | 4/2014 | Asahi | C09D 5/24 427/164 |
| 2007/0146887 | A1 * | 6/2007 | Ikeda | G02B 1/111 359/586 |
| 2007/0158675 | A1 * | 7/2007 | Komoto | C08G 67/02 257/99 |
| 2008/0069975 | A1 * | 3/2008 | Kato | C08G 73/02 428/1.31 |
| 2008/0239486 | A1 * | 10/2008 | Kato | G02B 1/111 359/485.01 |
| 2009/0246415 | A1 * | 10/2009 | Horie | G02B 1/11 428/1.3 |
| 2010/0067109 | A1 | 3/2010 | Horio et al. | |
| 2010/0079869 | A1 | 4/2010 | Inoue et al. | |
| 2010/0246014 | A1 * | 9/2010 | Asahi et al. | 359/585 |
| 2011/0026121 | A1 * | 2/2011 | Suzuki et al. | 359/585 |
| 2011/0183110 | A1 * | 7/2011 | Yamazaki et al. | 428/141 |
| 2011/0242654 | A1 * | 10/2011 | Asahi et al. | 359/488.01 |
| 2011/0268935 | A1 * | 11/2011 | Suzuki et al. | 428/201 |
| 2012/0003467 | A1 * | 1/2012 | Suzuki et al. | 428/336 |
| 2012/0077046 | A1 * | 3/2012 | Asahi et al. | 428/507 |

FOREIGN PATENT DOCUMENTS

| | | | | |
|---|---|---|---|---|
| JP | 2007-301970 | | * | 11/2007 |
| JP | 2008-169364 | | * | 7/2008 |
| JP | 2008-169364 | A | | 7/2008 |
| JP | 2010-083813 | | | 4/2010 |
| JP | 2010-085759 | | | 4/2010 |
| JP | 2010-085983 | | * | 4/2010 |
| JP | 2010-085983 | A | | 4/2010 |
| JP | 4600605 | B1 | | 10/2010 |
| JP | 2010-256880 | | | 11/2010 |
| JP | 2011-225756 | | * | 11/2011 |
| JP | 2011-225796 | | * | 11/2011 |
| JP | 2011-225846 | | | 11/2011 |
| WO | WO 2006/109496 | | * | 10/2006 |

OTHER PUBLICATIONS

JNC America—Silaplane (Reactive Silicone) (http://www.jncamericany.com/silaplane/index.html) (2012).*

Notification of Reasons for Refusal issued by the Japanese Patent Office on Jun. 2, 2015 in connection with Japanese Patent Application No. 2012-255494.

Notification of Reasons for Refusal issued by the Japanese Patent Office on Dec. 15, 2015 in connection with Japanese Patent Application No. 2012-255494.

Notification of Reasons for Refusal issued by the Japanese Patent Office on Aug. 2, 2016 in connection with corresponding Japanese Patent Application No. 2012-255494.

* cited by examiner

ANTISTATIC ANTIREFLECTION FILM, METHOD FOR MANUFACTURING ANTISTATIC ANTIREFLECTION FILM, POLARIZING PLATE AND IMAGE DISPLAY DEVICE

CROSS-REFERENCE TO RELATED APPLICATION(S)

The present application claims priority from Japanese Patent Application No. 2011-258321 filed on Nov. 25, 2011, the entire content of which is incorporated herein by reference.

BACKGROUND

1. Field

The present invention relates to an antistatic antireflection film, a method for manufacturing the antistatic antireflection film, a polarizing plate and an image display device.

2. Description of the Related Art

In image display devices such as a cathode ray tube (CRT) display device, a plasma display panel (PDP), an electroluminescent display (ELD), a vacuum fluorescent display (VFD), a field emission display (FED) and a liquid crystal display device (LCD), an antireflection film is generally disposed on the outermost surface of a display in order to prevent lowering of contrast caused by the reflection of external light or glare of an image.

In addition, the antireflection film is used for the outermost surface of the display, and thus it is required to have a high scratch resistance or abrasion resistance. Further, it is required to have excellent antifouling properties (resistance to attachment of stains or wipeability of stains when adhered) against various stains such as primarily fingerprints in exhibition or daily use.

As the basic configuration of an antireflection film, it is known that on a transparent support, the antireflection film has a low refractive index layer having a refractive index lower than that of the support and a predetermined thickness, and in order to obtain the above-mentioned characteristics, various antireflection films have been proposed as the composition and configuration of the low refractive index layer or other layers.

For example, Japanese Patent Application Laid-Open No. 2008-169364 describes a curable resin composition including an ethylenically unsaturated group-containing fluorocopolymer and a (meth)acryloyl compound having a fluorine atom as a substituent and further including particles having a hollow or solid silica as a main component, a compound having a polydimethylsiloxane structure and a fluorine-based surfactant. A cured material obtained from the curable resin composition has a low refractive index and an excellent scratch resistance and antifouling properties, and an antireflection coating having a low refractive index layer formed of the cured material is described in Japanese Patent Application Laid-Open No. 2008-169364.

Further, Japanese Patent Application Laid-Open No. 2010-085983 describes a composition for a low refractive index layer including hollow silica fine particles and an organic binder containing a polyfunctional monomer which has three or more reactive functional groups in a molecule thereof and contains no fluorine atom, a fluorine atom-containing monomer and a fluorine atom-containing polymer, and further including an antifouling agent containing a fluorine atom and a silicon atom. As an optical film having a low refractive index layer formed by the composition for a low refractive index layer on the outermost layer thereof, an optical film having at least one of a low reflectance and an excellent scratch resistance and a magic wiping durability is described in Japanese Patent Application Laid-Open No. 2010-085983.

Meanwhile, in an optical film such as an antireflection film, it is also known to install a hardcoat layer having antistatic properties and hard coat properties in order to prevent scratches on the surface or the attachment of dust and the like.

For example, in order to obtain a film having antistatic properties and hard coat properties, it is known to form a hardcoat layer by using a compound having a quaternary ammonium salt group as an antistatic agent and a composition containing a polyfunctional monomer to be a binder (for example, Japanese Patent No. 4600605).

In order to obtain an antireflection film having excellent antireflection properties, antistatic properties and hard coat properties and more advanced scratch resistance, abrasion resistance and antifouling properties, it is possible to contemplate an antireflection film in which a low refractive index layer is provided on an antistatic hardcoat layer.

The present inventors have studied and thus could find out that when a composition having a quaternary ammonium salt group is used to form a hardcoat layer, antistatic properties are excellent, but when a low refractive index layer is formed on the hardcoat layer by a composition including a fluorine-containing compound as described in Japanese Patent Application Laid-Open No. 2008-169364 and Japanese Patent Application Laid-Open No. 2010-085983, scratch resistance deteriorates and furthermore a surface defect occurs in which the low refractive index layer becomes white turbidity.

In consideration of these circumstances, an object of the present invention is to provide an antistatic antireflection film having excellent antireflection properties and antistatic properties, no surface defect, and excellent scratch resistance, abrasion resistance and antifouling properties.

Further, another object of the present invention is to provide a manufacturing method of the antistatic antireflection film, a polarizing plate using the antistatic antireflection film and an image display device having the antistatic antireflection film or the polarizing plate.

From the viewpoint of obtaining a low refractive index layer having a low refractive index and an excellent scratch resistance, abrasion resistance and antifouling properties, it is appropriate to use a fluorine compound such as specific fluoropolymer and fluorine-containing polyfunctional monomer or silica fine particles and a specific siloxane compound in a composition for a low refractive index layer. In order to solve the problems, the present inventors have studied, and thus, found out that when a low refractive index layer is formed on a hardcoat layer including a compound having a quaternary ammonium salt group, adhesion with the hardcoat layer deteriorates if a monomer having a plurality of $-CF_3$ groups as a fluorine-containing polyfunctional monomer and a low surface free energy is contained in the molecule of a fluorine-containing compound of a composition for a low refractive index layer, thereby degrading scratch resistance and generating white turbidity on the coating film of the low refractive index layer. Although the reason is not fully understood by the mechanism, it is speculated that if a fluoromonomer to be added to the low refractive index layer in order to improve the scratch resistance for a hardcoat layer containing a compound having a quaternary ammonium salt group which is very hydrophilic in structure is very hydrophobic, the affinity would deteriorate. The present inventors have studied, and as a result, found out that the deterioration in scratch resistance and white turbidity may be suppressed by using a monomer having four or less —$CF_3$ groups, a high surface free energy and many reactive functional groups as a fluorine-containing monomer.

That is, the problem of the present invention may be solved by the following means.

SUMMARY (1) An antistatic antireflection film, including; a support; a hardcoat layer formed from a composition for a hardcoat layer containing at least a compound having a quaternary ammonium salt group; and a low refractive index layer formed from a composition for a low refractive index layer containing at least the following (a), (b), (c) and (d), in this order, wherein, (a) is an ethylenically unsaturated group-containing fluoropolymer, (b) is a fluorine-containing polyfunctional monomer having a surface free energy of 23 mN/m or more when a film is formed alone, four or less —$CF_3$ groups in a molecule, a fluorine content of 30% or more, and at least three reactive functional groups in one molecule, (c) is hollow silica fine particles having an average particle size of 10 nm to 100 nm, and (d) is a compound having a dimethylsiloxane structure.

(2) The antistatic antireflection film according to (1), wherein the composition for a low refractive index layer further comprises (e) solid silica particles having an average particle size of 40 nm to 100 nm in an amount of 0.1% by mass to 10% by mass, based on a total solid of the composition for a low refractive index layer.

(3) The antistatic antireflection film according to (1), wherein the fluorine-containing polyfunctional monomer (b) is a compound represented by the following Formula (1):

Formula (1)

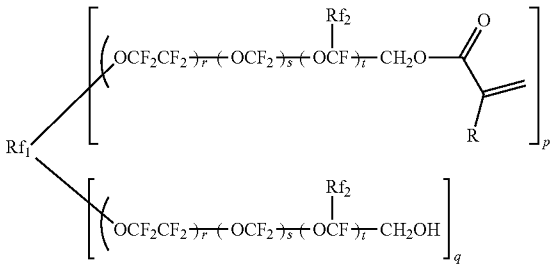

wherein, $Rf_1$ represents a (p+q) valent perfluoro saturated hydrocarbon group which may have an ether linkage, $Rf_2$ represents a monovalent chained or cyclic fluorinated hydrocarbon group which contains at least a carbon atom and a fluorine atom and may contain an oxygen atom or a hydrogen atom, p represents an integer of 3 to 10, q represents an integer of 0 to 7, and (p+q) represents an integer of 3 to 10, r represents an integer of 0 to 100, and each of s and t independently represents 0 or 1, R represents a hydrogen atom, a methyl group or a fluorine atom, and when (p+q) is 5 or more, t is 0. In the Formula (1), an order of ($OCF_2CF_2$), ($OCF_2$) and ($OCFRf_2$) is not particularly limited.

(4) The antistatic antireflection film according to (3), wherein in the Formula (1), r represents 1 to 5, s represents 0 or 1, t represents 0 or 1, p represents 3 to 6, and q represents 0.

(5) The antistatic antireflection film according to (1), wherein the composition for a low refractive index layer further contains (f) a fluorine-free polyfunctional monomer having at least three or more reactive functional groups in one molecule.

(6) The antistatic antireflection film according to (1), wherein the compound (d) having a dimethylsiloxane structure is at least two of a silicone compound (d-1) having a number average molecular weight of 4,000 or more and a silicone compound (d-2) having a number average molecular weight of 1,000 or more and less than 4,000.

(7) The antistatic antireflection film according to (1), wherein the composition for a hardcoat layer contains a fluoroaliphatic group-containing copolymer having a repeating unit derived from a monomer containing a fluoroaliphatic group represented by the following Formula (F1) and a repeating unit derived from a monomer which does not contain a fluoroaliphatic group represented by the following Formula (F2):

Formula (F1)

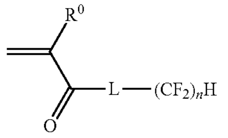

wherein, $R^0$ represents a hydrogen atom, a halogen atom or a methyl group, L represents a divalent linking group, and n represents an integer of 1 to 18:

Formula (F2)

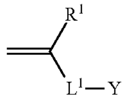

wherein, $R^1$ represents a hydrogen atom, a halogen atom or a methyl group, $L_1$ represents a divalent linking group, Y represents a straight-chained, branched or cyclic alkyl group having of 1 to 20 carbon atoms, which may be substituted, or an aromatic group which may be substituted.

(8) A polarizing plate having the antistatic antireflection film according to (1) as a protective film for a polarizing plate.

(9) An image display device having the antistatic antireflection film according to (1).

(10) An image display device having the polarizing plate according to (8).

(11) A method for manufacturing an antistatic antireflection film having, a support, a hardcoat layer containing a compound having a quaternary ammonium salt group, and a low refractive index layer formed from a composition for a low refractive index layer containing at least the following (a), (b), (c) and (d), in this order, the method comprising: coating and curing a composition (a) is an ethylenically unsaturated group-containing fluoropolymer, (b) is a fluorine-containing polyfunctional monomer having a surface free energy of 23 mN/m or more when a film is formed alone, four or less —$CF_3$ groups in a molecule, a fluorine content of 30% or more, and at least three reactive functional groups in one molecule, (c) is hollow silica fine particles having an average particle size of 10 nm to 100 nm, and (d) is a compound having a dimethylsiloxane structure.

(12) The method for manufacturing an antistatic antireflection film according to (11), wherein the composition for a low refractive index layer further contains (e) solid silica particles having an average particle size of 40 nm to 100 nm in an amount of 0.1% by mass to 10% by mass, based on a total solid of the composition for a low refractive index layer.

(13) The method for manufacturing an antistatic antireflection film according to (11), wherein the fluorine-containing polyfunctional monomer (b) is a compound represented by the following Formula (1):

Formula (1)

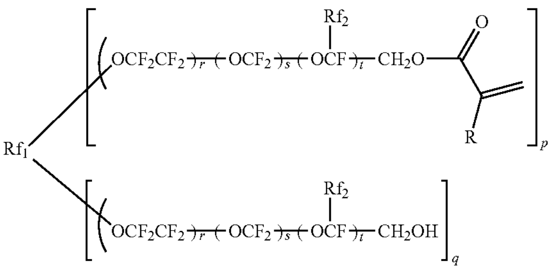

wherein, $Rf_1$ represents a (p+q) valent perfluoro saturated hydrocarbon group which may have an ether linkage, $Rf_2$ represents a monovalent chained or cyclic fluorinated hydrocarbon group which contains at least a carbon atom and a fluorine atom and may contain an oxygen atom or a hydrogen atom, p represents an integer of 3 to 10, q represents an integer of 0 to 7, and (p+q) represents an integer of 3 to 10, r represents an integer of 0 to 100, and each of s and t independently represents 0 or 1, R represents a hydrogen atom, a methyl group or a fluorine atom, and when (p+q) is 5 or more, t is 0. In the Formula (1), an order of $(OCF_2CF_2)$, $(OCF_2)$ and $(OCFRf_2)$ is not particularly limited.

(14) The method for manufacturing an antistatic antireflection film according to (13), wherein in the Formula (1), r represents 1 to 5, s represents 0 or 1, t represents 0 or 1, p represents 3 to 6, and q represents 0.

(15) The method for manufacturing an antistatic antireflection film according to (11), wherein the composition for a low refractive index layer further contains (f) a fluorine-free polyfunctional monomer having at least three or more reactive functional groups in one molecule.

(16) The method for manufacturing an antistatic antireflection film according to (11), wherein the compound (d) having a dimethylsiloxane structure is at least two of a silicone compound (d-1) having a number average molecular weight of 4,000 or more and a silicone compound (d-2) having a number average molecular weight of 1,000 or more and less than 4,000.

(17) The method for manufacturing an antistatic antireflection film according to (11), wherein the composition for a hardcoat layer contains a fluoroaliphatic group-containing copolymer having a repeating unit derived from a monomer containing a fluoroaliphatic group represented by the following Formula (F1) and a repeating unit derived from a monomer which does not contain a fluoroaliphatic group represented by the following Formula (F2):

Formula (F1)

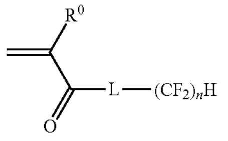

wherein, $R^0$ represents a hydrogen atom, a halogen atom or a methyl group, L represents a divalent linking group, and n represents an integer of 1 to 18:

Formula (F2)

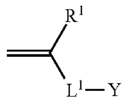

wherein, $R^1$ represents a hydrogen atom, a halogen atom or a methyl group, $L_1$ represents a divalent linking group, Y represents a straight-chained, branched or cyclic alkyl group having of 1 to 20 carbon atoms, which may be substituted, or an aromatic group which may be substituted.

According to the present invention, it is possible to provide an antireflection film which has an excellent antistatic property and a low refractive index and thus generates no surface defect that the coating film becomes a white turbid, and has excellent scratch resistance, abrasion resistance and antifouling properties.

Further, according to the present invention, it is possible to provide a method for manufacturing the antireflection film, a polarizing plate using the antireflection film as a protective film for a polarizing plate, and an image display device having the antireflection film or polarizing plate.

DETAILED DESCRIPTION

Hereinafter, embodiments for carrying out the present invention will be described in detail, but the present invention is not limited thereto. Further, in the present specification, when numerical values represent physical property values, characteristic values and the like, the description "(numerical value 1) to (numerical value 2)" means "from (numerical value 1) or more to (numerical value 2) or less". In addition, in the present specification, the description "(meth)acrylate" means "at least one of acrylate and methacrylate". The same applies also to "(meth)acrylic acid", "(meth)acryloyl" and the like.

Furthermore, in the present invention, "a repeating unit corresponding to a monomer" and "a repeating unit derived from a monomer" mean that a component obtained after the polymerization of the monomer becomes the repeating unit.

The antistatic antireflection film of an exemplary embodiment in the present invention has, on a support, a hardcoat layer formed of a composition for a hardcoat layer at least containing a compound having a quaternary ammonium salt group and a low refractive index layer formed of a composition for a low refractive index layer at least containing the following (a), (b), (c) and (d), wherein the hard coat layer and the low refractive index layer is laminated on the support in this order.

(a) an ethylenically unsaturated group-containing fluoropolymer (b) a fluorine-containing polyfunctional monomer having a surface free energy of 23 mN/m or more when a film is formed alone, four or less —$CF_3$ groups in a molecule, a fluorine content of 30% or more, and at least three reactive functional groups in one molecule (c) hollow silica fine particles having an average particle size of 10 nm to 100 nm, and (d) a compound having a dimethylsiloxane structure Hereinafter, the composition for a low refractive index layer used in the antistatic antireflection film of an exemplary embodiment in the present invention will be described.

<Composition for Low Refractive Index Layer>

(a) Ethylenically Unsaturated Group-Containing Fluoropolymer

The ethylenically unsaturated group-containing fluoropolymer is a polymer of a fluorine-based olefin. It is possible to obtain a low refractive index layer which has a low refractive index and expresses basic performances such as antifouling properties, chemical resistance and water resistance by using the fluorine-containing polymer in a composition for a low refractive index layer.

The ethylenically unsaturated group-containing fluorine compound preferably has a (meth)acryl group in its side chain. Accordingly, co-crosslinking with a fluorine-containing polyfunctional monomer which is the component (b) may be achieved, thereby improving scratch resistance.

The ethylenically unsaturated group-containing fluoropolymer can be obtained by reacting an ethylenically unsaturated group-containing isocyanate compound with a hydroxyl group-containing fluoropolymer. That is, the ethylenically unsaturated group-containing fluoropolymer in this case is a polymer in which a hydroxyl group in a hydroxyl group-containing fluoropolymer is modified by an ethylenically unsaturated group-containing isocyanate compound.

(1) Ethylenically Unsaturated Group-Containing Isocyanate Compound

The ethylenically unsaturated group-containing isocyanate compound is not particularly limited as long as the compound contains one isocyanate group and at least one ethylenically unsaturated group in the molecule.

Further, the ethylenically unsaturated group is more preferably a compound having a (meth)acryloyl group because the composition for a low refractive index layer may be more readily cured.

Examples of the ethylenically unsaturated group-containing isocyanate compound include a single kind of or combinations of two or more kinds of 2-(meth)acryloyloxyethyl isocyanate, 2-(meth)acryloyloxypropyl isocyanate and the like.

The ethylenically unsaturated group-containing isocyanate compound may also be synthesized by reacting diisocyanate with a hydroxyl group-containing (meth)acrylate.

Preferred examples of the diisocyanate include 2,4-tolylene diisocyanate, isophorone diisocyanate, xylylene diisocyanate, methylene bis(4-cyclohexylisocyanate) and 1,3-bis(isocyantemethyl)cyclohexane.

Preferred examples of the hydroxyl group-containing (meth)acrylate include 2-hydroxyethyl(meth)acrylate and pentaerythritol tri(meth)acrylate. A commercially available product of the hydroxyl group-containing polyfunctional (meth)acrylate may be available as, for example, HEA manufactured by Osaka Organic Chemical Industry Ltd., KAYARAD DPHA and PET-30 manufactured by NIPPON KAYAKU Co., Ltd, ARONIX M-215, M-233, M-305 and M-400 manufactured by TOAGOSEI Co., Ltd. and the like.

(2) Hydroxyl Group-Containing Fluoropolymer The hydroxyl group-containing fluoropolymer preferably contains the following structural units (α), (β) and (γ).

(α) a structural unit represented by the following Formula (101).

(β) a structural unit represented by the following Formula (102).

(γ) a structural unit represented by the following Formula (103).

(101)

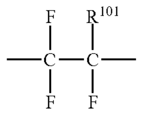

In Formula (101), $R^{101}$ represents a fluorine atom, a fluoroalkyl group or a group represented by —$OR^{102}$ ($R^{102}$ represents an alkyl group or a fluoroalkyl group).

(102)

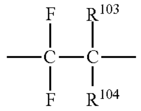

In Formula (102), $R^{103}$ represents a hydrogen atom or a methyl group, and $R^{104}$ represents an alkyl group, a group represented by —$(CH_2)_x$—$OR^{105}$ or —$OCOR^{105}$ ($R^{105}$ represents an alkyl group or a glycidyl group, and x represents a number of 0 or 1), a carboxyl group or an alkoxycarbonyl group.

(103)

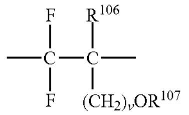

In Formula (103), $R^{106}$ represents a hydrogen atom or a methyl group, $R^{107}$ represents a hydrogen atom or a hydroxyalkyl group, and v represents a number of 0 or 1.

(i) Structural Unit (α)

In Formula (101), examples of the fluoroalkyl group of $R^{101}$ and $R^{102}$ include a fluoroalkyl group having 1 to 6 carbon atoms such as a trifluoromethyl group, a perfluoroethyl group, a perfluoropropyl group, a perfluorobutyl group, a perfluorohexyl group and a perfluorocyclohexyl group. In addition, examples of the alkyl group of $R^{102}$ include an alkyl group having 1 to 6 carbon atoms, such as a methyl group, an ethyl group, a propyl group, a butyl group, a hexyl group and a cyclohexyl group.

The structural unit (α) may be introduced by using a fluorine-containing vinyl monomer as a polymerization component. The fluorine-containing vinyl monomer is not particularly limited as long as the monomer is a compound having at least one polymerizable unsaturated double bond and at least one fluorine atom. Examples thereof include a single kind of or combinations of two or more kinds of fluoroolefins such as tetrafluoroethylene, hexafluoropropylene and 3,3,3-trifluoropropylene; alkyl perfluorovinyl ethers or alkoxyalkyl perfluorovinyl ethers; perfluoro(alkyl vinyl ethers) such as perfluoro(methyl vinyl ether), perfluoro(ethyl vinyl ether), perfluoro(propyl vinyl ether, perfluoro(butyl vinyl ether) and perfluoro(isobutyl vinyl ether); and perfluoro(alkoxyalkyl vinyl ethers) such as perfluoro(propoxypropyl vinyl ether.

Among them, hexafluoropropylene and perfluoro(alkyl vinyl ether) or perfluoro(alkoxyalkyl vinyl ether) are more preferred, and combinations thereof are still more preferred.

From the viewpoint of low refractive index, solubility in an organic solvent of a hydroxyl group-containing fluoropolymer, transparency, adhesion and the like, the content of the structural unit (a) is preferably 20% by mole to 70% by mole, more preferably 25% by mole to 65% by mole, and still more preferably 30% by mole to 60% by mole, based on the total amount of the hydroxyl group-containing fluoropolymer which is taken as 100% by mole.

(ii) Structural Unit (β)

In Formula (102), examples of the alkyl group of $R^{104}$ or $R^{105}$ include an alkyl group having 1 to 12 carbon atoms such as a methyl group, an ethyl group, a propyl group, a hexyl group, a cyclohexyl group and a lauryl group, and examples of the alkoxycarbonyl group include a methoxycarbonyl group, an ethoxycarbonyl group and the like.

The structural unit (β) may be introduced by using a vinyl monomer having the above-described substituent as a polymerization component. Examples of the vinyl monomer include a single kind of or combinations of two or more kinds of alkyl vinyl ethers or cycloalkyl vinyl ethers such as methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, 2-ethylhexyl vinyl ether, cyclohexyl vinyl ether and the like; allyl ethers such as ethyl allyl ether and butyl allyl ether; carboxylic acid vinyl esters such as vinyl acetate, vinyl propionate, vinyl butyrate, vinyl pivalate, vinyl caproate, vinyl versate and vinyl stearate; (meth)acrylic acid esters such as methyl (meth)acrylate, ethyl (meth)acrylate, n-butyl (meth) acrylate, isobutyl (meth)acrylate, 2-methoxyethyl (meth) acrylate, 2-ethoxyethyl (meth)acrylate and 2-(n-propoxy) ethyl (meth)acrylate; unsaturated carboxylic acids such as (meth)acrylic acid, crotonic acid, maleic acid, fumaric acid and itaconic acid.

From the viewpoint of solubility in an organic solvent, transparency, reflectance and the like, the content of the structural unit (β) is preferably 10% by mole to 70% by mole, more preferably 20% by mole to 60% by mole, and still more preferably 30% by mole to 60% by mole, based on the total amount of the hydroxyl group-containing fluoropolymer which is taken as 100% by mole.

(iii) Structural Unit (γ)

In Formula (103), examples of the hydroxyalkyl group of $R^{107}$ include a 2-hydroxyethyl group, a 2-hydroxypropyl group, a 3-hydroxypropyl group, a 4-hydroxybutyl group, a 3-hydroxybutyl group, a 5-hydroxypentyl group and a 6-hydroxyhexyl group.

The structural unit (γ) may be introduced by using a hydroxyl group-containing vinyl monomer as a polymerization component. Examples of the hydroxyl group-containing vinyl monomer include hydroxyl group-containing vinyl ethers such as 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 5-hydroxypentyl vinyl ether and 6-hydroxyhexyl vinyl ether; hydroxyl group-containing allyl ethers such as 2-hydroxyethyl allyl ether, 4-hydroxybutyl allyl ether and glycerol monoallyl ether; allyl alcohol and the like.

Further, as the hydroxyl group-containing vinyl monomer, 2-hydroxyethyl (meth)acrylate, 2-hydroxybutyl (meth)acrylate, 2-hydroxypropyl (meth)acrylate, caprolactone (meth) acrylate, polypropylene glycol (meth)acrylate and the like may be used in addition to those mentioned above.

From the viewpoint of solubility in an organic solvent, transparency, reflectance and the like, the content of the structural unit (γ) is preferably 5% by mole to 70% by mole, more preferably 5% by mole to 40% by mole and still more preferably 5% by mole to 30% by mole, based on the total amount of the hydroxyl group-containing fluoropolymer which is taken as 100% by mole.

(iv) Structural Unit (δ) and Structural Unit (ϵ)

It is also preferred that the hydroxyl group-containing fluoropolymer further includes the following structural unit (δ).

(δ) Structural Unit Represented by the Following Formula (104).

(104)

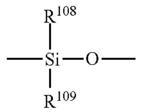

In Formula (104), $R^{108}$ and $R^{109}$ may be the same as or different from each other, and represent a hydrogen atom, an alkyl group, a halogenated alkyl group or an aryl group.

In Formula (104), examples of the alkyl group of $R^{108}$ or $R^{109}$ include an alkyl group having 1 to 3 carbon atoms such as a methyl group, an ethyl group and a propyl group, examples of the halogenated alkyl group include a fluoroalkyl group having 1 to 4 carbon atoms such as a trifluoromethyl group, a perfluoroethyl group, a perfluoropropyl group and a perfluorobutyl group, and examples of the aryl group include a phenyl group, a benzyl group, a naphthyl group and the like.

The structural unit (δ) may be introduced by using an azo group-containing polysiloxane compound having a polysiloxane segment represented by the above-mentioned Formula (104). Examples of the azo group-containing polysiloxane compound include compounds represented by the following Formula (105).

(105)

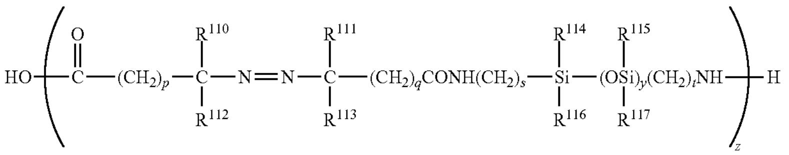

In Formula (105), $R^{110}$ to $R^{113}$ may be the same as or different from each other and represent a hydrogen atom, an alkyl group or a cyano group, $R^{114}$ to $R^{117}$ may be the same as or different from each other and represent a hydrogen atom or an alkyl group, p and q represent a number of 1 to 6, s and t represent a number of 0 to 6, y represents a number of 1 to 200, and z represents a number of 1 to 20.

When the compound represented by Formula (105) is used, the structural unit (δ) is included as a part of the structural unit (ϵ) in the hydroxyl group-containing fluoropolymer.

(ϵ) Structural Unit Represented by the Following Formula (106).

(106)

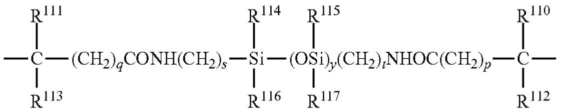

In Formula (106), $R^{110}$ to $R^{113}$, $R^{114}$ to $R^{117}$, and p, q, s, t and y are the same as those defined in the above-mentioned Formula (105).

In Formulas (105) and (106), examples of the alkyl group of $R^{110}$ to $R^{113}$ include an alkyl group having 1 to 12 carbon atoms such as a methyl group, an ethyl group, a propyl group, a hexyl group and a cyclohexyl group, and examples of the alkyl group of $R^{114}$ to $R^{117}$ include an alkyl group having 1 to 3 carbon atoms such as a methyl group, an ethyl group and a propyl group.

In the present invention, as the azo group-containing polysiloxane compound represented by Formula (105), a compound represented by the following Formula (107) is particularly preferred.

(108)

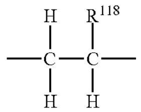

In Formula (108), $R^{118}$ represents a group having emulsifying action.

In Formula (108), the group having emulsifying action of $R^{118}$ is preferably a group having both a hydrophobic group and a hydrophilic group in which the hydrophilic group has a polyether structure such as polyethylene oxide and polypropylene oxide.

Examples of the group having emulsifying action contain a group represented by the following Formula (109).

(109)

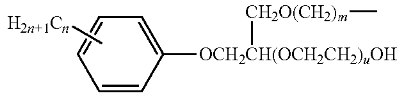

In Formula (109), n represents a number of 1 to 20, m represents a number of 0 to 4, and u represents a number of 3 to 50.

The structural unit (ζ) may be introduced by using a reactive emulsifier as a polymerization component. Examples of the reactive emulsifier include compounds represented by the following Formula (110).

(107)

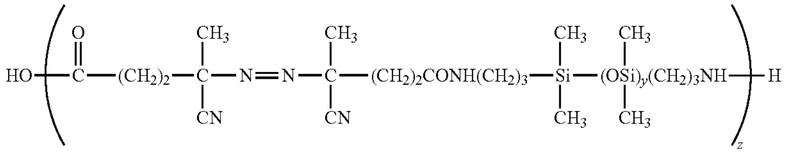

In Formula (107), y and z are the same as those defined in the above-mentioned Formula (105).

From the viewpoint of surface lubricity of a coating film after cured, scratch resistance, transparency, cissing prevention upon coating and the like, the content of the structural unit (δ) is preferably 0.1% by mole to 10% by mole, more preferably 0.1% by mole to 5% by mole and still more preferably 0.1% by mole to 3% by mole, based on the total amount of the hydroxyl group-containing fluoropolymer which is takes as 100% by mole. By the same reason, it is preferred that the content of the structural unit (ϵ) is determined such that the content of the structural unit (δ) contained therein is in the above-mentioned range.

(v) Structural Unit (ζ)

It is also preferred that the hydroxyl group-containing fluoropolymer further includes the following structural unit (ζ).

(ζ) a structural unit represented by the following Formula (108).

(110)

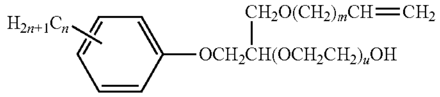

In Formula (110), n, m and u are the same as those defined in the above-mentioned Formula (109).

From the viewpoint of solubility in an organic solvent, adhesiveness and moisture resistance of the composition and the like, the content of the structural unit (ζ) is preferably 0.1% by mole to 5% by mole, more preferably 0.1% by mole to 3% by mole, and still more preferably 0.2% by mole to 3% by mole, based on the total amount of the hydroxyl group-containing fluoropolymer which is taken as 100% by mole.

From the viewpoint of mechanical strength and viscosity, the number average molecular weight of the hydroxyl group-containing fluoropolymer in terms of polystyrene, which is measured by gel permeation chromatography using tetrahydrofuran as a solvent, is preferably 5,000 to 500,000, more preferably 10,000 to 300,000, and still more preferably 10,000 to 100,000.

(3) Reaction Molar Ratio

From the viewpoint of scratch resistance, durability and the like, the molar ratio of an isocyanate group/a hydroxyl group of the ethylenically unsaturated group-containing isocyanate compound and the hydroxyl group-containing fluoropolymer in the ethylenically unsaturated group-containing polymer is preferably 1.1 to 1.9, more preferably 1.1 to 1.5, and still more preferably 1.2 to 1.5.

The content of the ethylenically unsaturated group-containing fluoropolymer (a) in the composition for a low refractive index layer is not particularly limited, but is preferably 10% by mass to 60% by mass, more preferably 15% by mass to 55% by mass, and still more preferably 20% by mass to 50% by mass, based on the total solid of the composition, from the viewpoint of refractive index and scratch resistance of the cured coating film.

(b) Fluorine-Containing Polyfunctional Monomer

The fluorine-containing polyfunctional monomer used in the composition for a low refractive index layer according to an exemplarly embodiment in the present invention has a surface free energy of 23 mN/m or more when a film is formed alone, four or less —$CF_3$ groups in the molecule, a fluorine content of 30% or more, and at least three reactive functional groups in one molecule.

The fluorine-containing polyfunctional monomer has four or less —$CF_3$ groups in the molecule and a surface free energy of 23 mN/m or more when a film is formed alone, and thus, adhesion with a hardcoat layer containing a compound having a quaternary ammonium salt group is improved and scratch resistance is improved. In addition, the white turbidity of a coating film of the low refractive index layer can also be suppressed.

The number of —$CF_3$ groups in the molecule is preferably 3 or less, more preferably 2 or less, and most preferably substantially zero. In order to realize the low refractive index, it is necessary to increase the content of fluorine in the molecule, and more than four —$CF_3$ groups present in the molecule as a molecular design for increasing the content of fluorine are not preferred because the surface free energy is extremely decreased. It is preferred that the content of fluorine is increased while effectively using the —$CF_2$— group.

Here, the surface free energy ($\gamma s^v$: unit, mN/m) is defined as a value $\gamma s^v(=\gamma s^d-\gamma s^h)$ represented by the sum of $\gamma s^d$ and $\gamma s^h$ obtained from the following simultaneous equations (a) and (b) from each contact angle ($\theta_{H2O}$, $\theta_{CH2I2}$) of pure water $H_2O$ and methylene iodide $CH_2I_2$ experimentally obtained on a single film of the fluorine-containing polyfunctional monomer with reference to D. K. Owens: J. Appl. Polym. Sci., 13, 1741 (1969).

$$1+\cos\theta_{H2O}=2\sqrt{\gamma s^d}(\sqrt{\gamma_{H2O}{}^d/\gamma_{H2O}{}^v})+2\sqrt{\gamma s^h}(\sqrt{\gamma_{H2O}{}^h/\gamma_{H2O}{}^v}) \quad (a)$$

$$1+\cos\theta_{CH2I2}=2\sqrt{\gamma s^d}(\sqrt{\gamma_{CH2I2}{}^d/\gamma_{CH2I2}{}^v})+2\sqrt{\gamma s^h}(\sqrt{\gamma_{CH2I2}{}^h/\gamma_{CH2I2}{}^v}) \quad (b)$$

(however, $\gamma_{H2O}{}^d=21.8$, $\gamma_{H2O}{}^h=51.0$, $\gamma_{H2O}{}^v=72.8$, $\gamma_{CH2I2}{}^d=49.5$, $\gamma_{CH2I2}{}^h=1.3$ and $\gamma_{CH2I2}{}^v=50.8$.)

The contact angle of pure water and methylene iodide on the single film of the fluorine-containing polyfunctional monomer is measured as follows.

First, a single film of the fluorine-containing polyfunctional monomer is manufactured on a cellulose triacetate film (TDH60UF, manufactured by Fujifilm Corporation, refractive index 1.48). As the manufacturing condition, a film is formed by applying a sample to which an initiator (IRGACURE 127: manufactured by Chiba Specialty Chemicals Corporation) is added in an amount of 4% by mass in solids by a spin coat method so as to have a film thickness of 5 nm. When a solvent is contained, thereafter, the film is sufficiently dried (time and temperature in drying can be appropriately adjusted according to a melting point of solvent to be used, for example, when MEK is used, the drying is conducted at 80° C. for 1 minute), and then cured by UV irradiation to obtain an independent film formation film. The UV curing condition is that UV radiation is irradiated at an illuminance of 600 mW/$cm^2$ and a radiation dose of 600 mJ/$cm^2$ by using an air-cooled metal halide lamp (manufactured by Eye Graphics Co., Ltd.) while nitrogen purging such that the oxygen concentration becomes an atmosphere of 0.1% by volume or less. Also, the solid content can be appropriately adjusted so as not to cause surface defect such as repelling.

Subsequently, a liquid drop having a diameter of 1.0 mm is made on the tip of a needle by using pure water as a liquid in a dry state (after humidity-controlled at 20° C. and 65% RH for 2 hours) by using a contact angle meter ["CA-X" type contact angle meter, manufactured by Kyowa Interface Science Co., Ltd.], and the liquid drop is brought into contact with the surface of the above-mentioned film to form a liquid drop on the film. For the liquid drop, at a point where the film is in contact with the liquid, the angle on the side including the liquid as an angle between a tangential line for the liquid surface and the film surface is measured as a contact angle. Further, the contact angle may be measured in the same manner as above by using methylene iodide instead of water.

The surface free energy is preferably 24 mN/m or more, and more preferably 27 mN/m or more. The upper limit is preferably 35 mN/m or less. When the surface free energy exceeds 35 mN/m, the content of fluorine is so low that the refractive index tends to increase.

Hereinafter, the fluorine-containing polyfunctional monomer which is preferably used in the present invention will be described in detail.

The fluorine-containing polyfunctional monomer used in the present invention is a compound having an atomic group (hereinafter, also referred to as a "fluorine-containing core portion") which mainly has a plurality of fluorine atoms and carbon atoms (however, oxygen atom(s) and/or hydrogen atom(s) may be partially contained), and is not substantially involved in polymerization, and at least three reactive functional groups having polymerizable property such as a radical polymerizable property, an ionic polymerizable property or a condensation polymerizable property through a linking group such as an ester linking group or an ether linking group.

Examples of the reactive functional group include a (meth)acryloyl group, an allyl group, an alkoxysilyl group, an α-fluoroacryloyl group, an epoxy group, —C(O)OCH═$CH_2$ and the like. Among them, from the viewpoint of polymerizable property, a (meth)acryloyl group, an allyl group, an α-fluoroacryloyl group, an epoxy group and —C(O)OCH═$CH_2$ having a radical or cationic polymerizable property are preferred, a (meth)acryloyl group, an allyl group, an α-fluoroacryloyl group and —C(O)OCH═$CH_2$ having a radical polymerizable property is more preferred, and a (meth)acryloyl group or —C(O)OCH═$CH_2$ are still more preferred.

The "fluorine-containing core portion" is preferably an n-valent (the number of reactive functional groups) chained or cyclic perfluorinated hydrogen group.

The number of hydrogen atoms/the number of fluorine atoms in the fluorine-containing core portion is preferably ¼ or less and more preferably ⅙ or less. When the number of hydrogen atoms/the number of fluorine atoms in the fluorine-containing core portion is ¼ or less, the antifouling properties are improved, which is preferred. n represents an integer of 3 or more, and n is preferably 4 or more and more preferably 5 or more. The upper limit of n is preferably 10 or less.

Examples of the representative fluorine-containing core portion include the following specific examples, but the present invention is not limited thereto.

Rf-1

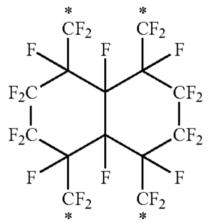

Rf-2

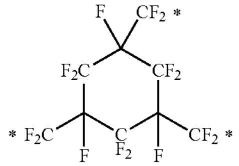

Rf-3

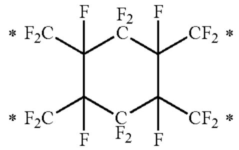

Rf-6

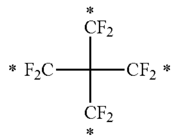

Rf-8

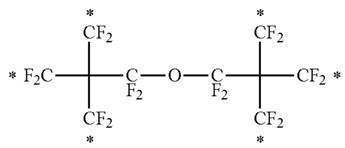

Rf-9

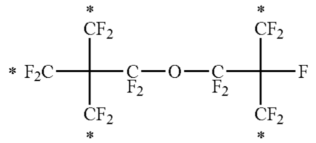

Rf-11

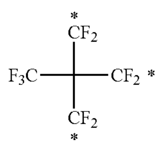

-continued

Rf-12

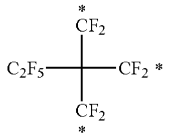

Rf-13

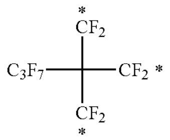

Rf-14

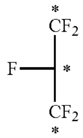

Rf-15

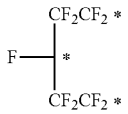

Rf-16

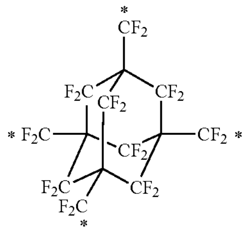

Rf-18

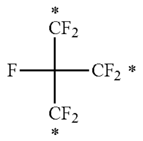

Among the specific examples, Rf-6, 8 to 15 and 18 are preferred.

Among the specific examples, * represents a position at which a reactive functional group or a hydroxyl group is linked. However, a divalent linking group may be intervened between the reactive functional group or the hydroxyl group and the fluorine-containing core portion.

The divalent linking group represents an alkylene group having 1 to 10 carbon atoms, an arylene group having 6 to 10 carbon atoms, —O—, —S—, —N(R)—, a group obtained by combining an alkylene group having 1 to 10 carbon atoms with —O—, —S— or —N(R)—, and a group obtained by combining an arylene group having 6 to 10 carbon atoms with —O—, —S— or —N(R)—. R represents a hydrogen atom or an alkyl group having 1 to 5 carbon atoms. When L represents an alkylene group or an arylene group, the alkylene group and the arylene group represented by L are preferably substituted with a halogen atom, and preferably substituted with a fluorine atom.

The fluorine-containing polyfunctional monomer is preferably a compound represented by the following Formula (1) in that scratch resistance may be improved and white turbidity may be suppressed when a low refractive index hardcoat layer containing a compound having a quaternary ammonium salt group is used.

Formula (1):

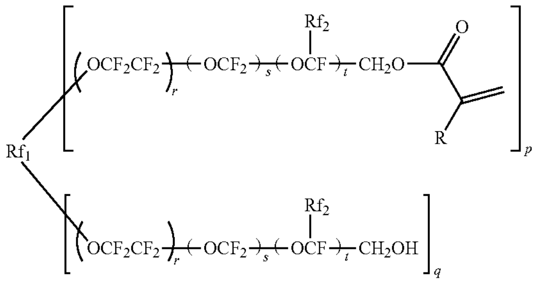

In the formula, $Rf_1$ represents a (p+q) valent perfluoro saturated hydrocarbon group which may have an ether bond. $Rf_2$ at least contains a carbon atom and a fluorine atom, and represents a monovalent chained or cyclic fluorinated hydrocarbon group which may contain an oxygen atom or a hydrogen atom. p represents an integer of 3 to 10, q represents an integer of 0 to 7, and (p+q) represents an integer of 3 to 10. R represents an integer of 0 to 100, and each of s and t independently represents 0 or 1. R represents a hydrogen atom, a methyl group or a fluorine atom. When (p+q) is 5 or more, t is 0. In the Formula (1), an order of $(OCF_2CF_2)$, $(OCF_2)$ and $(OCFRf_2)$ is not particularly limited.

Formula (1) will be described.

$Rf_1$ represents a (p+q) valent perfluoro saturated hydrocarbon group which may have an ether bond, and corresponds to the above-described fluorine-containing core portion.

Specific examples of $Rf_1$ and preferred range thereof are the same as those of the above-described fluorine-containing core portion. $Rf_2$ at least contains a carbon atom and a fluorine atom, and represents a monovalent chained or cyclic fluorinated hydrocarbon group which may include an oxygen atom or a hydrogen atom (which may include both the oxygen atom and the hydrogen atom).

$Rf_2$ is preferably a chained or branched perfluoroalkyl group having 1 to 12 carbon atoms (for example, trifluoromethyl, perfluoroethyl, perfluoropropyl and the like) or a perfluorocycloalkyl group having 3 to 12 carbon atoms (for example, perfluoropentyl, perfluorocyclohexyl and the like), more preferably the above-mentioned perfluoroalkyl group and most preferably a trifluoromethyl group.

p represents an integer of 3 to 10, preferably 3 to 6, and more preferably 3 to 4.

q represents an integer of 0 to 7, preferably 0 to 3, more preferably 0 to 1, and still more preferably 0.

(p+q) represents an integer of 3 to 10, preferably 3 to 6, and more preferably 3 to 4.

r represents an integer of 0 to 100, preferably 0 to 20, more preferably 1 to 5, and still more preferably 1. s represents 0 or 1, and preferably 0. t represents 0 or 1, and preferably 0 from the viewpoint that the surface energy of the fluorine-containing polyfunctional monomer is not extremely lowered.

R represents a hydrogen atom, a methyl group or a fluorine atom, preferably a hydrogen atom and a methyl group, and more preferably a hydrogen atom.

In Formula (1), the case in which r=1 to 5, s=0 or 1, t=0 or 1, p=3 to 6, and q=0 is also a preferred embodiment.

Hereinafter, preferred specific examples of the fluorine-containing polyfunctional monomer will be presented, but the present invention is not limited thereto.

X-4

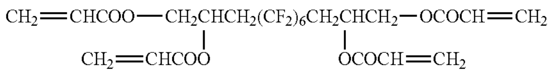

X-10

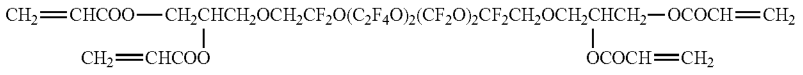

X-12

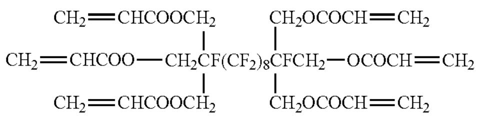

X-13

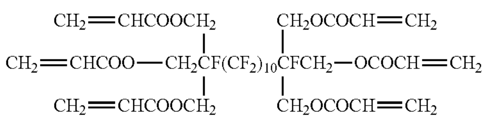

X-14

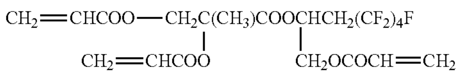

-continued
X-21
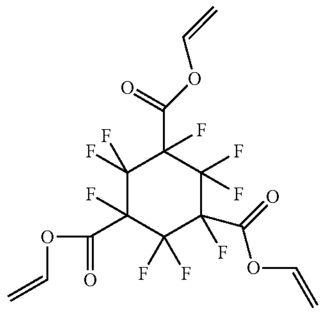
X-22
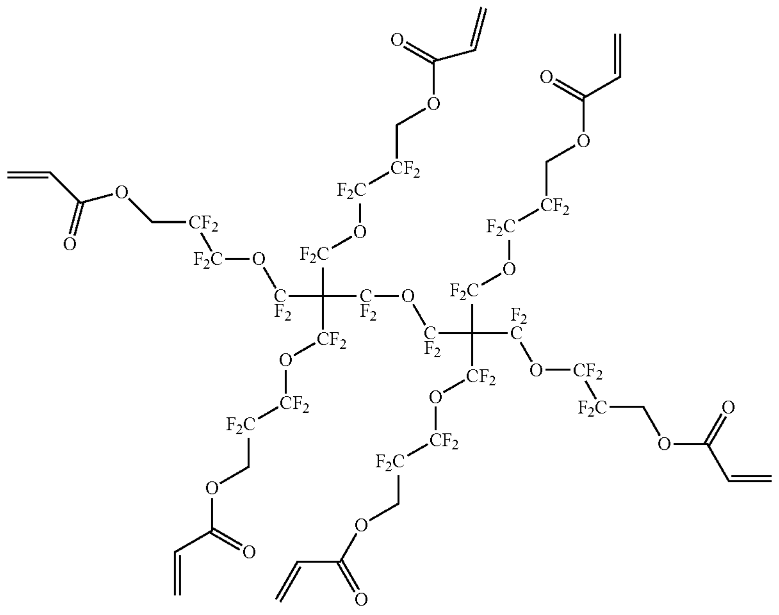
X-23
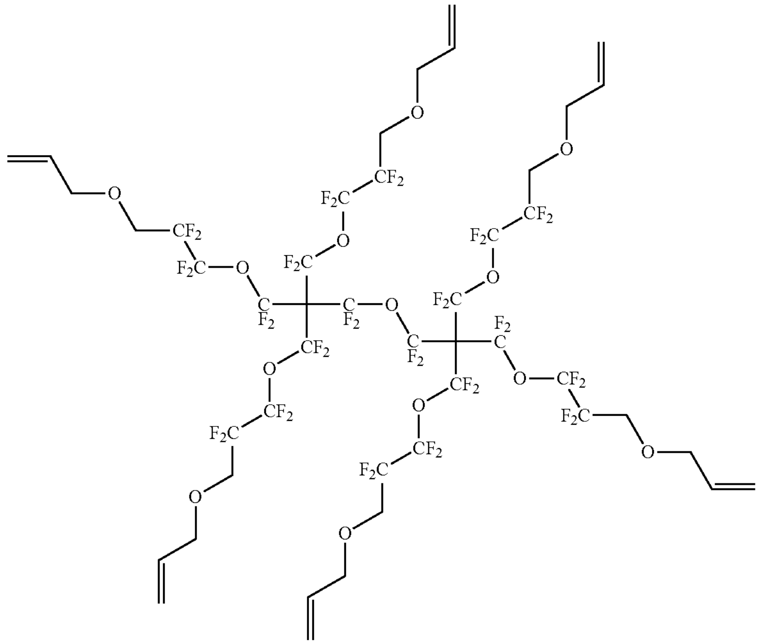

-continued
X-24
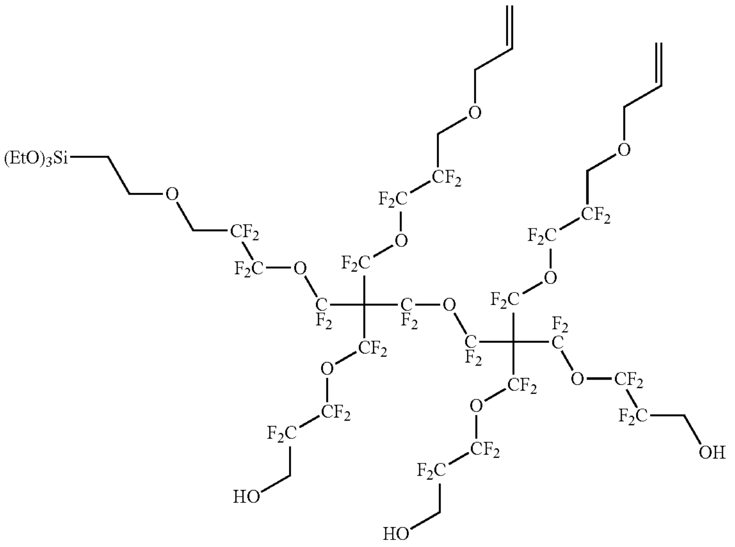
X-25
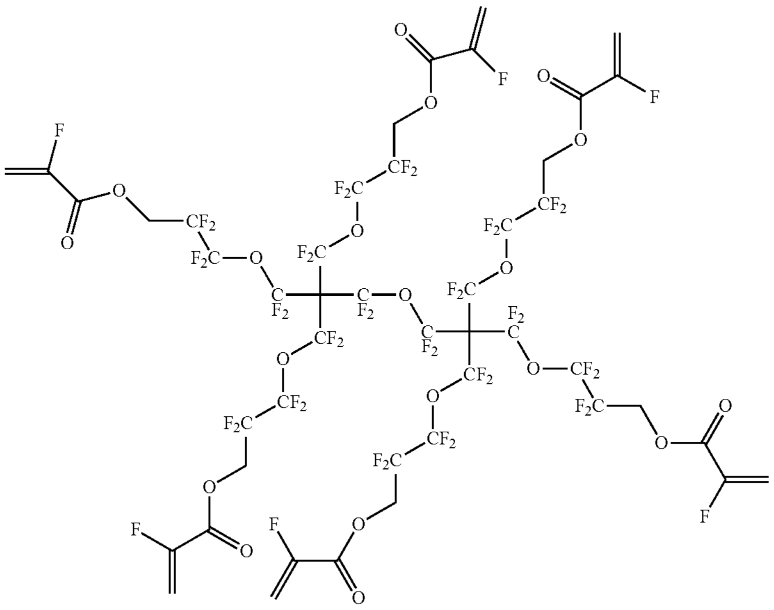

-continued
X-26
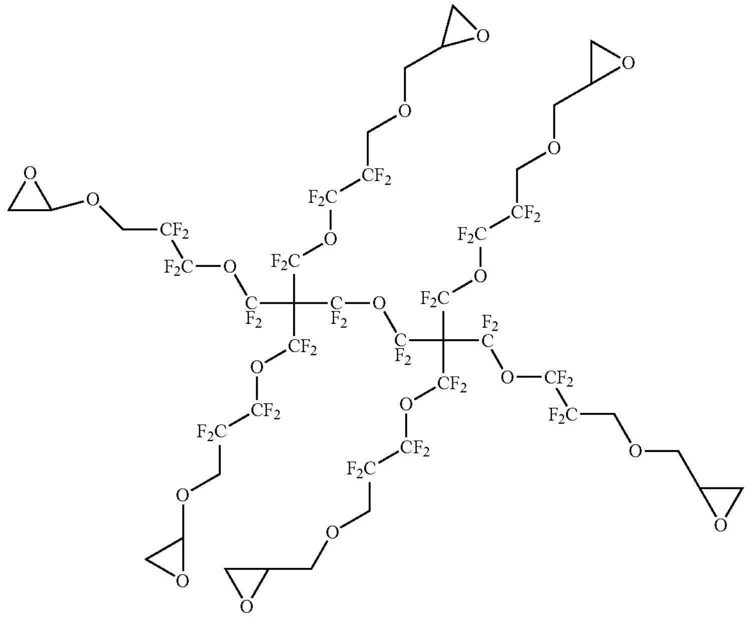
X-27
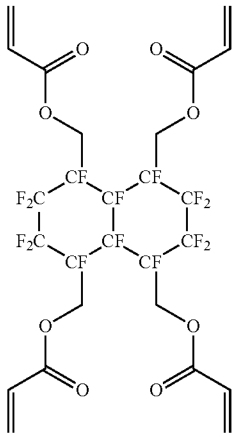
X28
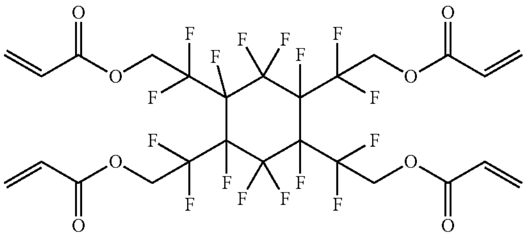
X-29
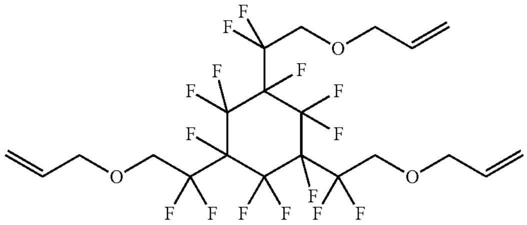
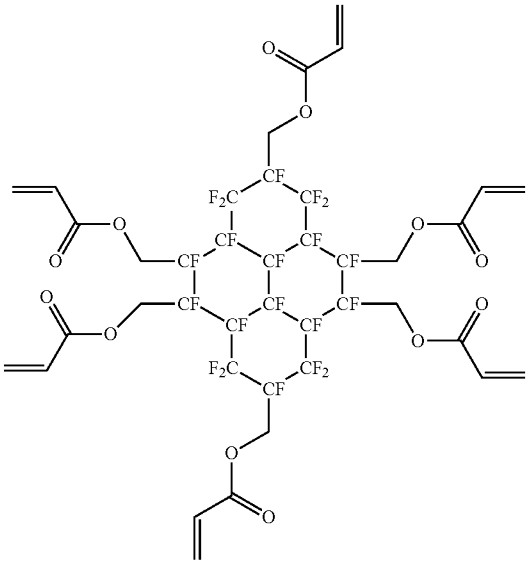

-continued
X-31
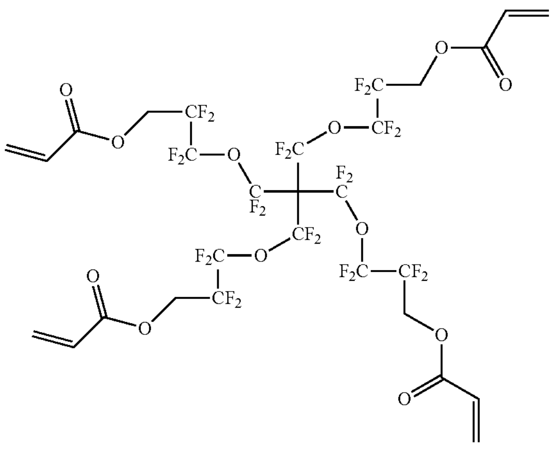
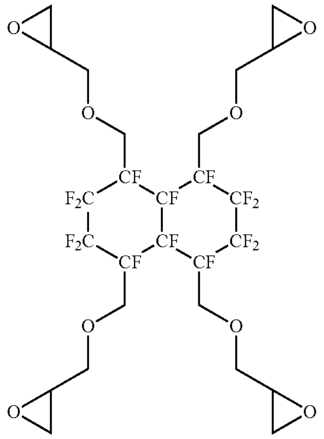
X-33
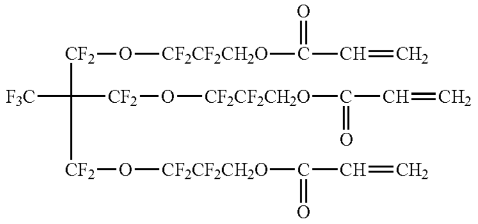
M-1
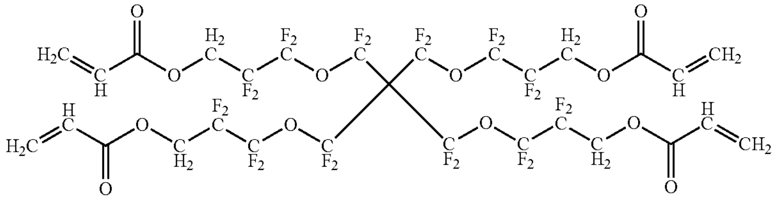
M-2
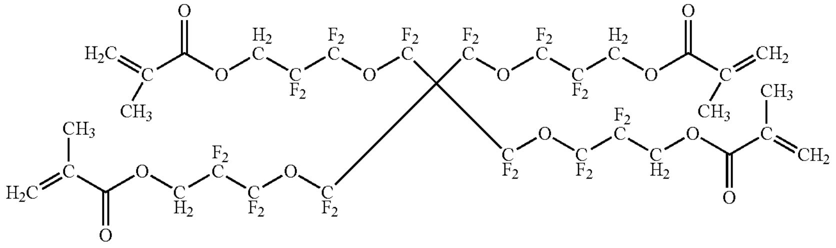
M-3
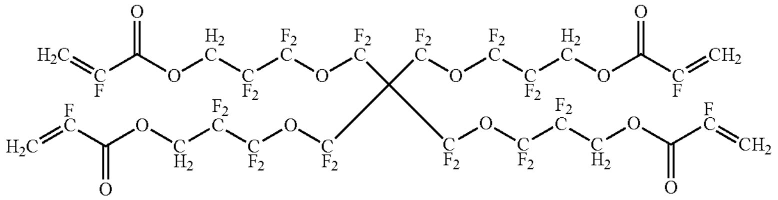
M-4
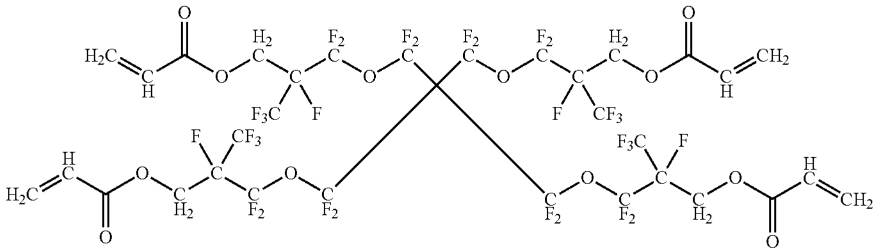

-continued
M-5
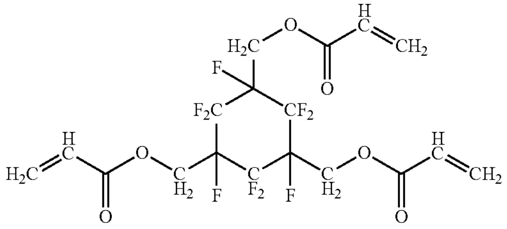
M-6
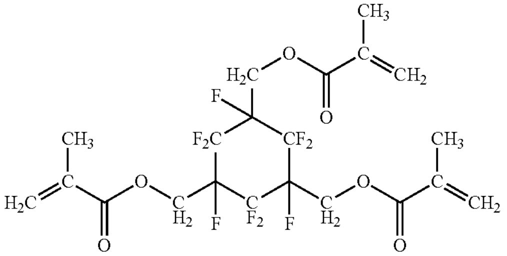
M-7
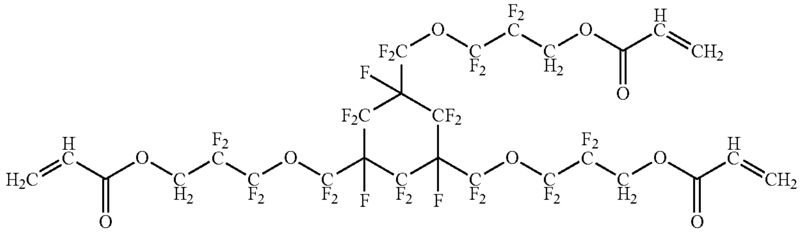
M-8
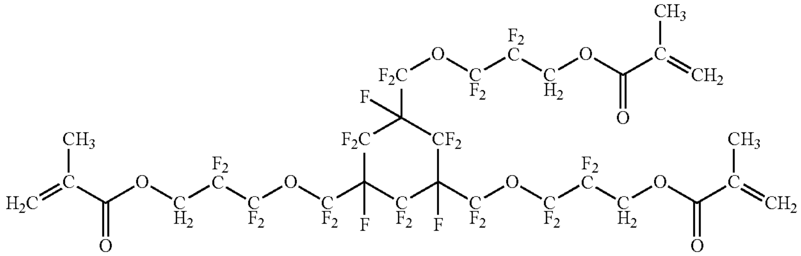
M-9
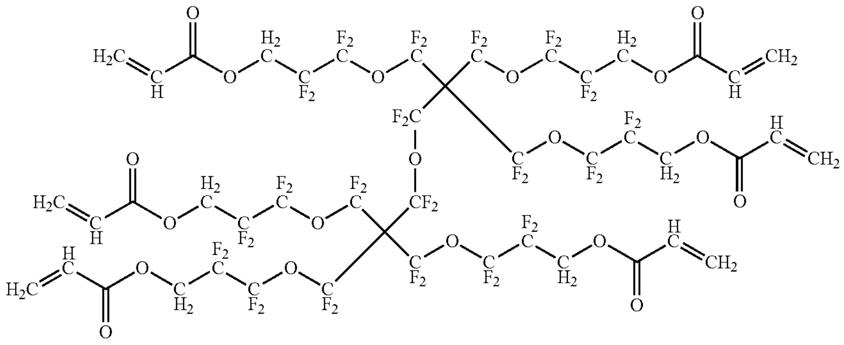
M-10
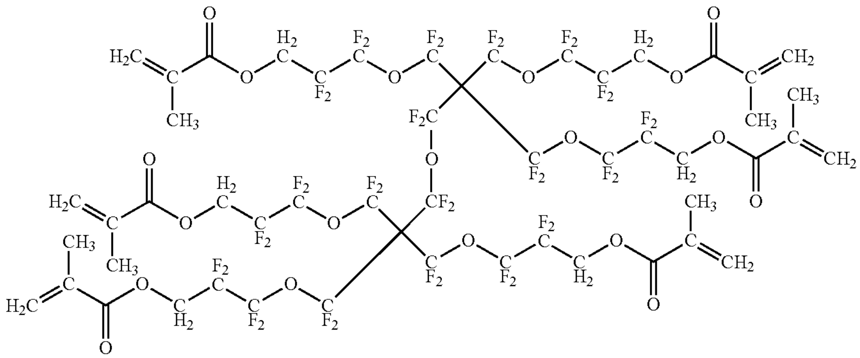

-continued

M-11

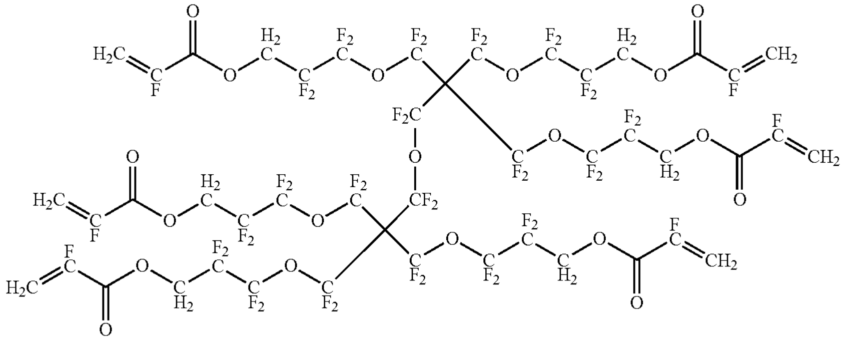

M-12

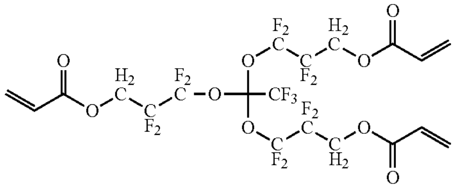

M-13

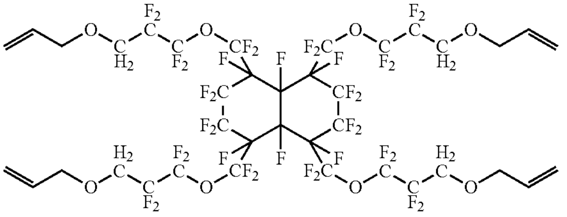

M-15

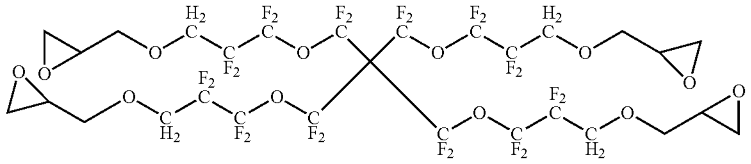

M-16

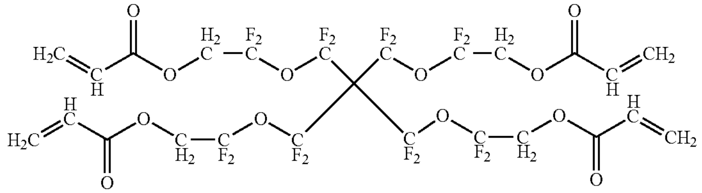

These compounds may be synthesized by the methods as described in, for example, Japanese Patent Application Laid-Open Nos. Hei 10-182558 and Hei 11-60637.

The fluorine contents of the above-mentioned fluorine-containing polyfunctional monomers X-4, X-10, X-12 to X-14 and X-21 to X-33 are as follows.

X-4: 34.2%

X-10: 34.1%

X-12: 31.4%

X-13: 35.6%

X-14: 30.6%

X-21: 37.5%

X-22: 46.2%

X-23: 48.6%

X-24: 47.7%

X-25: 49.8%

X-26: 45.8%

X-27: 36.6%

X-28: 39.8%

X-29: 44.0%

X-30: 35.1%

X-31: 44.9%

X-32: 36.2%

X-33: 47.8%

Further, the fluorine contents of the fluorine-containing polyfunctional monomers M-1 to M-13, M-15 and M-16 are as follows.

M-1: 44.9%

M-2: 42.5%

M-3: 48.9%

M-4: 50.0%

M-5: 34.3%

M-6: 31.7%

M-7: 51.5%

M-8: 49.4%

M-9: 49.0%

M-10: 46.5%

M-11: 52.7%

M-12: 41.7%

M-13: 54.4%

M-15: 44.5%

M-16: 37.3%

Further, preferred specific examples of the fluorine-containing polyfunctional monomer include those described below, but the present invention is not limited thereto. Among the following specific examples, $C_f$ represents a content of fluorine.

-continued
MA1
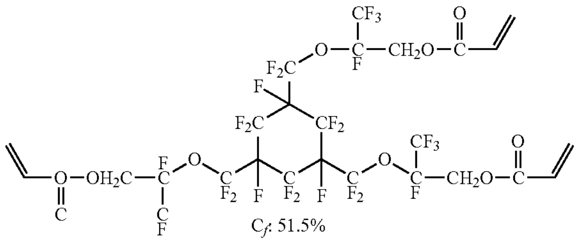
$C_f$: 51.5%
MA2
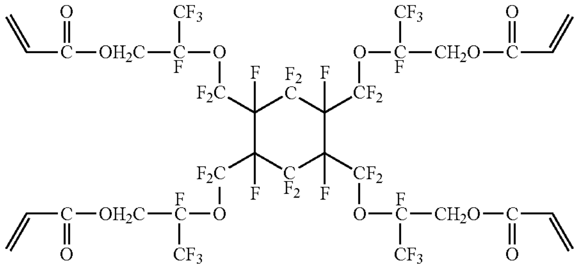
$C_f$: 49.5%
MA3
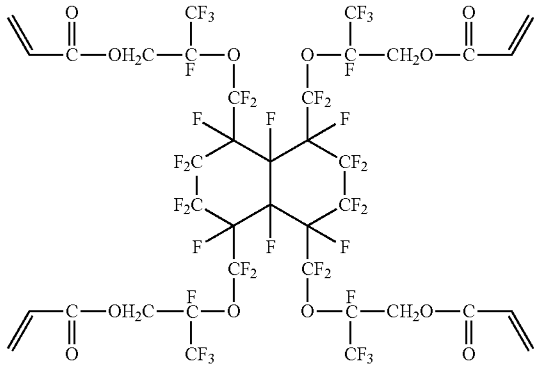
$C_f$: 51.9%
MA4
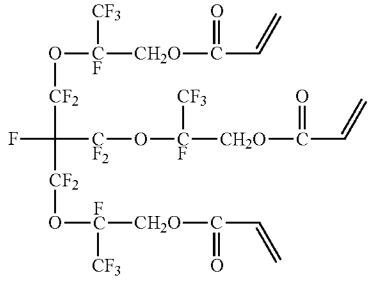
$C_f$: 46.0%
MA5
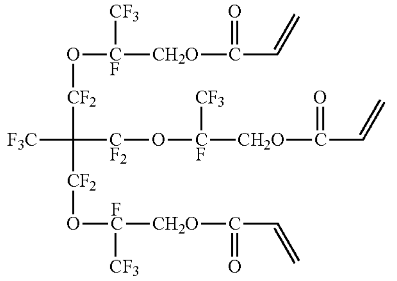
$C_f$: 47.8%
MA7
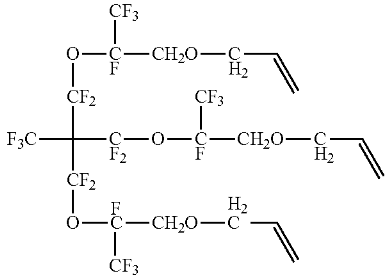
$C_f$: 50.4%
MA8
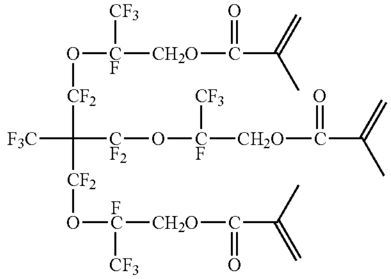
$C_f$: 45.5%
MA9
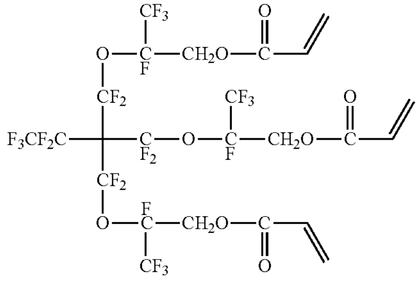
$C_f$: 49.4%
MA10
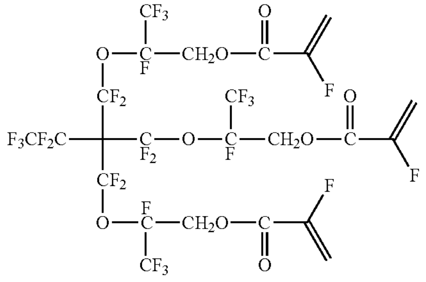
$C_f$: 52.7%

-continued
MA11
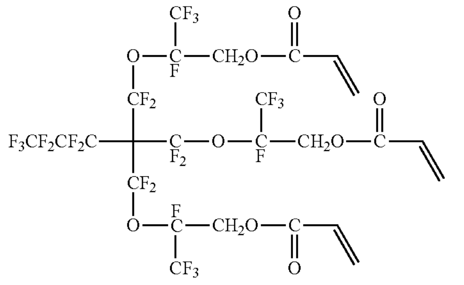
Cf: 50.9%
MA13
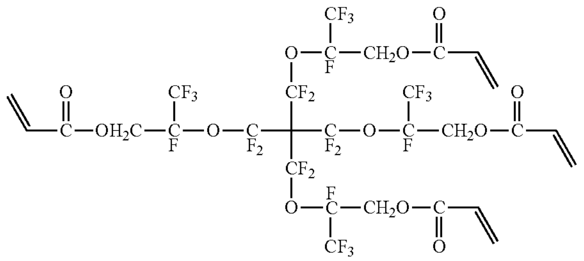
Cf: 44.9%
MA14
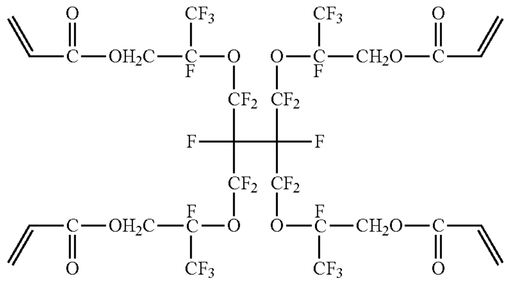
Cf: 46.3%
MA15
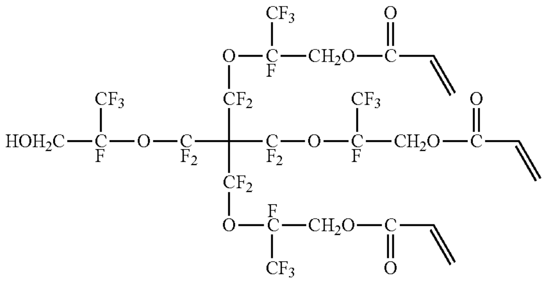
Cf: 48.0%
-continued
MA18
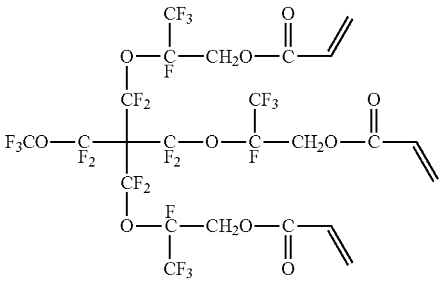
Cf: 48.6%
MA20
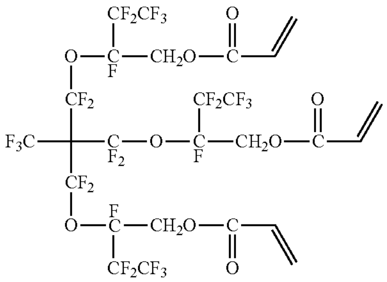
Cf: 52.1%
Further, preferred specific examples of the fluorine-containing polyfunctional monomer include those described below, but the present invention is not limited thereto.
(FM-1)
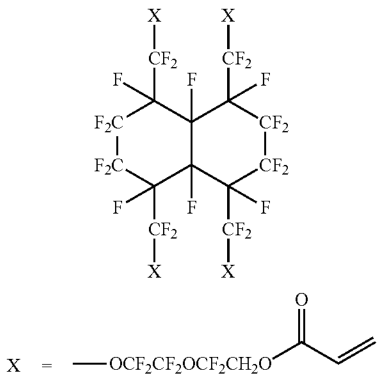
(FM-2)
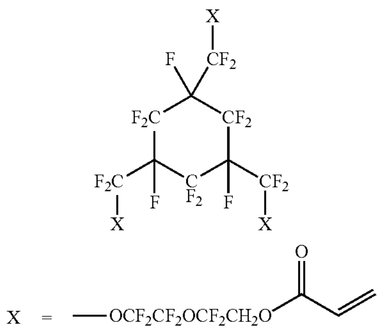

-continued
(FM-3)
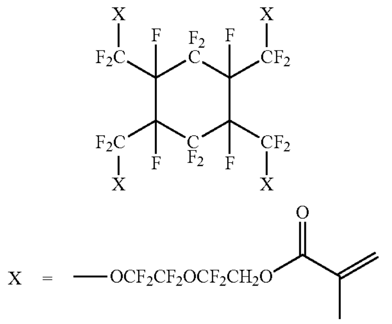
(FM-4)
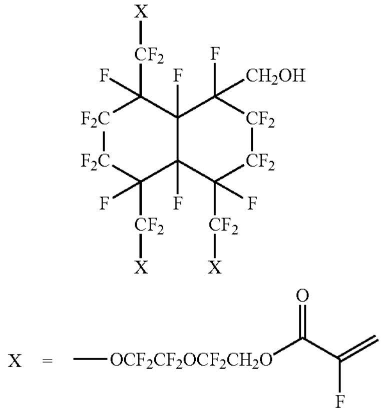
(FM-5)
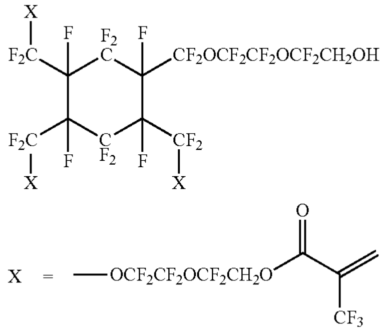
(FM-6)
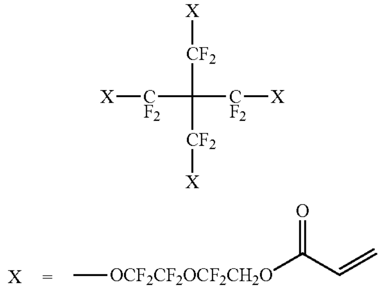
-continued
(FM-7)
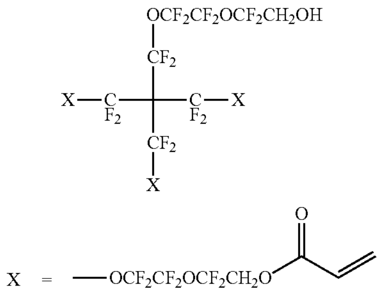
(FM-8)
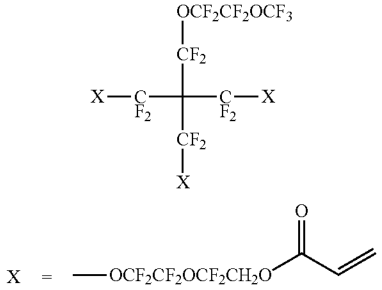
(FM-12)
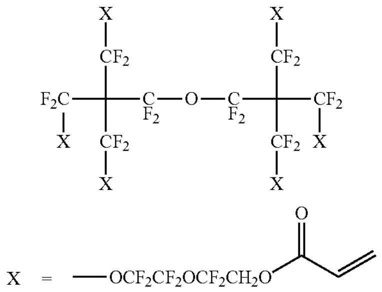
(FM-13)
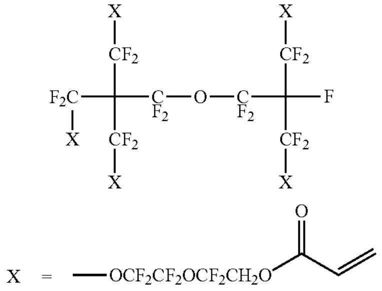
(FM-14)
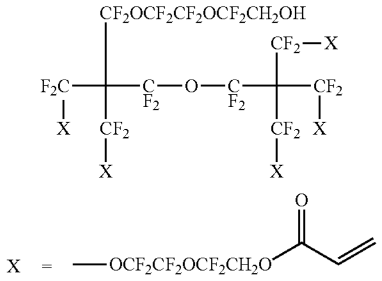

-continued (FM-15)

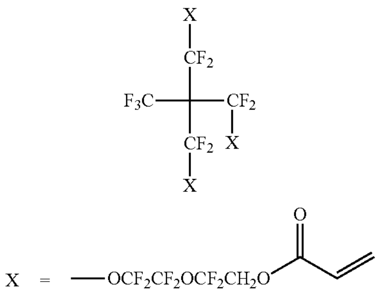

(FM-19)

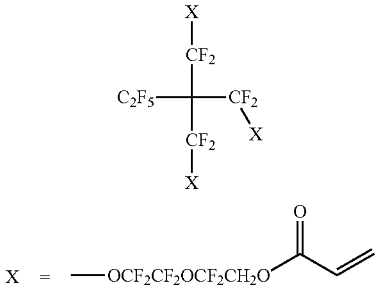

(FM-20)

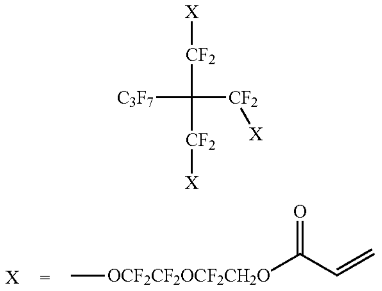

(FM-21)

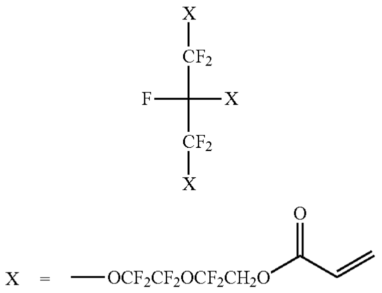

(FM-22)

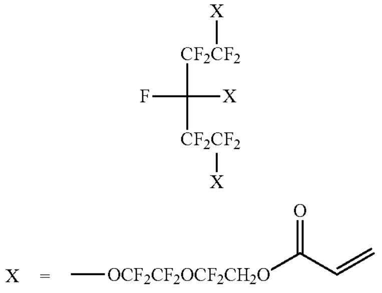

-continued (FM-23)

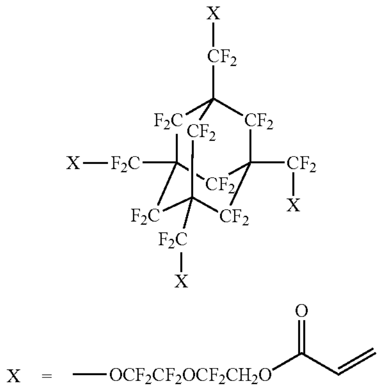

(FM-24)

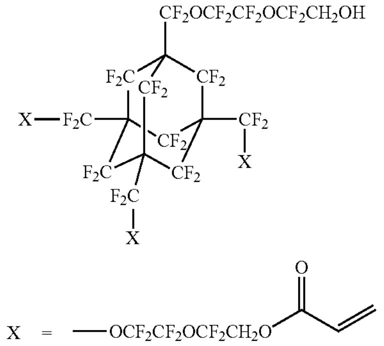

The fluorine contents of the above-mentioned fluorine-containing polyfunctional monomers FM-1 to FM-24 are as follows.

FM-1: 52.8%
FM-2: 52.5%
FM-3: 49.1%
FM-4: 54.9%
FM-5: 56.7%
FM-6: 47.5%
FM-7: 49.6%
FM-8: 51.6%
FM-12: 48.4%
FM-13: 49.0%
FM-14: 49.7%
FM-15: 49.7%
FM-19: 50.9%
FM-20: 52.0%
FM-21: 46.9%
FM-22: 49.7%
FM-23: 51.7%
FM-24: 50.1%

The content of fluorine in the fluorine-containing polyfunctional monomer is 30% or more. When the content is 30% or more, a desired coating film having a low refractive index may be obtained. The content of fluorine is preferably 35% or more, more preferably 40% or more, and still more preferably 45% or more. The upper limit is not particularly limited, but usually 60% or less. Further, the "content of fluorine" mentioned in the present invention is % by mass of a fluorine atom for the molecular weight of the monomer.

The content of the fluorine-containing polyfunctional monomer (b) in the composition for a low refractive index layer is not particularly limited, but is preferably 5% by mass to 50% by mass, more preferably 10% by mass to 40% by mass, and still more preferably 10% by mass to 30% by mass, based on the total solid of the composition from the viewpoint of imparting scratch resistance and preventing the surface defect.

A fluorine-containing polyfunctional monomer having five or more —$CF_3$ groups in the molecule and a surface free energy of less than 23 mN/m when a film is formed alone may also be used in combination as long as the monomer is within a range which does not affect scratch resistance or white turbidity of the coating film of the low refractive index layer. Specific examples thereof include LINC-2A, LINC-3A and LINC-5A (all are manufactured by Kyoeisha Chemical Co., Ltd.). The content of the fluorine-containing polyfunctional monomer in the composition for a low refractive index layer is preferably 0% by mass to 20% by mass, more preferably 0% by mass to 10% by mass, and most preferably 0% (that is, not used in combination), based on the total solid of the composition.

(c) Hollow Silica Fine Particles

Hereinafter, hollow silica fine particles used in the composition for a low refractive index layer according to the present invention will be described.

The composition for a low refractive index layer according to the present invention contains hollow silica fine particles having an average particle size of 10 nm to 100 nm from the viewpoint of a low refractive index and scratch resistance.

The porosity of hollow silica fine particles is preferably 10% to 80%, more preferably 20% to 60%, and most preferably 30% to 60%, from the viewpoint of a low refractive index and scratch resistance.

The refractive index of hollow silica fine particles is preferably 1.10 to 1.40, more preferably 1.15 to 1.35, and most preferably 1.15 to 1.30. The refractive index herein represents a refractive index of entire particles, and does not represent a refractive index of only the outer shell silica forming silica particles.

The method for manufacturing hollow silica fine particles is described in, for example, Japanese Patent Application Laid-Open No. 2001-233611 or 2002-79616. In particular, as a particle having pores in the shell, a particle in which the micropores in the shell are blocked is particularly preferred. In addition, the refractive index of these hollow silica fine particles can be calculated by a method described in Japanese Patent Application Laid-Open No. 2002-79616.

In the antistatic antireflection film of an exemplary embodiment in the present invention, the amount of hollow silica fine particles coated is preferably 1 mg/$m^2$ to 100 mg/$m^2$, more preferably 5 mg/$m^2$ to 80 mg/$m^2$, and still more preferably 10 mg/$m^2$ to 60 mg/$m^2$. Within the range, the effect of a low refractive index or the effect of improving scratch resistance may be obtained, and the appearance such as denseness of black or integrated reflectance may also become satisfactory.

The average particle size of hollow silica fine particles is 10 nm to 100 nm, preferably 30 nm to 80 nm, and more preferably 40 nm to 60 nm from the viewpoint of a low refractive index, effect of improving scratch resistance, the appearance such as denseness of black, reflectance and the like. The hollow silica particles may also have a size distribution, and the coefficient of variation thereof is preferably 60% to 5%, and more preferably 50% to 10%.

The hollow silica fine particles may be either crystal or amorphous, and is preferably a monodisperse particle. The shape is most preferably a spherical diameter and may be an indeterminate form.

Further, hollow silica fine particles having different average particle sizes may be used in combination of two or more. Here, the average particle size of hollow silica fine particles may be obtained from an electronic microscopic photograph.

The hollow silica fine particles may be prepared by a method as described in [0103] to [0105] of Japanese Patent Application Laid-Open No. 2007-298974.

From the viewpoint of a low refractive index and scratch resistance, the content of the hollow silica fine particles (c) in the composition for a low refractive index layer is preferably 10% by mass to 70% by mass, more preferably 20% by mass to 50% by mass, and still more preferably 30% by mass to 50% by mass, based on the total solid of the composition.

(e) Solid Silica Fine Particles

Solid silica fine particles having an average particle size of 40 nm to 100 nm may be used in the composition for a low refractive index layer according to an exemplarly embodiment in the present invention. Abrasion resistance and the like may be improved by using the solid silica fine particles.

The average particle size is preferably 40 nm to 90 nm, and more preferably 40 nm to 80 nm. The average particle size may be obtained from an electronic microscopic photograph.

A solid silica fine particle known in the art may be used, and the shape is not limited to a spherical shape, and a particle having an indeterminate form may also be used.

From the viewpoint of abrasion resistance and a low refractive index, the content of the solid silica fine particles (e) in the composition for a low refractive index layer is 0.1% by mass to 10% by mass, preferably 2% by mass to 8% by mass, and more preferably 3% by mass to 6% by mass, based on the total solid of the composition.

[Surface Treatment Method of Silica Fine Particles]

It is preferred that the hollow silica fine particles (c) and the solid silica fine particles (e) used in the composition for forming a low refractive index layer according to an exemplary embodiment in the present invention are also subjected to surface treatment for the purpose of improving dispersibility.

It is preferred that the surface of silica fine particles is treated with a hydrolyzate of organosilane represented by the following Formula (10) and/or a partial condensate thereof, and it is more preferred that one or both of an acid catalyst and a metal chelate compound is used during the treatment.

(Organosilane Compound)

The organosilane compound which may be used in the present invention will be described in detail.

$$(R^{10})_{a1}\text{—}Si(X^{11})_{4-a1} \quad \text{Formula (10)}$$

In Formula (10), $R^{10}$ represents a substituted or unsubstituted alkyl group or a substituted or unsubstituted aryl group. Examples of the alkyl group include a methyl group, an ethyl group, a propyl group, an i-propyl group, a hexyl group, a t-butyl group, an s-butyl group, a hexyl group, a decyl group, a hexadecyl group and the like. Preferred examples of the alkyl group include an alkyl group having 1 to 30 carbon atoms, more preferred examples thereof include an alkyl group having 1 to 16 carbon atoms, and particularly preferred examples thereof include an alkyl group having 1 to 6 carbon atoms. Examples of the aryl group include a phenyl group, a naphthyl group and the like, and preferred examples thereof include a phenyl group.

$X^{11}$ represents a hydroxyl group or a hydrolyzable group. Examples of the hydrolyzable group include an alkoxy group (preferably an alkoxy group having 1 to 5 carbon atoms, for example, a methoxy group, an ethoxy group and the like), a halogen atom (for example, Cl, Br, I and the like) and a group represented by $R^{12}COO$ ($R^{12}$ is preferably a hydrogen atom or an alkyl group having 1 to 5 carbon atoms, and examples thereof include $CH_3COO$, $C_2H_5COO$ and the like), preferred examples thereof include an alkoxy group, and particularly preferred examples thereof include a methoxy group or an ethoxy group.

a1 represents an integer of 1 to 3. a1 is preferably 1 or 2, and particularly preferably 1. When a plurality of $R^{10}$ or $X^{11}$ is present, the plurality of $R^{10}$ or $X^{11}$ may be different from each other.

A substituent included in $R^{10}$ is not particularly limited, but examples thereof include a halogen atom (a fluorine atom, a chlorine atom, a bromine atom and the like), a hydroxyl group, a mercapto group, a carboxyl group, an epoxy group, an alkyl group (a methyl group, an ethyl group, an i-propyl group, a propyl group, a t-butyl group and the like), an aryl group (a phenyl group, a naphthyl group and the like), an aromatic heterocyclic group (a furyl group, a pyrazolyl group, a pyridyl group and the like), an alkoxy group (a methoxy group, an ethoxy group, an i-propoxy group, a hexyloxy group and the like), an aryloxy group (a phenoxy group and the like), an alkylthio group (a methylthio group, an ethylthio group and the like), an arylthio group (a phenylthio group and the like), an alkenyl group (a vinyl group, a 1-propenyl group and the like), an acyloxy group (an acetoxy group, an acryloyloxy group, a methacryloyloxy group and the like), an alkoxycarbonyl group (a methoxycarbonyl group, an ethoxycarbonyl group and the like), an aryloxycarbonyl group (a phenoxycarbonyl group and the like), a carbamoyl group (a carbamoyl group, an N-methylcarbamoyl group, an N,N-dimethylcarbamoyl group, an N-methyl-N-octylcarbamoyl group and the like), an acylamino group (an acetylamino group, a benzolylamino group, an acrylamino group, a methacrylamino group and the like) and the like, and such a substituent may be further substituted. Further, in the present specification, even a single atom which substitutes a hydrogen atom is counted as a substituent for the sake of convenience.

When a plurality of $R^{10}$ is present, at least one thereof is preferably a substituted alkyl group or a substituted aryl group. Among them, it is preferred that the substituted alkyl group or the substituted aryl group further has a vinyl polymerizable group, and in this case, the compound represented by Formula (10) may be represented by an organosilane compound having a vinyl polymerizable substituent represented by the following Formula (10-2).

Formula (10-2):

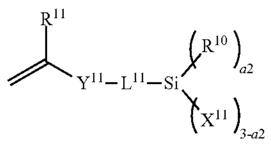

In Formula (10-2), $R^{11}$ represents a hydrogen atom, a methyl group, a methoxy group, an alkoxycarbonyl group, a cyano group, a fluorine atom or a chlorine atom. Examples of the alkoxycarbonyl group include a methoxycarbonyl group, an ethoxycarbonyl group and the like. $R^{11}$ is preferably a hydrogen atom, a methyl group, a methoxy group, a methoxycarbonyl group, a cyano group, a fluorine atom and a chlorine atom, more preferably a hydrogen atom, a methyl group, a methoxycarbonyl group, a fluorine atom and a chlorine atom, and particularly preferably a hydrogen atom and a methyl group.

$Y^{11}$ represents a single bond, an ester group, an amide group, an ether group or a urea group. $Y^{11}$ is preferably a single bond, an ester group and an amide group, more preferably a single bond or an ester group and particularly preferably an ester group.

$L^{11}$ is a divalent linking chain, and specifically a substituted or unsubstituted alkylene group, a substituted or unsubstituted arylene group, a substituted or unsubstituted alkylene group having a linking group (for example, an ether group, an ester group and an amide group) therein or a substituted or unsubstituted arylene group having a linking group therein. Among them, a substituted or unsubstituted alkylene group having 2 to 10 carbon atoms, a substituted or unsubstituted arylene group having 6 to 20 carbon atoms and an alkylene group having a linking group therein and having 3 to 10 carbon atoms are preferred, an unsubstituted alkylene group, an unsubstituted arylene group and an alkylene group having an ether linking group or an ester linking group therein are more preferred, and an unsubstituted alkylene group and an alkylene group having an ether linking group or an ester linking group therein are particularly preferred. Examples of the substituent include a halogen, a hydroxyl group, a mercapto group, a carboxyl group, an epoxy group, an alkyl group, an aryl group and the like, and these substituents may be further substituted.

a2 represents 0 or 1. When a plurality of $X^{11}$ is present, the plurality of $X^{11}$ may be the same as or different from each other. a2 is preferably 0.

$R^{10}$ has the same meaning as $R^{10}$ in Formula (10), and is preferably a substituted or unsubstituted alkyl group and an unsubstituted aryl group and more preferably an unsubstituted alkyl group and an unsubstituted aryl group. $X^{11}$ also has the same meaning as $X^{11}$ in Formula (10), and is preferably a halogen, a hydroxyl group and an unsubstituted alkoxy group, more preferably chlorine, a hydroxyl group and an unsubstituted alkoxy group having 1 to 6 carbon atoms, still more preferably a hydroxyl group and an alkoxy group having 1 to 3 carbon atoms, and particularly preferably a methoxy group.

The organosilane compound used in the present invention is also preferably represented by the following Formula (20).

$$(R_f\text{-}L^{21})_{b1}\text{-Si}(X^{21})_{b1\text{-}4} \quad \text{Formula (20)}$$

In Formula (20), $R_f$ represents a straight-chained, branched or cyclic fluorine-containing alkyl group having 1 to 20 carbon atoms or a fluorine-containing aromatic group having 6 to 14 carbon atoms. $R_f$ is preferably a straight-chained, branched or cyclic fluoroalkyl group having 3 to 10 carbon atoms, and more preferably a straight-chained fluoroalkyl group having 4 to 8 carbon atoms. $L^{21}$ represents a divalent linking group having 10 carbon atoms or less, preferably an alkylene group having 1 to 10 carbon atoms, and more preferably an alkylene group having 1 to 5 carbon atoms. The alkylene group is a straight-chained or branched and substituted or unsubstituted alkylene group which may have a linking group (for example, an ether group, an ester group and an amide group) therein. The alkylene group may have a substituent, and in this case, examples of the preferred substituent include a halogen atom, a hydroxyl group, a mercapto group, a carboxyl group, an epoxy group, an alkyl group, an aryl group and the like. $X^{21}$ has the same meaning as $X^{11}$ in Formula (1), and is preferably a halogen, a hydroxyl group and an unsubstituted alkoxy group, more preferably chlorine, a hydroxyl group and an unsubstituted alkoxy group having 1 to 6 carbon atoms, still more preferably a hydroxyl group and an alkoxy group having 1 to 3 carbon atoms, and particularly preferably a methoxy group.

b1 has the same meaning as a1 in Formula (10), and represents an integer of 1 to 3. b 1 is preferably 1 or 2, and particularly preferably 1.

Next, among the fluorine-containing silane coupling agents represented by Formula (20), a fluorine-containing silane coupling agent represented by the following Formula (20-1) is preferred.

$$C_nF_{2n+1}—(CH_2)_m—Si(X^{22})_3 \qquad \text{Formula (20-1)}$$

In Formula (20-1), n represents an integer of 1 to 10, and m represents an integer of 1 to 5. n is preferably 4 to 10, m is preferably 1 to 3, and $X^{22}$ represents a methoxy group, an ethoxy group and a fluorine atom.

Compounds represented by Formulas (1), (10-2), (20) and (20-1) may be used in combination of two or more thereof.

Specific examples of the compounds represented by Formulas (10), (10-2), (20) and (20-1) include those described in [0135] to [0144] of Japanese Patent Application Laid-Open No. 2007-298974.

In addition, disiloxane-based compounds may also be used as a surface treatment agent, and examples thereof include hexamethyldisiloxane, 1,3-dibutyltetramethyldisiloxane, 1,3-diphenyltetramethyldisiloxane, 1,3-divinyltetramethyldisiloxane, hexaethyldisiloxane, 3-glycidoxypropylpentamethyldisiloxane and the like.

In the present invention, the amount of the organosilane compound represented by Formulas (10), (10-2), (20) and (20-1) used is not particularly limited, but is preferably 1% by mass to 300% by mass, more preferably 3% by mass to 100% by mass, and most preferably 5% by mass to 50% by mass per silica fine particle. The amount is preferably 1% by mole to 300% by mole, more preferably from 5% by mole to 300% by mole, and most preferably 10% by mole to 200% by mole per hydroxyl group on the surface of the silica fine particles. When the amount of the organosilane compound used falls within the above-mentioned range, the effect of stabilizing a dispersion liquid can be sufficiently obtained, and thus the film strength at the time of forming a coating film also increases. In the present invention, it is also preferred that the organosilane compound is used in combinations of a plurality of kinds thereof, and a plurality of kinds of the compounds may be used simultaneously or may be allowed to react while delaying the addition time. Further, the addition of a plurality of kinds of the compounds after being converted into a partial condensate in advance is preferred because the reaction is easily controlled.

[Improvement in Dispersibility of Inorganic Fine Particles]

In the present invention, the dispersibility of inorganic fine particles may be improved by allowing a hydrolyzate of the organosilane compound described above and/or a partial condensate thereof to act on the surface of inorganic fine particles. It is preferred that the hydrolysis/condensation reaction of the organosilane compound is performed by adding water in an amount of 0.3 mole to 2.0 mole, and preferably 0.5 mole to 1.0 mole to 1 mole of a presence of an acid catalyst or a metal chelate compound used in the present invention.

[Catalyst for Treatment of Improving Dispersibility]

It is preferred that the treatment of improving dispersibility by a hydrolyzate of the organosilane and/or a condensation reactant thereof is performed in the presence of a catalyst. Examples of the catalyst include inorganic acids such as hydrochloric acid, sulfuric acid and nitric acid; organic acids such as oxalic acid, acetic acid, formic acid, methanesulfonic acid and toluenesulfonic acid; inorganic bases such as sodium hydroxide, potassium hydroxide and ammonia; organic bases such as triethylamine and pyridine; and metal alkoxides such as triisopropoxyaluminum and tetrabutoxyzirconium, and in terms of preparation stability or storage stability of a solution of inorganic oxide fine particles, an acid catalyst (inorganic acids and organic acids) and/or a metal chelate compound are(is) used in the present invention. The inorganic acid is preferably hydrochloric acid and sulfuric acid, more preferably hydrochloric acid and sulfuric acid, and still more preferably hydrochloric acid and sulfuric acid, and the organic acid is preferably an organic acid having an acid dissociation constant (pKa value (25° C.)) of 4.5 or less in water, more preferably an organic acid having an acid dissociation constant of 3.0 or less in water, still more preferably an organic acid having an acid dissociation constant of 2.5 or less in water, still more preferably methanesulfonic acid, oxalic acid, phthalic acid and malonic acid, and particularly preferably oxalic acid.

When the hydrolyzable group of organosilane is an alkoxy group and the acid catalyst is an organic acid, a carboxyl group or a sulfo group of the organic acid supplies a proton, and thus the amount of water added may be decreased. The amount of water added to 1 mole of an alkoxide group of the organosilane is 0 moles to 2 moles, preferably 0 moles to 1.5 moles, more preferably 0 moles to 1 mole, and particularly preferably 0 moles to 0.5 moles. Further, when an alcohol is used in the solvent, an embodiment in which water is not substantially added is appropriate.

(Metal Chelate Compound)

In the present invention, a metal chelate compound used for the treatment of improving the dispersibility by a hydrolyzate of the organosilane and/or a condensation reactant thereof is preferably at least one metal chelate compound using a metal selected from Zr, Ti or Al as a central metal, and in which an alcohol represented by the following Formula (30-1) and a compound represented by the following Formula (30-2) are used as ligands. The metal chelate compound may be appropriately used without particular limitation as long as the metal selected from Zr, Ti or Al is used as a central metal. In this category, two or more metal chelate compounds may also be used in combination.

$$R^{31}OH \qquad \text{Formula (30-1)}$$

$$R^{32}COCH_2COR^{33} \qquad \text{Formula (30-2)}$$

In the formula, $R^{31}$ and $R^{32}$ may be the same as or different from each other and represent an alkyl group having 1 to 10 carbon atoms, and $R^{33}$ represents an alkyl group having 1 to 10 carbon atoms or an alkoxy group having 1 to 10 carbon atoms.

Specific examples of the metal chelate compound appropriately used in the present invention include zirconium chelate compounds such as tri-n-butoxyethyl acetoacetate zirconium, di-n-butoxy bis(ethylacetoacetate)zirconium, n-butoxy tris(ethylacetoacetate)zirconium, tetrakis(n-propylacetoacetate)zirconium, tetrakis(acetylacetoacetate)zirconium and tetrakis(ethylacetoacetate)zirconium; titanium chelate compounds such as diisopropoxy.bis(ethylacetoacetate)titanium, diisopropoxy.bis(acetylacetate)titanium and diisopropoxy.bis(acetylacetone)titanium; aluminum chelate compounds such as diisopropoxy ethylacetoacetate aluminum, diisopropoxy acetylacetonate aluminum, isopropoxy bis(ethylacetoacetate)aluminum, isopropoxy bis(acetylacetonate) aluminum, tris(ethyl acetoacetate)aluminum, tris(acetylacetonate)aluminum and monoacetylacetonate.bis(ethylacetoacetate)aluminum.

Among these metal chelate compounds, tri-n-butoxyethyl acetoacetate zirconium, diisopropoxy bis(acetylacetonate) titanium, diisopropoxy ethylacetoacetate aluminum and tris(ethylacetoacetate)aluminum are preferred. These metal chelate compounds may be used either alone or in mixture of two or more thereof. In addition, it is also possible to use partial hydrolyzates of these metal chelate compounds. The amount of these metal chelate compounds is preferably 0.1% by mass to 10.0% by mass, more preferably 0.5% by mass to 5.0% by mass, and most preferably 1.0% by mass to 3.0% by mass, based on the organosilane compound.

[Dispersant]

In the present invention, a dispersant may also be used in order to disperse silica fine particles from a dust in solvent for preparation. In the present invention, a dispersant having an anionic group is preferably used.

The anionic group is effectively a group having an acidic proton such as a carboxyl group, a sulfonate group (sulfo), a phosphate group (phosphono) and a sulfonamide group, or a salt thereof, preferably a carboxyl group, a sulfonate group, a phosphate group or a salt thereof in particular, and particularly preferably a carboxyl group and a phosphate group. For the purpose of further improving the dispersibility, a plurality of anionic groups may be contained. On average, two or more of anionic groups are preferred, five or more are more preferred, and ten or more are particularly preferred. Further, a plurality of kinds of anionic groups, which are contained in the dispersant, may be contained within one molecule.

The dispersant may further contain a crosslinking or polymerizable functional group. Examples of the crosslinking or polymerizable functional group include an ethylenically unsaturated group capable of an addition reaction and polymerization reaction by radical species (for example, a (meth)acryloyl group, an allyl group, a styryl group, a vinyloxy group and the like), a cationic polymerizable group (an epoxy group, an oxatanyl group, a vinyloxy group and the like), a polycondensation reactive group (a hydrolyzable silyl group and the like and an N-methylol group), and the like, and preferably a functional group having an ethylenically unsaturated group.

The amount of the dispersant used is preferably 0.5% by mass to 30% by mass, more preferably 1% by mass to 20% by mass, and most preferably 2% by mass to 15% by mass, based on the silica fine particles. The range is preferred in that the improvement in dispersiblity is acknowledged and there is no adverse effect such as reduction in the strength of a coating film.

(d) Compound Having a Dimethylsiloxane Structure

Hereinafter, compounds having a dimethylsiloxane structure used in the composition for a low refractive index layer according to the present invention will be described.

It is possible to improve the surface lubricity, to have an effect on the improvement in scratch resistance of a cured coating film and to impart antifouling properties by using a compound having a dimethylsiloxane structure. The compound preferably has a reactive group such as a (meth)acryloyl group and a vinyl group.

Specific examples thereof include Silaplane, FM-7711, FM-7721, FM-7725, FM-0711, FM-0721, FM-0725, TM-0701 and TM-0701T (manufactured by JNC Corporation), X22-164A, X22-164B, X22-164C, X22-164E, X22-174DX and X22-2426 (manufactured by Shin-Etsu Chemical Co., Ltd.), UV3500, UV3510 and UV3530 (manufactured by BYK-Chemie Japan K.K), BY16-004 and SF8428 (manufactured by Dow Corning Toray Silicone Co., Ltd.), TEGO rad2300, TEGO rad2500, TEGO rad2600, TEGO rad2650 and TEGO rad2700 (manufactured by Evonik Degussa Co., Ltd.), RMS-033, RMS-044, RMS-083, UMS-182, UMS-992 and UCS-052 (manufactured by Gelest), VPS-1001 (manufactured by Wako Pure Chemical Industries, Ltd.) and the like. In particular, Silaplane, FM-7711, FM-7721, FM-7725, FM-0711, FM-0721, FM-0725, VPS-1001, TEGO rad2300, TEGO rad2500, TEGOrad2600 and RMS-033 are preferred.

From the viewpoint of antifouling properties, scratch resistance and the like, the content of the compound (d) having a dimethylsiloxane structure in the composition for a low refractive index layer is preferably 0.1% by mass to 15% by mass, more preferably 1% by mass to 10% by mass, and still more preferably 1% by mass to 5% by mass, based on the total solid of the composition.

The compound having a dimethylsiloxane structure may be used in two or more kinds thereof, and in this case, the total amount is preferably within the above-mentioned range.

The compound having a dimethylsiloxane structure is preferably at least two of a silicone compound (d-1) having a number average molecular weight of 4,000 or more and a silicone compound (d-2) having a number average molecular weight of 1,000 or more and less than 4,000 from the viewpoint of antifouling properties, compatibility with other components and the like.

(d-1) Silicone Compound Having a Number Average Molecular Weight of 4,000 or More It is possible to improve scratch resistance, antifouling properties and particularly, wipeability of an oil dye by using a silicone compound having a number average molecular weight of 4,000 or more. It is preferred that the compound has a dimethylsiloxane structure and further has at least two (meth)acryloyl groups.

Further, the number average molecular weights of the component (d-1) and the component (d-2) to be described below represent the number average molecular weights in terms of polystyrene, as measured by gel permeation chromatography using tetrahydrofuran as a solvent.

Examples of the silicone compound (d-1) include a compound having a (meth)acryloyl group at a terminal thereof, a compound having (meth)acryloyl groups at both terminals thereof or a compound having a (meth)acryloyl group at a side chain of the siloxane structure.

Examples of the compound having a (meth)acryloyl group at a terminal or both terminals of the siloxane structure include the silicone compound (d-1) represented by the following Formula (11).

(11)

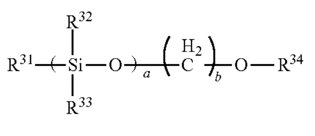

In Formula (11), each of $R^{32}$ and $R^{33}$ is independently an alkyl group having 1 to 3 carbon atoms and preferably a methyl group. Further, one or more of $R^{31}$ and $R^{34}$ are a group having a (meth)acryloyl group. It is preferred that the silicone compound represented by Formula (11) has two or more (meth)acryloyl groups.

a is an integer of 1 or more, at which the number average molecular weight of the silicone compound (d-1) is 4,000 or more, and usually an integer of 40 to 500. b is an integer of 1 to 4, and preferably 3.

The number average molecular weight of the silicone compound (d-1) is 4,000 or more, the higher the number is, the better the lubricity and the antifouling properties are, and thus, the number average molecular weight is preferably 7,000 or more, and more preferably 9,000 or more.

Examples of the compound having a (meth)acryloyl group at a side chain of the siloxane structure include a compound configured by including a structural unit represented by the following Formula (12) and a structural unit represented by the following Formula (13) and having at least three of a structural unit represented by the following Formula (13).

(12)

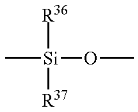

In Formula (12), each of $R^{36}$ and $R^{37}$ is independently an alkyl group having 1 to 3 carbon atoms, and preferably a methyl group.

(13)

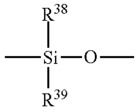

In Formula (13), $R^{38}$ is an alkyl group having 1 to 3 carbon atoms, and preferably a methyl group. In addition, $R^{39}$ is a group having at least one (meth)acryloyl group.

Examples of the silicone compound (d-1) include Rad2600, FM-7721, FM-7725, FM-0721, FM-0725, X22-174DX, X22-2426, X22-164C, X22-164E and the like.

The content of the component (d-1) in the composition for a low refractive index layer is not particularly limited, but is preferably 0.1% by mass to 15% by mass, more preferably 1% by mass to 10% by mass, and still more preferably 1% by mass to 5% by mass, based on the total solid of the composition from the viewpoint of scratch resistance and antifouling properties.

(d-2) Silicone Compound Having a Number Average Molecular Weight of 1,000 or More and Less than 4,000

It is possible to improve the compatibility of a silicone compound having a number average molecular weight of 1,000 or more and less than 4,000 with other components such as (a) to (d) while maintaining the scratch resistance or antifouling properties of a cured film obtained by the silicone compound (d-1).

The silicone compound (d-2) preferably has a siloxane structure and two or more (meth)acryloyl groups.

Examples of a commercially available product which may be used as the silicone compound (d-2) include Rad2500 and Rad2300 (all are manufactured by Evonik Degussa Co., Ltd.), FM-7711 and FM-0711 (manufactured by JNC Corporation), X22-164A, X22-164B and X22-164AS (manufactured by Shin-Etsu Chemical Co., Ltd.) and the like.

The content of the component (d-2) in the composition for a low refractive index layer is not particularly limited, but is preferably 0.1% by mass to 10% by mass, more preferably 0.1% by mass to 5% by mass, and still more preferably 0.1% by mass to 1% by mass, based on the total solid of the composition from the viewpoint of compatibility.

The ratio of the silicone compound (d-1) and the silicone compound (d-2) is preferred when the amount of the silicone compound (d-1) is higher than that of the silicone compound (d-2), and the mass ratio of the silicone compound (d-1):the silicone compound (d-2) is more preferably a value in a range of 4:1 to 1:1, and still more preferably a value in a range of 2:1 to 1:1.

(f) Fluorine-Free Polyfunctional Monomer

In the composition for a low refractive index layer according to an exemplarly embodiment in the present invention, it is possible to use a fluorine-free polyfunctional monomer which does not include a fluorine atom and has at least three reactive functional groups or more in a molecule thereof.

The affinity of the ethylenically unsaturated group-containing fluoropolymer (fluorine polymer) (a) with the hollow silica particles (c) can be improved by using a fluorine-free polyfunctional monomer, thereby increasing the strength of the coating film and making scratch resistance satisfactory.

In order to decrease the refractive index of the low refractive index layer, increasing the content of fluorine in the fluoropolymer is a way of decreasing the density of the crosslinking group in the film, and there are concerns that the strength of the coating film may be decreased and the scratch resistance may deteriorate. Further, for a low refractive index, a polymer having a high content of fluorine and the hollow silica fine particles (c) are used in combination in the low refractive index layer and the difference in surface energies of both sides is great, and thus since the wettability of the particle surface is low, the fluoropolymer may not cover the surface of particles and the strength of the coating film after being cured is easily decreased when a coating liquid including a solvent is coated and dried to form a low refractive index layer. This phenomenon is significant according to the increase in content of fluorine in the fluoropolymer and in content of particles in the layer. In particular, the curing of the film surface layer which is susceptible to polymerization inhibition by oxygen during curing tends to become weaker. These may be improved by using the fluorine-free polyfunctional monomer.

Examples of the reactive functional group include groups exemplified in the fluorine-containing polyfunctional monomer (b) as described above, and among them, a (meth) acryloyl group is particularly preferred.

Examples of the fluorine-free polyfunctional monomer include pentaerythritol tetra(meth)acrylate, pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth) acrylate, ditrimethylolpropane tetra(meth)acrylate, dipentaerythritol tetra(meth)acrylate, dipentaerythritol penta (meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate, caprolactone-modified tris(acryloxyethyl)isocyanurate and the like.

Examples of specific compounds of polyfunctional acrylate-based compounds having a (meth)acryloyl group include esterficates of polyols and (meth)acrylic acids, such as KAYARAD DPHA, DPHA-2C, PET-30, TMPTA, TPA-320, TPA-330, RP-1040, T-1420, D-310, DPCA-20, DPCA-30, DPCA-60 and GPO-303, manufactured by Nippon Kayaku Co., Ltd., and V#3PA, V#400, V#36095D, V#1000 and V#1080, manufactured by Osaka Organic Chemical Industry Ltd. Further, it is also possible to appropriately use a tri- or higher functional urethane acrylate compound such as SHIKOH UV-1400B, UV-1700B, UV-6300B, UV-7550B, UV-7600B, UV-7605B, UV-7610B, UV-7620EA, UV-7630B, UV-7640B, UV-6630B, UV-7000B, UV-7510B, UV-7461TE, UV-3000B, UV-3200B, UV-3210EA, UV-3310EA, UV-3310B, UV-3500BA, UV-3520TL, UV-3700B, UV-6100B, UV-6640B, UV-2000B, UV-2010B, UV-2250EA and UV-2750B (manufactured by Nippon Synthetic Chemical Industry Co., Ltd.), UL-503LN (Kyoeisha Chemical Co., Ltd.), UNIDICK 17-806, 17-813, V-4030 and V-4000BA (manufactured by DAINIPPON INK AND CHEMICALS Inc.), EB-1290K, EB-220, EB-5129, EB-1830 and EB-4858 (manufactured by Daicel UCB Co., Ltd.), HI-Coap AU-2010 and AU-2020 (manufactured by TOKUSHIKI Co., Ltd.), ARONIX M-1960 (manufactured by TOAGOSEI Co., Ltd.), Artresin UN-3320HA, UN-3320HS, UN-904, HDP-4T, and a tri- or higher functional polyester such as ARONIX M-8100, M-8030, M-9050 (manufactured by TOAGOSEI Co., Ltd.), and KRM-8307 (manufactured by DAICEL-CYTEC Co., Ltd.).

Further, examples thereof also include resins having three or more (meth)acryloyl groups, for example, relatively low-molecular weight polyester resins, polyether resins, acrylic resins, epoxy resins, urethane resins, alkyd resins, spiro acetal resins, polybutadiene resins, polythiol polyene resins, oligomers or prepolymers of a polyfunctional compound such as polyhydric alcohols, and the like.

The content of the fluorine-free polyfunctional monomer (f) in the composition for a low refractive index layer is preferably 1% by mass to 30% by mass, more preferably 1% by mass to 20% by mass, and particularly preferably 3% by mass to 10% by mass, based on the total solid of the composition. The range is preferred from the viewpoint of increase in hardness of the low refractive index layer itself, fixation of an antifouling agent on the surface layer of the low refractive index layer, improvement in interface adhesion with the adjacent layer and the like.

[Polymerization Initiator]

The composition for a low refractive index layer may also contain a photoradical initiator or a thermoradical initiator in order to polymerize a compound having an ethylenically unsaturated group or a reactive functional group, such as components (a), (b), (f) and (g) as described above. These initiators may be used to perform polymerization by irradiation of ionizing radiation or heat.

Examples of the photoradical polymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds or aromatic sulfoniums. Examples of the acetophenones include 2,2-diethoxyacetophenone, p-dimethylacetophenone, 1-hydroxydimethyl phenyl ketone, 1-hydroxycyclohexyl phenyl ketone, 2-methyl-4-methylthio-2-morpholinopropiophenone and 2-benzyl-2-dimethylamino-1-(4-morpholinophenyl)-butanone. Examples of the benzoins include benzoin benzenesulfonic acid ester, benzoin toluenesulfonic acid ester, benzoin methyl ether, benzoin ethyl ether and benzoin isopropyl ether. Examples of the benzophenones include benzophenone, 2,4-dichlorobenzophenone, 4,4-dichlorobenzophenone and p-chlorobenzophenone. Examples of the phosphine oxides include 2,4,6-trimethylbenzoyl diphenylphosphine oxide.

Various examples are described even in Latest UV Curing Technologies (p. 159, issuer; Kazuhiro Takasusuki, publishing office; Technical Information Institute Co., Ltd., published in 1991) and useful in the present invention. Preferred examples of a commercially available photo-fragmentation type photoradical polymerization initiator include Irgacure (651, 184, 907 and 127) manufactured by Nippon Ciba-Geigy, Ltd and the like.

The photopolymerization initiator is used in an amount of preferably in the range of 0.1 parts by mass to 15 parts by mass, and more preferably 1 part by mass to 10 parts by mass based on 100 parts by mass of a polyfunctional monomer.

In addition to the photopolymerization initiator, a photosensitization agent may also be used. Specific examples of the photosensitization agent include n-butylamine, triethylamine, tri-n-butylphosphine, Michler's ketone and thioxanetone.

As the thermoradical initiator, organic or inorganic peroxides, organic azo and diazo compounds and the like may be used.

Specifically, examples of the organic peroxides include benzoyl peroxide, halogenbenzoyl peroxide, lauroyl peroxide, acetyl peroxide, dibutyl peroxide, cumene hydroperoxide and butyl hydroperoxide, examples of the inorganic peroxides include hydrogen peroxide, ammonium persulfate, potassium persulfate and the like, examples of the azo compounds include 2-azo-bis-isobutyronitrile, 2-azo-bis-propionitrile, 2-azo-bis-cyclohexanedinitrile and the like, and examples of the diazo compounds include diazoaminobenzene, p-nitrobenzenediazonium and the like.

Hereinafter, a composition for a hardcoat layer used in the antistatic antireflection film of the present invention will be described.

<Composition for Hardcoat Layer>

(Compound Having a Quaternary Ammonium Salt Group)

The composition for forming a hardcoat layer in the present invention contains a compound having a quaternary ammonium salt group.

As the compound having a quaternary ammonium salt group, any one of low molecular type compounds or high molecular type compounds may be used, and a high molecular type cation compound is more preferably used in that there is no variation in antistatic properties by bleed out and the like.

As the high molecular type cation compound having a quaternary ammonium salt group, a compound may be appropriately selected from the known compounds and used, and from the viewpoint of high ion conductivity, a quaternary ammonium salt group-containing polymer is preferred and a polymer having at least one unit from structural units represented by the following Formulas (I) to (III) is preferred.

Formula (I)

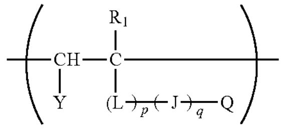

In Formula (I), $R_1$ represents a hydrogen atom, an alkyl group, a halogen atom or $—CH_2COO^-M^+$. Y represents a hydrogen atom or $—COO^-M^+$. $M^+$ represents a proton or a cation. L represents —CONH—, —COO—, —CO— or —O—. J represents an alkylene group, an arylene group or a group composed of a combination thereof. Q represents a group selected from the following group A.

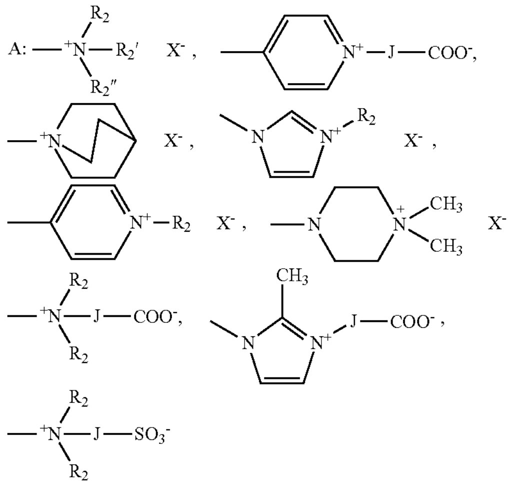

In the formula, each of $R_2$, $R_2'$ and $R_2''$ independently represents an alkyl group. J represents an alkylene group, an arylene group or a group composed of a combination thereof. $X^-$ represents an anion. Each of p and q independently represents 0 or 1.

Formula (II)

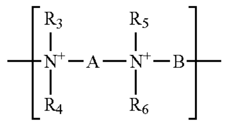

Formula (VI)

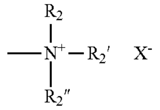

In Formulas (II) and (III), each of $R_3$, $R_4$, $R_5$ and $R_6$ independently represents an alkyl group and $R_3$ and $R_4$ and $R_5$ and $R_6$ may be combined with each other to form a nitrogen-containing heterocyclic ring.

Each of A, B and D independently represents an alkylene group, an arylene group, an alkenylene group, an aryleneakylene group, $—R_7COR_8—$, $—R_9COOR_{10}OCOR_{11}—$, $—R_{12}OCR_{13}COOR_{14}—$, $—R_{15}—(OR_{16})_m—$, $—R_{17}CONHR_{18}NHCOR_{19}—$, $—R_{20}OCONHR_{21}NHCOR_{22}—$ or $—R_{23}NHCONHR_{24}NHCONHR_{25}—$. E represents a single bond, an alkylene group, an arylene group, an alkenylene group, an arylenealkylene group, $—R_7COR_8—$, $—R_9COOR_{10}OCOR_{11}—$, $—R_{12}OCR_{13}COOR_{14}—$, $—R_{15}—(OR_{16})_m—$, $—R_{17}CONHR_{18}NHCOR_{19}—$, $—R_{20}OCONHR_{21}NHCOR_{22}—$ or $—R_{23}NHCONHR_{24}NHCONHR_{25}—$ or $—NHCOR_{26}CONH—$. $R_7$, $R_8$, $R_9$, $R_{11}$, $R_{12}$, $R_{14}$, $R_{15}$, $R_{16}$, $R_{17}$, $R_{19}$, $R_{20}$, $R_{22}$, $R_{23}$, $R_{25}$ and $R_{26}$ represent an alkylene group. Each of $R_{10}$, $R_{13}$, $R_{18}$, $R_{21}$ and $R_{24}$ independently represents a linking group selected from an alkylene group, an alkenylene group, an arylene group, an arylenealkylene group and an alkylenearylene group. m represents a positive integer of 1 to 4. $X^-$ represents an anion.

$Z_1$ and $Z_2$ represent a nonmetallic atom group necessary for forming a 5- or 6-membered ring together with an —N═C— group and may be linked to E in a quaternary salt form of $═N^+[X^-]$.

n represents an integer of 5 to 300.

The groups of Formulas (I) to (III) will be described.

Examples of the halogen atom include a chlorine atom and a bromine atom, and a chlorine atom is preferred.

The alkyl group is preferably a branched or straight-chained alkyl group having 1 to 4 carbon atoms, and more preferably a methyl group, an ethyl group and a propyl group.

The alkylene group is preferably an alkylene group having 1 to 12 carbon atoms, more preferably a methylene group, an ethylene group and a propylene group, and particularly preferably an ethylene group.

The arylene group is preferably an arylene group having 6 to 15 carbon atoms, more preferably phenylene, diphenylene, a phenylmethylene group, a phenyldimethylene group and a naphthylene group, and particularly preferably a phenylmethylene group. These groups may be substituted.

The alkenylene group is preferably an alkylene group having 2 to 10 carbon atoms, the arylenealkylene group is preferably an arylenealkylene group having 6 to 12 carbon atoms, and these groups may be substituted.

Examples of the substituent which may be substituted with each group include a methyl group, an ethyl group, a propyl group and the like.

In Formula (I), $R_1$ is preferably a hydrogen atom or a methyl group.

Y is preferably a hydrogen atom.

L is preferably —COO—.

J is preferably a phenylmethylene group, a methylene group, an ethylene group and a propylene group.

Q is preferably the following Formula (VI) selected from the group A, in which each of $R_2$, $R_2'$ and $R_2''$ is a methyl group.

Examples of $X^-$ include a halogen ion, a sulfonate anion, a carboxylate anion and the like, and $X^-$ is preferably a halogen ion and more preferably a chlorine ion.

p and q are preferably 0 or 1, and more preferably, p=1 and q=1.

Formula (VI)

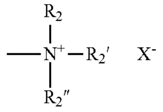

In Formulas (II) and (III), $R_3$, $R_4$, $R_5$ and $R_6$ are preferably a substituted or unsubstituted alkyl group having 1 to 4 carbon atoms, more preferably a methyl group and an ethyl group, and particularly preferably a methyl group.

Each of A, B and D independently represents preferably a substituted or unsubstituted alkylene group, arylene group, alkenylene group and arylenealkylene group having 2 to 10 carbon atoms, and is preferably a phenyldimethylene group.

Examples of $X^-$ include a halogen ion, a sulfonate anion, a carboxylate anion and the like, and $X^-$ is preferably a halogen ion and more preferably a chlorine ion.

E represents preferably a single bond, an alkylene group, an arylene group, an alkenylene group and an arylenealkylene group.

Examples of the 5- or 6-membered ring formed by $Z_1$ or $Z_2$ together with an —N═C— group include a diazoniabicyclooctane ring and the like.

Specific examples of the compound having a structural unit represented by Formulas (I) to (III) will be illustrated below, but the present invention is not limited thereto. Further, in the following specific examples, out of subscripts (m, x, y, r and actual numerical values), m represents the number of repeating units in each unit, and each of x, y and r represents the molar ratio of each unit.

IP-1

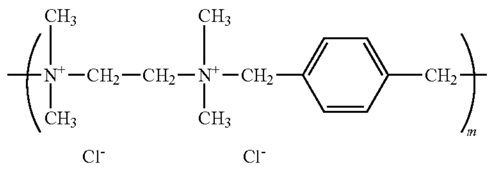

m ≈ 50

IP-2

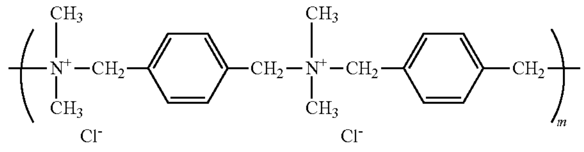

m ≈ 35

IP-3

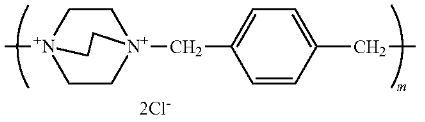

m ≈ 50

IP-4

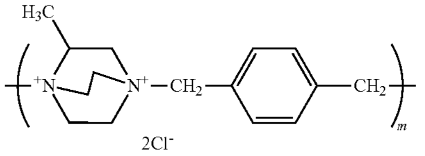

m ≈ 50

IP-5

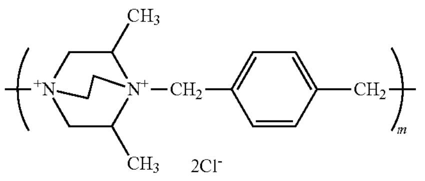

m ≈ 50

IP-6

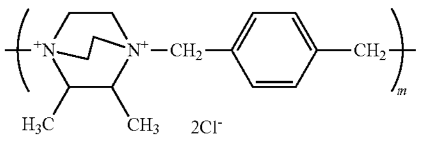

m ≈ 50

-continued

IP-7

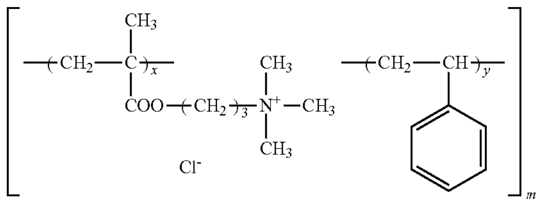

x:y = 60:40
m ≈ 80

IP-8

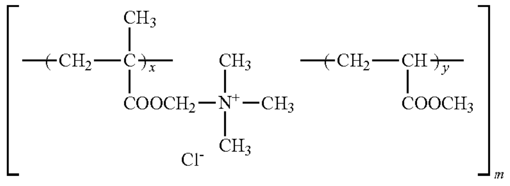

x:y =70:30
m ≈ 80

IP-9

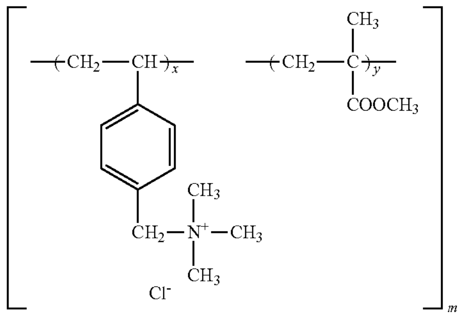

x:y = 50:50
m ≈ 80

IP-10

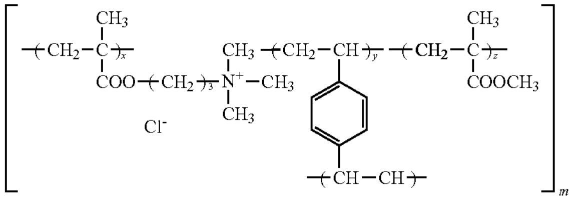

x:y:z = 50:4:46
m ≈ 80

IP-11

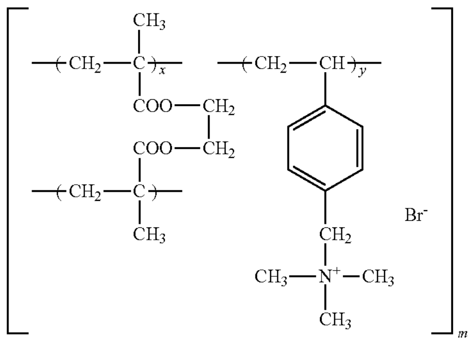

x:y = 5:95
m ≈ 60

-continued

IP-12

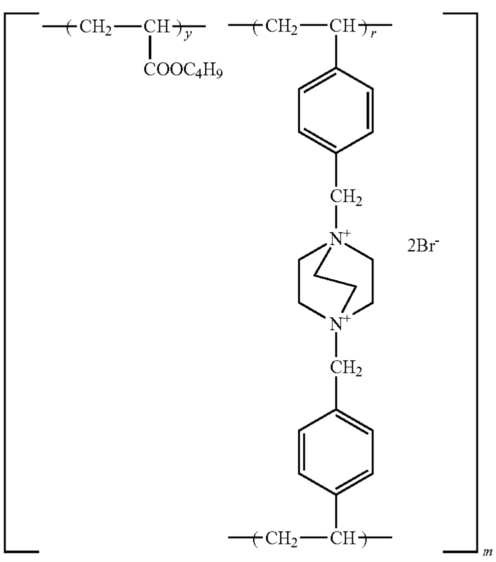

y:r = 7:93
m ≈ 30

IP-13

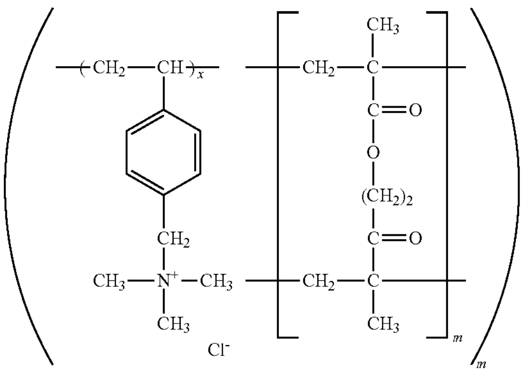

x:y = 93:7
m ≈ 30

The electrically conductive compounds illustrated above may be used either alone or in combination of two or more thereof. In addition, an antistatic compound having a polymerizable group in the molecule of the antistatic agent may increase the scratch resistance (film strength) of the antistatic layer, and thus is more preferred.

As a compound having a quaternary ammonium salt group, a commercially available product may also be used, and examples thereof include the product name "Light-Ester DQ-100" (manufactured by Kyoeisha Chemical Co., Ltd.), the product name "LIODURAS LAS-1211" (manufactured by Toyo Ink Co., Ltd.), the product name "SHIKOH UV-AS-102" (manufactured by Nippon Synthetic Chemical Industry Co., Ltd.), "NK Oligo U-601, 201" (manufactured by Shin Nakamura Chemical Co., Ltd.) and the like.

The quaternary ammonium salt group-containing polymer may also have a polymerization unit in addition to the structural unit represented by Formulas (I) to (III) (ionic structural unit). By allowing the compound having a quaternary ammonium salt group to have a polymerization unit in addition to the ionic structural unit, solubility in a solvent or compatibility with a compound having an unsaturated double bond or a photopolymerization initiator may be enhanced when a composition is prepared.

The polymerization unit other than the above-mentioned (I) to (III) is not particularly limited, but examples thereof include a polymerization unit selected from compounds having an alkylene oxide chain such as polyethylene glycol mono(meth)acrylate, polypropylene glycol mono(meth) acrylate, polybutylene glycol mono(meth)acrylate, poly(ethylene glycol-propylene glycol) mono(meth)acrylate, poly (ethylene glycol-tetramethylene glycol) mono(meth) acrylate, poly(propylene glycol-tetramethylene glycol) mono(meth)acrylate, polyethylene glycol mono(meth)acrylate monomethyl ether, polyethylene glycol mono(meth) acrylate monobutyl ether, polyethylene glycol mono(meth) acrylate monooctyl ether, polyethylene glycol mono(meth) acrylate monobenzyl ether, polyethylene glycol mono(meth) acrylate monophenyl ether, polyethylene glycol mono(meth) acrylate monodecyl ether, polyethylene glycol mono(meth) acrylate monododecyl ether, polyethylene glycol mono (meth)acrylate monotetradecyl ether, methyl(methy) acrylate, ethyl(meth)acrylate, propyl(meth)acrylate, polyethylene glycol mono(meth)acrylate monohexadecyl ether, polyethylene glycol mono(meth)acrylate monooctadecyl ether, poly(ethylene glycol-propylene glycol) mono (meth)acrylate octyl ether, poly(ethylene glycol-propylene glycol) mono(meth)acrylate octadecyl ether and poly(ethylene glycol-propylene glycol) mono(meth)acrylate nonylphenyl ether; alkyl (meth)acrylates such as methyl (meth) acrylate, ethyl (meth)acrylate, propyl (meth)acrylate, butyl (meth)acrylate, 2-ethylhexyl (meth)acrylate, dodecyl (meth) acrylate and octadecyl (meth)acrylate; hydroxyalkyl (meth) acrylates such as hydroxyethyl (meth)acrylate, hydroxypropyl (meth)acrylate and hydroxybutyl (meth)acrylate; various (meth)acrylates such as benzyl (meth)acrylate, cyclohexyl (meth)acrylate, isobornyl (meth)acrylate, dicyclopentenyl (meth)acrylate, dicyclopentenyloxyethyl (meth)acrylate, ethoxyethyl (meth)acrylate, ethylcarbitol (meth)acrylate, butoxyethyl (meth)acrylate, cyanoethyl (meth)acrylate and glycidyl (meth)acrylate; styrene; methylstyrene; and a combination thereof.

From the viewpoint that the amount is large enough to impart antistatic property and less likely to impair the film hardness, the content of the compound having a quaternary ammonium salt group in the composition for forming a hardcoat layer of the present invention is preferably 1% by mass to 30% by mass, more preferably 3% by mass to 20% by mass, and still more preferably 5% by mass to 15% by mass, based on the total solid in the composition for forming a hardcoat layer.

[Compound Having an Unsaturated Double Bond]

The composition for a hardcoat layer according to the present invention may contain a compound having an unsaturated double bond.

The compound having an unsaturated double bond may function as a binder and is preferably a polyfunctional monomer having two or more polymerizable unsaturated groups. The polyfunctional monomer having two or more polymerizable unsaturated groups may function as a curing agent and makes it possible to improve the strength or scratch resistance of the coating film. The number of polymerizable unsaturated groups is more preferably 3 or more.

Examples of the compound having an unsaturated double bond include compounds having a polymerizable functional group such as a (meth)acryloyl group, a vinyl group, a styryl group and an allyl group, and among them, a (meth)acryloyl group and $-C(O)OCH{=}CH_2$ are preferred. The following compounds containing three or more (meth)acryloyl groups in a molecule may be particularly preferably used.

Specific examples of the compound having a polymerizable unsaturated bond include (meth)acrylic acid diesters of alkylene glycol, (meth)acrylic acid diesters of polyoxyalkylene glycol, (meth)acrylic acid diesters of polyhydric alcohol, (meth)acrylic acid diesters of ethylene oxide or propylene oxide adduct, epoxy (meth)acrylates, urethane (meth) acrylates, polyester (meth)acrylates and the like.

Among them, esters of a polyhydric alcohol with a (meth)acrylic acid are preferred. Examples thereof include 1,4-butanediol di(meth)acrylate, 1,6-hexanediol di(meth) acrylate, neopentyl glycol (meth)acrylate, ethylene glycol di(meth)acrylate, triethylene glycol di(meth)acrylate, pentaerythritol tetra(meth)acrylate, pentaerythritol tri(meth) acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa (meth)acrylate, 1,2,3-cyclohexane tetramethacrylate, polyurethane polyacrylate, polyester polyacrylate, caprolactone-modified tris(acryloxyethyl)isocyanurate and the like.

Commercially available polyfunctional acrylate-based compounds having a (meth)acryloyl group may also be used, and examples thereof include KAYARAD DPHA and PET-30, manufactured by NIPPON KAYAKU Co., Ltd., NK Ester A-TMMT and NK Ester A-TMPT, manufactured by Shin Nakamura Chemical Co., Ltd, and the like.

A fluorine-free polyfunctional monomer is described in paragraphs [0114] to [0122] of Japanese Patent Application Laid-Open No. 2009-98658, and the same applies to the present invention.

In order to give a sufficiently high polymerization rate to impart hardness and the like, the content of the compound having an unsaturated double bond in the composition for forming a hardcoat layer according to an exemplarly embodiment in the present invention is preferably 40% by mass to 98% by mass, and more preferably 60% by mass to 95% by mass, based on the total solid in the composition for forming an antistatic hardcoat layer.

[Photopolymerization Initiator]

The composition for a hardcoat layer according to an exemplarly embodiment in the present invention may contain a photopolymerization initiator.

Examples of the photopolymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borates, active esters, active halogens, inorganic complexes, coumarins and the like. Specific examples, preferred embodiments and commercially available products of the photopolymerization initiator are described in paragraphs [0133] to [0151] of Japanese Patent Application Laid-Open No. 2009-098658, and these may be appropriately used even in the present invention.

Various examples are described also in "Latest UV Curing Technologies" {Technical Information Institute Co., Ltd.} (1991), p. 159, and "Ultraviolet Curing System" written by Kiyomi Kato (1989, published by United Engineering Center), pp. 65 to 148, and these are useful in the present invention.

For the reason of setting the amount to be large enough to polymerize a polymerizable compound contained in the composition for a hardcoat layer and sufficiently small to prevent initiation sites from excessively increasing, the content of the photopolymerization initiator in the composition for a hardcoat layer according to an exemplarly embodiment in the present invention is preferably 0.5% by mass to 8% by mass, and more preferably 1% by mass to 5% by mass, based on the total solid in the composition for a hardcoat layer.

(Solvent)

The composition for forming an antistatic hardcoat layer may also contain various organic solvents.

In the present invention, from the viewpoint of obtaining compatibility with the ion-conducting compound, the composition preferably includes a hydrophilic solvent. Examples of the hydrophilic solvent includes an alcohol-based solvent, a carbonate-based solvent, an ester-based solvent and the like, and examples thereof include methanol, ethanol, isopropanol, n-butyl alcohol, cyclohexyl alcohol, 2-ethyl-1-hexanol, 2-methyl-1-hexanol, 2-methoxyethanol, 2-propoxyethanol, 2-butoxyethanol, diacetone alcohol, dimethyl carbonate, diethyl carbonate, diisopropyl carbonate, methyl ethyl carbonate, methyl n-propyl carbonate, ethyl formate, propyl formate, pentyl formate, methyl acetate, ethyl acetate, propyl acetate, methyl propionate, ethyl propionate, ethyl 2-ethoxypropionate, methyl acetoacetate, ethyl acetoacetate, methyl 2-methoxyacetate, methyl 2-ethoxyacetate, ethyl 2-ethoxyacetate, acetone, 1,2-diacetoxyacetone, acetylacetone and the like. These solvents may be used either alone or in combination of two or more thereof.

Further, a solvent other than those described above may also be used. Examples of the solvent include an ether-based solvent, a ketone-based solvent, an aliphatic hydrocarbon-based solvent, an aromatic hydrocarbon-based solvent and the like. Examples thereof include dibutyl ether, dimethoxyethane, diethoxyethane, propylene oxide, 1,4-dioxane, 1,3-dioxolane, 1,3,5-trioxane, tetrahydrofuran, anisole, phenetole, methyl ethyl ketone (MEK), diethyl ketone, dipropyl ketone, diisobutyl ketone, cyclopentanone, cyclohexanone, methylcyclohexanone, methyl isobutyl ketone, 2-octanone, 2-pentanone, 2-hexanone, ethylene glycol ethyl ether, ethylene glycol isopropyl ether, ethylene glycol butyl ether, propylene glycol methyl ether, ethyl carbitol, butyl carbitol, hexane, heptane, octane, cyclohexane, methylcyclohexane, ethylcyclohexane, benzene, toluene, xylene and the like. These solvents may be used either alone or in combination of two or more thereof.

The solvent is preferably used such that the concentration of the solid in the composition for a hardcoat layer according to the present invention is in a range of 20% by mass to 80% by mass, more preferably 30% by mass to 75% by mass, and most preferably 40% by mass to 70% by mass.

(Surfactant)

In the composition for a hardcoat layer according to an exemplarly embodiment in the present invention, it is also appropriate to use various surfactants. In general, the surfactant may suppress unevenness in film thickness or the like due to drying unevenness caused by local distribution of drying air or may reduce surface unevenness of the antistatic layer or cissing of the coating material. Further, the surfactant is appropriate because in some cases, more stable and higher electrical conductivity may be developed by enhancing the dispersibility of an antistatic compound.

Specifically, the surfactant is preferably a fluorine-based surfactant or a silicone-based surfactant. In addition, as the surfactant, an oligomer or a polymer is better than a low molecular compound.

When a surfactant is added, the surfactant swiftly moves and is localized to the surface of the coated liquid film and after drying of the film, the surfactant remains localized on the surface as it is, and thus the surface energy of the hardcoat layer to which a surfactant is added is decreased by the surfactant. From the viewpoint of preventing unevenness in film thickness, cissing or unevenness of the hardcoat layer, the surface energy of the film is preferably low.

From the viewpoint of preventing point defects caused by particularly, cissing, unevenness and the like, the fluorine-based surfactant is preferably a fluoroaliphatic group-containing copolymer including a repeating unit derived from a monomer containing a fluoroaliphatic group represented by the following Formula (F1) and a repeating unit derived from a monomer which does not contain a fluoroaliphatic group represented by the following Formula (F2).

Formula (F1)

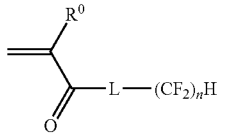

In the formula, $R^0$ represents a hydrogen atom, a halogen atom or a methyl group. L represents a divalent linking group. n represents an integer of 1 to 18.

Formula (F2)

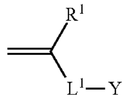

In the formula, $R^1$ represents a hydrogen atom, a halogen atom or a methyl group. $L_1$ represents a divalent linking group. Y represents a straight-chained, branched or cyclic alkyl group having 1 to 20 carbon atoms, which may be substituted, or an aromatic group which may be substituted.

A monomer containing the fluoroaliphatic group represented by Formula (F1) is also preferably a monomer containing a fluoroaliphatic group represented by the following Formula (F1-1).

Formula (F1)

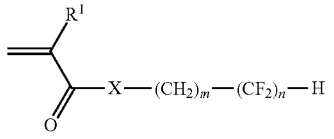

In the formula, $R^1$ represents a hydrogen atom, a halogen atom or a methyl group. X represents an oxygen atom, a sulfur atom or —N($R^2$)—. n represents an integer of 1 to 6. n represents an integer of 1 to 18. $R^2$ represents a hydrogen atom or an alkyl group having 1 to 8 carbon atoms, which may be substituted.

Preferred embodiments and specific examples of the fluoroaliphatic group-containing copolymer are described in paragraphs [0023] to [0080] of Japanese Patent Application Laid-Open No. 2007-102206, and the same applies to the present invention.

Preferred examples of the silicone-based surfactant include surfactants including a plurality of dimethylsilyloxy units as a repeating unit and having a substituent at the terminal and/or in the side chain of the compound chain. The compound chain including dimethylsilyloxy as a repeating unit may also include a structural unit other than dimethylsilyloxy. The substituents may be the same as or different from each other, and the compound preferably has a plurality of substituents. Preferred examples of the substituent include a group including a polyether group, an alkyl group, an aryl group, an aryloxy group, a cinnamoyl group, an oxetanyl group, a fluoroalkyl group, a polyoxyalkylene group and the like.

The molecular weight is not particularly limited but is preferably 100,000 or less, more preferably 50,000 or less, particularly preferably 1,000 to 30,000, and most preferably 1,000 to 20,000.

Preferred examples of the silicone-based compound include, but are not limited to, "X-22-174DX", "X-22-2426", "X22-164C" and "X-22-176D" (all trade names), manufactured by Shin Etsu Chemical Co., Ltd.; "FM-7725", "FM-5521" and "FM-6621" (all trade names), manufactured by Chisso Corp.; "DMS-U22" and "RMS-033" (both trade names), manufactured by Gelest; "SH200", "DC11PA", "ST80PA", "L7604", "FZ-2105", "L-7604", "Y-7006" and "SS-2801" (all trade names), manufactured by Dow Corning Toray Silicone Co., Ltd.; and "TSF400" (trade name), manufactured by Momentive Performance Materials Japan, Inc, and the like.

The surfactant is contained in an amount of preferably 0.01% by mass to 0.5% by mass, and more preferably 0.01% by mass to 0.3% by mass, based on the total solid of the coating composition for a hardcoat layer.

[Antistatic Antireflection Film]

Hereinafter, the optical film of the present invention will be described.

The antistatic antireflection film of an exemplarly embodiment in the present invention has, on a transparent support, a hardcoat layer (antistatic hardcoat layer) formed by using the above-mentioned composition for a hardcoat layer, and a low refractive index layer formed by using the above-mentioned composition for a low refractive index layer on the hardcoat layer.

The antistatic antireflection film of an exemplarly embodiment in the present invention may be further provided with one functional layer alone or a plurality of functional layers as required according to the purpose.

[Transparent Support]

In the antistatic antireflection film of an exemplarly embodiment in the present invention, various materials may be used as a transparent support, but it is preferred to use a substrate including a cellulose-based polymer, and it is more preferred to use a cellulose acylate film.

The cellulose acylate film is not particularly limited, but in the case of disposing the film in a display, a cellulose triacetate film may be used as it is as a protective film for protecting a polarizing layer of a polarizing plate, and thus a cellulose triacetate film is particularly preferred in terms of productivity or cost.

The thickness of the cellulose acylate film is usually 25 μm to 1,000 μm but is preferably 40 μm to 200 μm, in that good handleability and required substrate strength may be obtained.

In the present invention, a cellulose acetate having a degree of acetylation of 59.0% to 61.5% is preferably used for the cellulose acylate film. The degree of acetylation means the amount of acetic acid bonded per unit weight of cellulose. The degree of acetylation is determined according to the measurement and calculation of a degree of acetylation in ASTM: D-817-91 (Test Method of Cellulose Acetate and the like). The viscosity average degree of polymerization (DP) of the cellulose acylate is preferably 250 or more, and more preferably 290 or more.

Further, in the cellulose acylate used in an exemplarly embodiment in the present invention, the Mw/Mn (Mw is a weight average molecular weight and Mn is a number average molecular weight) value measured by gel permeation chromatography is preferably close to 1.0, in other words, the molecular weight distribution is preferably narrow. Specific values of Mw/Mn preferably range of 1.0 to 1.7, more preferably 1.3 to 1.65, and most preferably 1.4 to 1.6.

In general, the hydroxyl groups at 2-, 3- and 6-positions of the cellulose acylate are not distributed equally as each ⅓ of the entire degree of substitution, but the degree of substitution of the hydroxyl group at 6-position tends to be small. In the present invention, the degree of substitution of the hydroxyl group at 6-position of the cellulose acylate is preferably large as compared with 2- or 3-position.

The hydroxyl group at 6-position is preferably substituted by an acyl group in a ratio of 32% or more, more preferably 33% or more, and particularly preferably 34% or more, based on the entire degree of substitution degree. Further, the degree of substitution for the acyl group at 6-position of cellulose acylate is preferably 0.88 or more. The hydroxyl group at 6-position may be substituted, in addition to the acetyl group, by an acyl group having 3 or more carbon atoms, such as propionyl group, a butyroyl group, a valeroyl group, a benzoyl group and an acryloyl group. The degree of substitution at each position may be determined by NMR.

In the present invention, a cellulose acetate obtained by methods as described in Example and Synthesis Example 1 in paragraphs [0043] to [0044], Synthesis Example 2 in paragraphs [0048] to [0049], and Synthesis Example 3 in paragraphs [0051] to [0052] of Japanese Patent Application Laid-Open No. Hei 11-5851, may be used as the cellulose acylate.

[Physical Properties of Hardcoat Layer]

The refractive index of the hardcoat layer in the present invention is preferably 1.48 to 1.65. The refractive index is more preferably 1.48 to 1.60, and most preferably 1.48 to 1.55. A refractive index in the above-mentioned range is preferred, because interference unevenness with the support may be suppressed and when a low refractive index layer is laminated, the reflection hue may be made neutral.

The film thickness of the hardcoat layer is preferably 1 μm or more, more preferably 3 μm to 20 μm, still more preferably 5 μm to 15 μm, and most preferably 6 μm to 15 μm. Within the above-mentioned range, both physical strength and antistatic properties may be satisfied.

Further, the strength of the hardcoat layer is preferably H or more, more preferably 2H or more and most preferably 3H or more in a pencil hardness test. In addition, it is preferred that the amount of abrasion of a test specimen after the test in a Taber test in accordance with JIS K5400 is as small as possible.

The transmittance of the hardcoat layer is preferably 80% or more, more preferably 85% or more and most preferably 90% or more.

[Physical Properties of Low Refractive Index Layer]

The refractive index of the low refractive index layer is preferably 1.30 to 1.51. The refractive index is preferably 1.30 to 1.46, and more preferably 1.32 to 1.38.

The thickness of the low refractive index layer is preferably 50 nm to 200 nm, and more preferably 70 nm to 110 nm. The haze of the low refractive index layer is preferably 3% or less, more preferably 2% or less, and most preferably 1% or less. The specific strength of the low refractive index layer is preferably H or more, more preferably 2H or more, and most preferably 3H or more in a pencil hardness test under a load of 500 g.

Further, in order to improve the antifouling performance of the film, the contact angle of the surface with water is preferably 90° or more. The contact angle is more preferably 95° or more and particularly preferably 100° or more.

[Physical Properties of Antistatic Antireflection Film]

The common logarithmic value (Log SR) of the surface resistivity SR(Ω/sq) of the antistatic antireflection film of an exemplarly embodiment in the present invention is preferably lower from the viewpoint of antistatic properties and, in an environment at 25° C. and 60%, preferably 12 or less, more preferably 5 to 11, and still more preferably 6 to 10. It is possible to impart an excellent dust-proof performance by setting the surface resistivity to the above-mentioned range.

[Method for Manufacturing Antistatic Antireflection Film]

The antistatic antireflection film of an exemplarly embodiment in the present invention may be formed by the following method, but the present invention is not limited to the method.

First, a composition for a hardcoat layer is prepared. Next, the composition is coated on a transparent support by a dip coating method, an air knife coating method, a curtain coating method, a roller coating method, a wire bar coating method, a gravure coating method, a die coating method or the like, and then heated/dried. A microgravure coating method, a wire bar coating method and a die coating method (see U.S. Pat. No. 2,681,294 and Japanese Patent Application Laid-Open No. 2006-122889) are more preferred, and a die coating method is particularly preferred.

After coating, the layer formed of the composition for a hardcoat layer may be cured by drying and irradiation with light, and thereby forming a hardcoat layer. If necessary, other layers (antiglare layer and the like) may be coated in advance on the transparent support and provided, and the hardcoat layer may be formed thereon.

[Protective Film for Polarizing Plate]

When the antistatic antireflection film of an exemplarly embodiment in the present invention is used as a surface protective film of a polarizing film (protective film for a polarizing plate), it is possible to improve the adhesion to the polarizing film composed of polyvinyl alcohol as a main component by performing a so-called saponification treatment which hydrophilizes the surface of the transparent support on a side opposite to the side having the thin-film layer, that is, the surface on the side to be laminated with the polarizing film. It is also preferred that out of two protective films of the polarizer, the film other than the antistatic antireflection film is an optically-compensatory film having an optically-compensatory layer including an optically anisotropic layer. The optically-compensatory film (retardation film) may improve the viewing angle characteristics of a liquid crystal display screen. A known optically-compensatory film may be used but in terms of enlarging a viewing angle, the optically-compensatory film described in Japanese Patent Application Laid-Open No. 2001-100042 is preferred.

The above-described saponification treatment will be described. The saponification treatment is a treatment of immersing the optical film in an aqueous alkali solution warmed for a certain time and washing the film with water, and then subjecting the film to acid washing for neutralization. The treatment conditions are not limited as long as the surface on the side laminated with the polarizing film of a transparent support is hydrophilized, and thus the concentration of a treatment agent, the temperature of a treatment agent solution and the treatment time are appropriately determined, but for the need to ensure the productivity, the treatment conditions are usually determined such that the treatment may be finished within 3 minutes. As general conditions, the alkali concentration is 3% by mass to 25% by mass, the treatment temperature is 30° C. to 70° C., and the treatment time is 15 seconds to 5 minutes. The alkali species used for the alkali treatment is appropriately sodium hydroxide or potassium hydroxide, the acid used for acid washing is appropriately sulfuric acid, and water used for water washing is appropriately ion-exchanged water or pure water.

When the antistatic antireflection film of an exemplary embodiment in the present invention is used as a surface protective film of a polarizing film (protective film for a polarizing plate), the cellulose acylate film is preferably a cellulose triacetate film.

[Polarizing Plate]

Next, the polarizing plate of the present invention will be described.

The polarizing plate of the present invention is a polarizing plate having a polarizing film and two protective films for protecting both surfaces of the polarizing film, in which at least one of the protective films is the optical antistatic antireflection film of the present invention.

The polarizing film includes an iodine-based polarizing film, a dye-based polarizing film using a dichroic dye, or a polyene-based polarizing film. The iodine-based polarizing film and the dye-based polarizing film may be generally manufactured by using a polyvinyl alcohol-based film.

A configuration, in which the cellulose acylate film of the antistatic antireflection film adheres to a polarizing film through an adhesive layer or the like composed of a polyvinyl alcohol, if necessary, and a protective film is also provided on the other side of the polarizing film, is preferred. On a surface of the other side opposite to the polarizing film of the protective film, an adhesive layer may be provided.

It is possible to manufacture a polarizing plate which has excellent physical strength, antistatic properties and durability by using the antistatic antireflection film of an exemplarly embodiment in the present invention as a protective film for a polarizing plate.

Further, the polarizing plate of an exemplary embodiment in the present invention may also have an optically compensatory function. In that case, it is preferred that the antistatic antireflection film is used for the formation of only one surface side of either front surface side or rear surface side out of two surface protective films and the surface protective film on the other surface side opposite to the side having the antistatic antireflection film of the polarizing plate is an optically-compensatory film.

It is possible to further improve the bright-room contrast and up/down and right/left viewing angle of a liquid crystal display device by manufacturing a polarizing plate in which the antistatic antireflection film of an exemplarly embodiment in the present invention is used for one protective film for a polarizing plate and an optically-compensatory film having optical anisotropy is used for the other protective film of the polarizing film.

[Image Display Device]

The image display device of an exemplary embodiment in the present invention has the antistatic antireflection film or polarizing plate of an exemplarly embodiment in the present invention on the outermost surface of a display.

The optical film and polarizing plate of an exemplarly embodiment in the present invention may be appropriately used for an image display device such as a liquid crystal display (LCD), a plasma display panel (PDP), an electroluminescence display (ELD) or a cathode ray tube (CRT) display device.

In particular, the optical film and polarizing plate may be advantageously used in an image display device such as a liquid crystal display device, and is more preferably used for the outermost surface layer on the backlight side of the liquid crystal cell in a transmissive/semi-transmissive liquid crystal display device.

In general, a liquid crystal display device has a liquid crystal cell and two polarizing plates disposed on both sides thereof, and the liquid crystal cell carries a liquid crystal between two electrode substrates. Further, one optically anisotropic layer may be disposed between the liquid crystal cell and one polarizing plate, or two optically anisotropic layers may be disposed between the liquid crystal cell and both polarizing plates.

The liquid crystal cell is preferably of a TN mode, a VA mode, an OCB mode, an IPS mode or an ECB mode.

EXAMPLES

Hereinafter, the present invention will be described in more detail with reference to Examples, but the scope of the present invention is not construed as being limited thereto. Further, unless otherwise specified, the "parts" and "%" are on a mass basis.

Example 1

Manufacture of Antistatic Antireflection Film

As described below, a coating liquid for forming a hardcoat layer was prepared, and a hardcoat layer and a low refractive index layer were formed on a transparent support to manufacture Film Sample Nos. 1 to 35.

((a) Synthesis of Compound Having Quaternary Ammonium Salt Group)

Synthesis was performed with an ion-conducting compound in the same manner as in Synthesis Example 1 of Japanese Patent No. 4600605 to synthesize AN-1 (a 30% ethanol solution).

(Preparation of Coating Solution for Hardcoat Layer)

Each component was added to give the composition of Coating liquid HC-1 for a hardcoat layer shown in the following Table 1, and the obtained composition was charged into a mixing tank and stirred, filtered through a polypropylene-made filter having a pore size of 0.4 nm to prepare Coating liquid HC-1 (solid concentration 50% by mass) for an antistatic hardcoat layer.

Each component was mixed as shown in the following Table 1 in the same manner as in the preparation of Coating liquid HC-1 for antistatic hardcoat layer, the mixture was dissolved in a solvent and adjusted so as to give the compositional ratio shown in Table 1, and Coating liquids HC-2 to HC-7 for antistatic hardcoat layer having a solid concentration of 50% by mass were prepared. In the Coating liquid HC-2 for antistatic hardcoat layer, a quaternary ammonium salt compound was not used. Further, in the Coating liquid HC-6 for antistatic hardcoat layer, a leveling agent was not used.

TABLE 1

| Composition name | Quaternary ammonium compound Kind | Quaternary ammonium compound Content | Polyfunctional monomer Kind | Polyfunctional monomer Content | Irg.184 Content | Leveling agent Kind | Leveling agent Content | Solvent Kind |
|---|---|---|---|---|---|---|---|---|
| HC-1 | AN-1 | 15% | A-TMMT | 82% | 3% | FP1 | 0.1% | MEK/Methyl acetate |
| HC-2 | — | — | A-TMMT | 97% | 3% | FP1 | 0.1% | MEK/ Methyl acetate |
| HC-3 | DQ100 | 15% | PET30 | 82% | 3% | FP1 | 0.1% | Ethanol |
| HC-4 | LAS1211 | 60% | A-TMMT | 38.5% | 1.5% | FP1 | 0.1% | MEK/ Methyl acetate |
| HC-5 | UV-AS-102 | 60% | A-TMMT | 38.5% | 1.5% | FP1 | 0.1% | MEK/ Methyl acetate |
| HC-6 | AN-1 | 15% | PET30 | 82% | 3% | — | — | MEK/ Methyl acetate |
| HC-7 | AN-1 | 15% | PET30 | 82% | 3% | FP2 | 0.1% | MEK/ Methyl acetate |

The compounds used are shown as follows.
MEK: Methyl ethyl ketone
AN-1: Compound AN-1 having the above-mentioned quaternary ammonium salt group
PET30: A mixture of pentaerythritol tetraacrylate and pentaerythritol triacrylate (manufactured by NIPPON KAYAKU Co., Ltd.)
Irg. 184: A photopolymerization initiator, Irgacure 184 (produced by Ciba•Japan Co., Ltd.)
A-TMMT: Pentaerythritol tetraacrylate (NK Ester, manufactured by Shin Nakamura Chemical Co., Ltd.)
DQ100: "Light Ester DQ-100A", a quaternary ammonium salt-based compound, a polyfunctional monomer and a photopolymerization initiator-containing hardcoat agent (manufactured by Kyoeisha Chemical Co., Ltd.)
LAS1211: "LIODURAS LAS-1211", a quaternary ammonium salt-based compound, a polyfunctional monomer and a photopolymerization initiator-containing hardcoat agent (manufactured by Toyo Ink Co., Ltd.)
UV-AS-102: "SHIKOH UV-AS-102", a quaternary ammonium salt-based compound, a polyfunctional monomer and a photopolymerization initiator-containing hardcoat agent (manufactured by Nippon Synthetic Chemical Industry Co., Ltd.)
FP1: A fluorine-containing leveling agent represented by the following formula

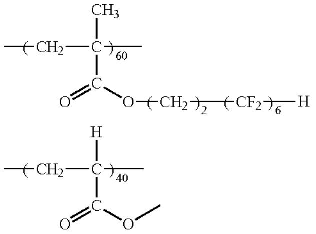

Mw: 25000
FP2: A fluorine-containing leveling agent represented by the following formula

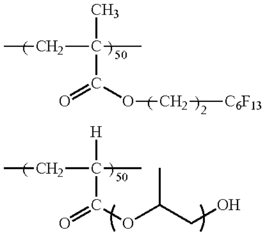

Mw: 25000

[Manufacture of Hardcoat Layer]

On a cellulose triacetate film (TDH60UF, manufactured by Fujifilm Corporation, refractive index 1.48) having a film thickness of 60 nm as a transparent support, Coating liquid HC-1 for the hardcoat layer was coated by using a gravure coater. The solution was dried at 60° C. for about 2 minutes, and then the coated layer was cured through irradiation with an ultraviolet ray at an illuminance of 400 $mW/cm^2$ and an irradiation dose of 150 $mJ/cm^2$ by using an air-cooled metal halide lamp (manufactured by Eye Graphics Co., Ltd.) of 160 W/cm while purging the system with nitrogen to give an atmosphere having an oxygen concentration of 1.0 vol % or less, thereby forming an antistatic hardcoat film HC-1 having a thickness of 12 μm.

Coating liquids HC-2 to HC-7 for antistatic hardcoat layer were used in the same manner to manufacture antistatic hardcoat layers HC-2 to HC-7.

(Preparation of Coating Liquid for Low Refractive Index Layer)

(Synthesis of Fluorine-Containing Polymer A (Methacryl-Modified Fluoropolymer) Having an Ethylenically Unsaturated Group)

First, a hydroxyl group-containing fluoropolymer was synthesized. A stainless steel-made autoclave equipped with an electromagnetic stirrer having an inner volume of 2.0 liters was thoroughly replaced with a nitrogen gas and then charged with 400 g of ethyl acetate, 53.2 g of perfluoro (propyl vinyl ether), 36.1 g of ethyl vinyl ether, 44.0 g of hydroxyethyl vinyl ether, 1.00 g of lauroyl peroxide, 6.0 g of an azo group-containing polydimethylsiloxane represented by the following Formula (107) (VPS1001 (trade name), manufactured by Wako Pure Chemical Industries, Ltd.), and 20.0 g of a nonionic reactive emulsifier (NE-30 (trade name), manufactured by ADEKA CORPORATION), and after cooling to −50° C. with dry ice-methanol, oxygen in the system is removed again by using a nitrogen gas.

(107)

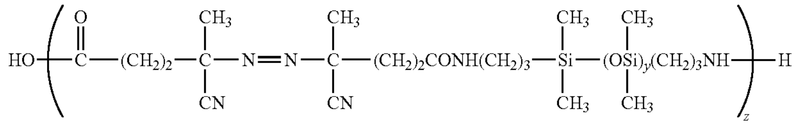

y represents a number of 1 to 200, and z represents a number 1 to 20.

Subsequently, 120.0 g of hexafluoropropylene was put, and temperature elevation was started. The pressure was $5.3\times10^5$ Pa at the time when the temperature in the autoclave reached 60° C. Thereafter, the reaction is allowed to continue under stirring at 70° C. for 20 hours, and at the time when the pressure was reduced to $1.7\times10^5$ Pa, the autoclave was cooled with water, thereby stopping the reaction. After reaching room temperature, the unreacted monomer was removed to open the autoclave, and a polymer solution having a solid concentration of 26.4% is obtained. The obtained polymer solution was introduced into methanol to precipitate the polymer, and then the polymer was washed with methanol and vacuum-dried at 50° C. to obtain 220 g of a hydroxyl group-containing fluoropolymer. This is regarded as a hydroxyl group-containing fluoropolymer. The monomers and solvent used are shown in Table 7.

TABLE 2

| | Injection amount (g) |
|---|---|
| Monomer | |
| Hexafluoropropylene | 120 |
| Perfluoro(propyl vinyl ether) | 53 |
| Ethyl vinyl ether | 36 |
| Hydroxyethyl vinyl ether | 44 |
| Lauroyl peroxide | 1 |
| VPS1001 | 6 |
| NE-30 | 20 |
| Solvent | |
| Ethyl acetate | 400 |

For the obtained hydroxyl group-containing fluoropolymer, the number average molecular weight in terms of polystyrene was measured by gel permeation chromatography. Further, from both the NMR analysis results of $^1$H-NMR and $^{13}$C-NMR and the elemental analysis results, the proportion of each monomer component constituting the hydroxyl group-containing fluoropolymer was determined. The results are shown in Table 3.

TABLE 3

| | | Composition ratio |
|---|---|---|
| Monomer | Hexafluoropropylene | 41 |
| | Perfluoro(propyl vinyl ether) | 10 |
| | Ethyl vinyl ether | 21 |
| | Hydroxyethyl vinyl ether | 24.8 |
| | NE-30 | 0.8 |
| Polydimethylsiloxane structure | | 2.4 |
| Number average molecular weight | | 34000 |

NE-30 is a nonionic reactive emulsifier in the following Formula (110), in which n is 9, m is 1, and u is 30.

(110)

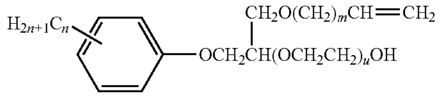

Next, an ethylenically unsaturated group-containing fluoropolymer A was synthesized by using the obtained hydroxyl group-containing fluoropolymer. A separable flask having a volume of 1 liter and equipped with an electronic stirrer, a glass-made cooling tube and a thermometer was charged with 50.0 g of the hydroxyl group-containing fluoropolymer obtained in Preparation Example 1, 0.01 g of 2,6-di-t-butyl methyl phenol as a polymerization inhibitor and 370 g of methyl isobutyl ketone (MIBK), and stiffing was performed at 20° C. until the hydroxyl group-containing fluoropolymer was dissolved in MIBK to prepare a transparent and uniform solution.

Subsequently, 15.1 g of 2-methacryloyloxyethyl isocyanate was added to the system and the mixture was stirred until the solution becomes homogenous, 0.1 g of dibutyltin dilaurate was added to start the reaction, and stirring was continued for 5 hours while keeping the temperature of the system at 55° C. to 65° C., thereby obtaining an MIBK solution of the fluorine-containing polymer A having an ethylenically unsaturated group.

2 g of the solution was weighed into an aluminum dish and then dried on a hot plate at 150° C. for 5 minutes, and the solid content was determined by weighing the residue and found to be 15.2% by mass. The compounds and solvent used and the solid content are shown in Table 4.

TABLE 4

| | Injection amount (g) |
|---|---|
| Hydroxyl group-containing fluoropolymer (a) | 50 |
| 2-methacryloyloxyethyl isocyanate (b) | 15.1 |
| 2,6-di-t-butyl methyl phenol | 0.01 |
| Dibutyltin dilaurate | 0.1 |
| Methyl isobutyl ketone | 370 |
| Injection amount of (b) to hydroxyl group content of (a) (molar ratio) | 1.1 |
| Solid content (% by mass) | 15.2 |

[Preparation of Particle Having Void in the Inside]

(Preparation of Dispersion Liquid B-1)

A silica fine particle having a void in the inside was manufactured by changing the conditions at the preparation from Preparation Example 4 of Japanese Patent Application Laid-Open No. 2002-79616. In the final step, the solvent may be replaced with methanol from the state of a dispersion liquid in water to make a 20% silica dispersion liquid, thereby obtaining a particle having an average particle size of 60 nm, a shell thickness of about 7 nm and a refractive index of silica particle of 1.25. The dispersion liquid is designated as Dispersion liquid (A-1).

20 parts of acryloyloxypropyltrimethoxysilane and 1.5 parts of diisopropoxyaluminum ethyl acetate were added to 500 parts of Dispersion liquid (A-1) and mixed, and then 9 parts of ion-exchanged water was added thereto. The reaction was allowed to proceed at 60° C. for 8 hours and after cooling the reaction solution to room temperature, acetylacetone was added in an amount of 1.8 parts. The solvent was replaced by distillation under reduced pressure while adding MEK to keep the total liquid amount almost constant. The replacement was adjusted to finally have a solid content of 20%, thereby preparing Dispersion liquid B-1.

(Preparation of Coating Liquid for Low Refractive Index Layer)

Each component was mixed as shown in the following Table 5, propylene glycol monomethyl ether acetate was added to account for 20% by mass in all solvents, and then the mixture was diluted with methyl ethyl ketone to finally have a solid content concentration of 5% by mass. The mixture was injected into a glass-made separable flask equipped with a stirrer, and after being stirred at room temperature for 1 hour, the reaction solution was filtered through a polypropylene-made depth filter having a pore size of 0.5 nm to obtain each coating liquid for a low refractive index layer. In addition, in Table 5, the amount of each component added is represented as "% by mass".

TABLE 5

| | | Low refractive index layer composition | | | | | | | | | | | | | |
|---|---|---|---|---|---|---|---|---|---|---|---|---|---|---|---|
| | | | | Fluoromonomer | | | | | | | | | | | |
| Sample No. | Hard-coat layer | Fluoro-polymer Kind | Fluoro-polymer Added amount | Kind | Added amount | Content of fluorine | Surface free energy of single film | Fluorine-free monomer Kind | Fluorine-free monomer Added amount | Inorganic fine particle Kind | Inorganic fine particle Added amount | Irg.127 Added amount | Silicone compound Kind | Silicone compound Added Amount | Remark |
| 1 | HC1 | A | 29% | F-1 | 25% | 46.2% | 27.9 | — | — | B-1 | 40% | 3% | SI-1/ SI-2/ SI-3 | 1.5%/ 0.5%/ 1% | Example |
| 2 | HC1 | A | 29% | F-2 | 25% | 44.4% | 21.6 | — | — | B-1 | 40% | 3% | SI-1/ SI-2/ SI-3 | 1.5%/ 0.5%/ 1% | Comparative example |
| 3 | HC2 | A | 29% | F-1 | 25% | 46.2% | 27.9 | — | — | B-1 | 40% | 3% | SI-1/ SI-2/ SI-3 | 1.5%/ 0.5%/ 1% | Comparative example |
| 4 | HC2 | A | 29% | F-2 | 25% | 44.4% | 21.6 | — | — | B-1 | 40% | 3% | SI-1/ SI-2/ SI-3 | 1.5%/ 0.5%/ 1% | Comparative example |
| 5 | HC1 | A | 29% | F-3 | 25% | 48.5% | 27.2 | — | — | B-1 | 40% | 3% | SI-1/ SI-2/ SI-3 | 1.5%/ 0.5%/ 1% | Comparative example |
| 6 | HC2 | A | 29% | F-2 | 25% | 44.4% | 21.6 | — | — | B-1/ B-2 | 35%/ 5% | 3% | SI-1/ SI-2/ SI-3 | 1.5%/ 0.5%/ 1% | Comparative example |
| 7 | HC2 | A | 29% | F-2 | 25% | 44.4% | 21.6 | — | — | B-1/ B-2 | 30%/ 10% | 3% | SI-1/ SI-2/ SI-3 | 1.5%/ 0.5%/ 1% | Comparative example |
| 8 | HC2 | A | 29% | F-2 | 25% | 44.4% | 21.6 | — | — | B-1/ B-3 | 35%/ 5% | 3% | SI-1/ SI-2/ SI-3 | 1.5%/ 0.5%/ 1% | Comparative example |
| 9 | HC1 | A | 29% | F-2 | 25% | 44.4% | 21.6 | — | — | B-1/ B-3 | 35%/ 5% | 3% | SI-1/ SI-2/ SI-3 | 1.5%/ 0.5%/ 1% | Comparative example |
| 10 | HC1 | A | 29% | F-1 | 25% | 46.2% | 27.9 | — | — | B-1/ B-3 | 35%/ 5% | 3% | SI-1/ SI-2/ SI-3 | 1.5%/ 0.5%/ 1% | Example |
| 11 | HC1 | A | 29% | F-1 | 25% | 46.2% | 27.9 | — | — | B-1/ B-4 | 35%/ 5% | 3% | SI-1/ SI-2/ SI-3 | 1.5%/ 0.5%/ 1% | Example |
| 12 | HC1 | A | 29% | F-1 | 25% | 46.2% | 27.9 | — | — | B-1/ B-3 | 25%/ 15% | 3% | SI-1/ SI-2/ SI-3 | 1.5%/ 0.5%/ 1% | Example |
| 13 | HC1 | A | 29% | F-1 | 25% | 46.2% | 27.9 | — | — | B-1/ B-3 | 35%/ 5% | 3% | SI-1 | 3% | Example |
| 14 | HC1 | A | 29% | F-1 | 25% | 46.2% | 27.9 | — | — | B-1/ B-3 | 35%/ 5% | 3% | SI-2 | 3% | Example |
| 15 | HC1 | A | 24% | F-1 | 25% | 46.2% | 27.9 | DPHA | 5% | B-1/ B-3 | 35%/ 5% | 3% | SI-1/ SI-2/ SI-3 | 1.5%/ 0.5%/ 1% | Example |
| 16 | HC1 | A | 24% | F-1 | 25% | 46.2% | 27.9 | PET-30 | 5% | B-1/ B-3 | 35%/ 5% | 3% | SI-1/ SI-2/ SI-3 | 1.5%/ 0.5%/ 1% | Example |
| 17 | HC1 | A | 24% | F-1 | 25% | 46.2% | 27.9 | ATMMT | 5% | B-1/ B-3 | 35%/ 5% | 3% | SI-1/ SI-2/ SI-3 | 1.5%/ 0.5%/ 1% | Example |

TABLE 5-continued

| | Low refractive index layer composition | | | | | | | | | | | | | | |
|---|---|---|---|---|---|---|---|---|---|---|---|---|---|---|---|
| | | | | Fluoromonomer | | | | | | | | | | | |
| Sample No. | Hard-coat layer | Fluoro-polymer Kind | Fluoro-polymer Added amount | Kind | Added amount | Content of fluorine | Surface free energy of single film | Fluorine-free monomer Kind | Fluorine-free monomer Added amount | Inorganic fine particle Kind | Inorganic fine particle Added amount | Irg.127 Added amount | Silicone compound Kind | Silicone compound Added Amount | Remark |
| 18 | HC1 | A | 19% | F-1 | 25% | 46.2% | 27.9 | ATMMT | 10% | B-1/ B-3 | 35%/ 5% | 3% | SI-1/ SI-2/ SI-3 | 1.5%/ 0.5%/ 1% | Example |
| 19 | HC1 | A | 24% | F-4 | 25% | 44.9% | 28.7 | ATMMT | 5% | B-1/ B-3 | 35%/ 5% | 3% | SI-1/ SI-2/ SI-3 | 1.5%/ 0.5%/ 1% | Example |
| 20 | HC1 | A | 24% | F-5 | 25% | 47.8% | 25.3 | ATMMT | 5% | B-1/ B-3 | 35%/ 5% | 3% | SI-1/ SI-2/ SI-3 | 1.5%/ 0.5%/ 1% | Example |
| 21 | HC1 | A | 24% | F-6 | 25% | 58.1%~ 59.3% | 18.9 | ATMMT | 5% | B-1/ B-3 | 35%/ 5% | 3% | SI-1/ SI-2/ SI-3 | 1.5%/ 0.5%/ 1% | Com-parative example |
| 22 | HC1 | A | 24% | F-7 | 25% | 33.9% | 22.8 | ATMMT | 5% | B-1/ B-3 | 35%/ 5% | 3% | SI-1/ SI-2/ SI-3 | 1.5%/ 0.5%/ 1% | Com-parative example |
| 23 | HC1 | A | 24% | F-4/ F-2 | 20%/ 5% | 44.9%/ 44.4% | 28.7/21.6 | ATMMT | 5% | B-1/ B-3 | 35%/ 5% | 3% | SI-1/ SI-2/ SI-3 | 1.5%/ 0.5%/ 1% | Example |
| 24 | HC3 | A | 24% | F-4/ F-2 | 20%/ 5% | 44.9%/ 44.4% | 28.7/21.6 | ATMMT | 5% | B-1/ B-3 | 35%/ 5% | 3% | SI-1/ SI-2/ SI-3 | 1.5%/ 0.5%/ 1% | Example |
| 25 | HC4 | A | 24% | F-4/ F-2 | 20%/ 5% | 44.9%/ 44.4% | 28.7/21.6 | ATMMT | 5% | B-1/ B-3 | 35%/ 5% | 3% | SI-1/ SI-2/ SI-3 | 1.5%/ 0.5%/ 1% | Example |
| 26 | HC5 | A | 24% | F-4/ F-2 | 20%/ 5% | 44.9%/ 44.4% | 28.7/21.6 | ATMMT | 5% | B-1/ B-3 | 35%/ 5% | 3% | SI-1/ SI-2/ SI-3 | 1.5%/ 0.5%/ 1% | Example |
| 27 | HC6 | A | 24% | F-4/ F-2 | 20%/ 5% | 44.9%/ 44.4% | 28.7/21.6 | ATMMT | 5% | B-1/ B-3 | 35%/ 5% | 3% | SI-1/ SI-2/ SI-3 | 1.5%/ 0.5%/ 1% | Example |
| 28 | HC7 | A | 24% | F-4/ F-2 | 20%/ 5% | 44.9%/ 44.4% | 28.7/21.6 | ATMMT | 5% | B-1/ B-3 | 35%/ 5% | 3% | SI-1/ SI-2/ SI-3 | 1.5%/ 0.5%/ 1% | Example |
| 29 | HC1 | A | 24% | F-1 | 25% | 46.2% | 27.9 | ATMMT | 5% | B-1 | 40% | 3% | SI-1/ SI-2/ SI-3 | 1.5%/ 0.5%/ 1% | Example |
| 30 | HC1 | A | 29% | F-1 | 25% | 46.2% | 27.9 | — | — | B-1 | 40% | 3% | SI-1 | 3% | Example |
| 31 | HC1 | A | 24% | F-8 | 25% | 16.3% | 39.5 | ATMMT | 5% | B-1/ B-3 | 35%/ 5% | 3% | SI-1/ SI-2/ SI-3 | 1.5%/ 0.5%/ 1% | Com-parative example |
| 32 | HC1 | A | 15% | F-4/ F-2 | 25%/ 9% | 44.9%/ 44.4% | 28.7/21.6 | ATMMT | 5% | B-1/ B-3 | 35%/ 5% | 3% | SI-1/ SI-2/ SI-3 | 1.5%/ 0.5%/ 1% | Example |
| 33 | HC1 | A | 24% | F-9 | 25% | 47.5% | 27.7 | ATMMT | 5% | B-1/ B-3 | 35%/ 5% | 3% | SI-1/ SI-2/ SI-3 | 1.5%/ 0.5%/ 1% | Example |
| 34 | HC1 | A | 24% | F-10 | 25% | 48.4% | 27.4 | ATMMT | 5% | B-1/ B-3 | 35%/ 5% | 3% | SI-1/ SI-2/ SI-3 | 1.5%/ 0.5%/ 1% | Example |
| 35 | HC1 | A | 24% | F-11 | 25% | 46.3% | 25.8 | ATMMT | 5% | B-1/ B-3 | 35%/ 5% | 3% | SI-1/ SI-2/ SI-3 | 1.5%/ 0.5%/ 1% | Example |

The surface free energy of a single film of the fluoromonomer shown in Table 5 was calculated by manufacturing a sample of the single film of the fluorine-containing polyfunctional monomer on a cellulose triacetate film (TDH60UF, produced by Fujifilm Corp., refractive index 1.48) according to the above-described method, controlling moisture at 25° C. and 50% RH for 2 hours, and then measuring a contact angle of water and methylene iodide.

Hereinafter, the compounds used will be described.

B-2: MEK-ST, manufactured by Nissan Chemicals Industries, Ltd., colloidal silica (average particle size about 15 nm)

B-3: MEK-ST-L, manufactured by Nissan Chemicals Industries, Ltd., colloidal silica (average particle size about 50 nm)

B-4: MEK-ST-ZL, manufactured by Nissan Chemicals Industries, Ltd., colloidal silica (average particle size about 85 nm)

SI-1: Rad2600, silicone-modified acrylate manufactured by EVONIK Corporation, number average molecular weight: 16,000

SI-2: Rad 2500, silicone-modified acrylate manufactured by EVONIK Corporation, number average molecular weight: 1,500

SI-3: Silaplane FM-0725, silicone compound represented by the following Formula (24), manufactured by Chisso Corp., number average molecular weight: 10,000

(24)

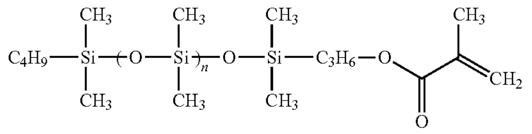

In Formula (24), n is an integer, in which the compound has a number average molecular weight of 10,000.

F-1: the following compound (X-22 as described above)

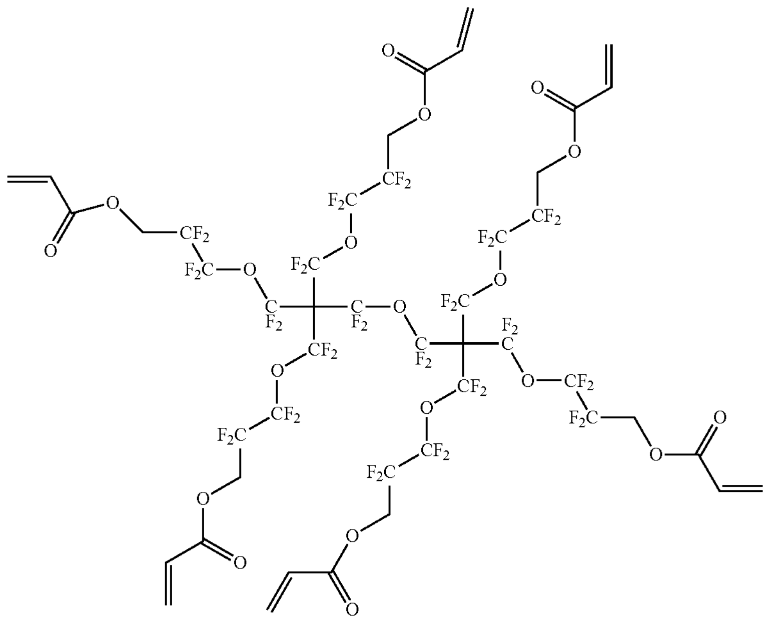 [SMILES: C=CC(=O)OCC(F)(F)C(F)(F)OC(F)(F)C(C(F)(F)OC(F)(F)C(F)(F)COC(=O)C=C)(C(F)(F)OC(F)(F)C(F)(F)COC(=O)C=C)C(F)(F)OC(F)(F)C(C(F)(F)OC(F)(F)C(F)(F)COC(=O)C=C)(C(F)(F)OC(F)(F)C(F)(F)COC(=O)C=C)C(F)(F)OC(F)(F)C(F)(F)COC(=O)C=C]

F-2: Triacryloylheptadecafluorononenyl pentaerythritol (the following structure)(LINC3A, manufactured by Kyoeisha Chemical Co., Ltd. (containing 35% by mass of pentaerythritol tetraacrylate))

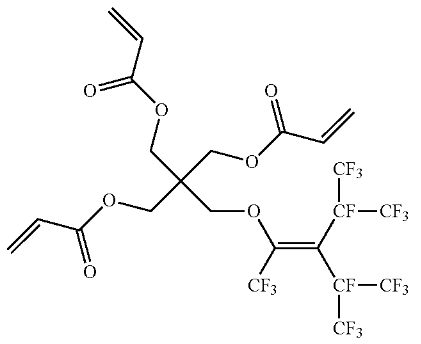

F-3: the following compound $CH_2{=}CHCOO{-}CH_2(CF_2)_6CH_2{-}OCOCH{=}CH_2$

F-4: the following compound (X-31 as described above)

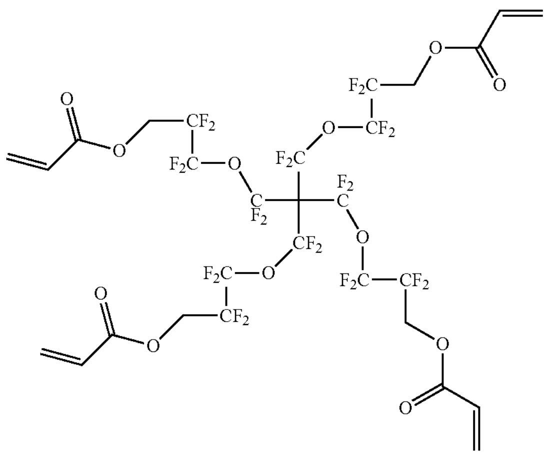 [SMILES: C=CC(=O)OCC(F)(F)C(F)(F)OC(F)(F)C(C(F)(F)OC(F)(F)C(F)(F)COC(=O)C=C)(C(F)(F)OC(F)(F)C(F)(F)COC(=O)C=C)C(F)(F)OC(F)(F)C(F)(F)COC(=O)C=C]

F-5: the following compound (M-12 as described above)

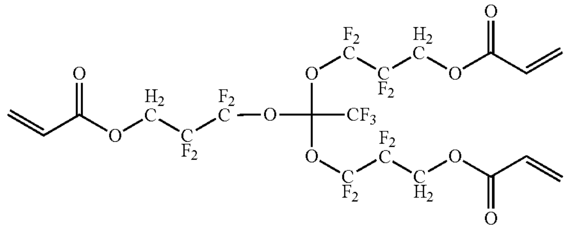 [SMILES: C=CC(=O)OCC(F)(F)C(F)(F)OC(OC(F)(F)C(F)(F)COC(=O)C=C)(OC(F)(F)C(F)(F)COC(=O)C=C)C(F)(F)F]

F-6: HFPO—CONH—C—$(CH_2OCOCH{=}CH_2)_2H$ (here, "HFPO—" is a HFPO—, in which an average value of p is 6 to 7 in $F(CF(CF_3)CF_2O)_pCF(CF_3)$—)

F-7: LINC5A (the following structure) (manufactured by Kyoeisha Chemical Co., Ltd., a mixture with dipentaerythritol hexaacrylate)

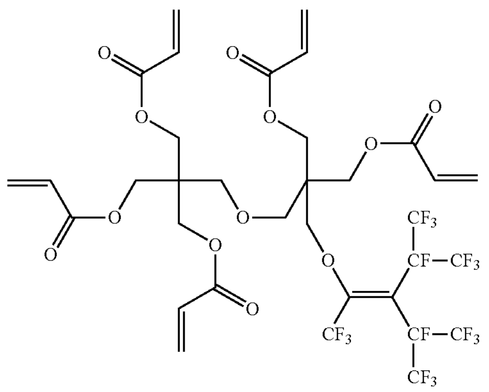

F-8: the following compound

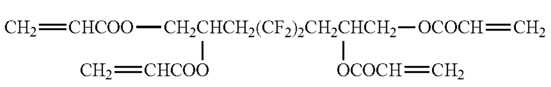

F-9: the following compound (FM-6 as described above)

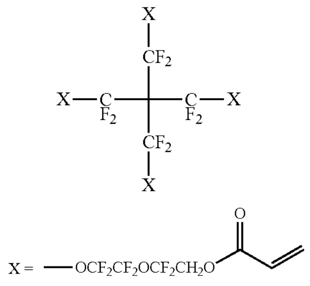

F-10: the following compound (FM-12 as described above)

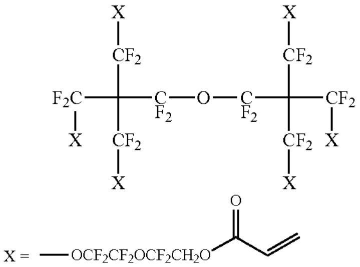

F-11: the following compound (MA14 as described above)

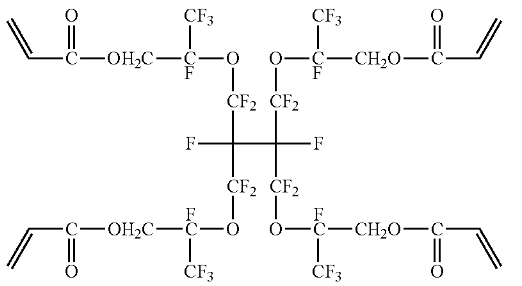

DPHA: a mixture of dipentaerythritol pentaacrylate and dipentaerythritol hexaacrylate (manufactured by NIPPON KAYAKU Co., Ltd.)

A-TMMT: pentaerythritol tetraacrylate (Shin Nakamura Chemical Co., Ltd. NK Ester)

PET30: a mixture of pentaerythritol tetraacrylate and pentaerythritol triacrylate (manufactured by NIPPON KAYAKU Co., Ltd.)

IRGACURE 127: a compound represented by the following Formula (16), manufactured by Chiba Specialty Chemicals Corporation (16)

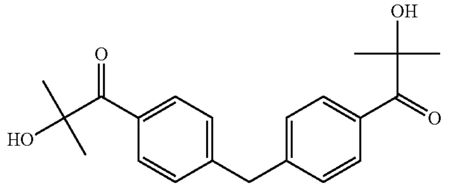

[Manufacture of Low Refractive Index Layer]

Composition Ln-1 for forming a low refractive index layer was coated using a gravure coater on the hardcoat film sample HCl manufactured to obtain Antireflection film sample No. 1. The drying conditions were 60° C. and 60 seconds, and the ultraviolet ray curing conditions were such that an air-cooled metal halide lamp (manufactured by Eye Graphics Co., Ltd.) was used at an illuminance of 600 $mW/cm^2$ and an irradiation dose of 300 $mJ/cm^2$ while purging the system with nitrogen to give an atmosphere having an oxygen concentration of 0.1% by volume or less. The film thickness of the low refractive index layer is set to 95 nm Each of Antireflection film sample Nos. 2 to 35 is obtained in the same manner as in Antireflection film No. 1, except that combinations shown in the Table are used as the hardcoat film samples and the compositions for forming a low refractive index layer.

(Saponification Treatment of Antireflection Film)

All the antireflection films manufactured are subjected to the following treatment. A 1.5 mol/l sodium hydroxide aqueous solution was prepared and kept at 55° C. A 0.01 mol/l dilute sulfuric acid aqueous solution was prepared and kept at 35° C. The manufactured optical film was immersed in the above-mentioned sodium hydroxide aqueous solution for 2 minutes and then immersed in water, thereby sufficiently washing away the sodium hydroxide aqueous solution. Subsequently, the sample was immersed in the above-mentioned dilute sulfuric acid aqueous solution for 1 minute and then immersed in water, thereby sufficiently washing away the dilute sulfuric acid aqueous solution. Finally, the sample was sufficiently dried at 120° C. In this manner, a saponified antireflection film was manufactured.

(Evaluation of Antireflection Film)

All the characteristics of the antireflection film thoroughly subjected to saponification treatment were evaluated by the following methods. The results are shown in Table 6.

(1) Reflectance

An oily black ink was painted on the rear surface of the antireflection film, and Adapter ARV-474 was mounted to Spectrophotometer V-550 (manufactured by JASCO Corp.) to measure the specular reflectance for the outgoing angle of 5° at an incident angle of 5° in the wavelength region of 380 nm to 780 nm. The average reflectance of 450 nm to 650 nm was calculated (described as “reflectance” in Table 6), and the antireflection properties were evaluated. The smaller the average reflectance is, the better the antireflection properties are.

The average reflectance is preferably 1.4% or less.

(2) SW (Steel Wool) Scratch Resistance Test

A rubbing test was carried out under the following conditions by using a rubbing tester, thereby giving an index for scratch resistance.

Evaluation environmental conditions: 25° C., 60% RH

Rubbing material: steel wool (manufactured by Nippon Steel Wool Co., Ltd., Grade No. 0000)

A film was wound on a rubbing point portion (1 cm×1 cm) of a tester bringing into contact with a sample, and fixed with a band.

Moving distance (one way): 13 cm,

Rubbing speed: 13 cm/sec,

Load: 500 g/cm$^2$,

Point portion contact area: 1 cm×1 cm, rubbing number: 10 reciprocations.

An oily black ink was painted on the rear surface of the rubbed sample, and scratch on the rubbed portion was visually observed under a reflected light, and evaluation was performed according to the following criteria. The sample was evaluated into five steps by repeating the test three times and taking an average.

AA: Scratch is not seen at all even if observed very carefully.

A: Scratch is slightly seen if observed very carefully.

AB: Weak scratch is seen.

B: medium scratch is seen.

C: There is a scratch which may be found by only one glance (3) Eraser Abrasion Resistance Test An antireflection film was fixed on a glass surface in which the rear surface was painted with an oily black ink with an adhesive, an eraser MONO (trade name, manufactured by Tombow Pencil Co., Ltd.) cut out into a diameter of 8 mm and a thickness of 4 mm was used as a head for a rubbing tester to vertically press under a load of 500 g/cm$^2$ on the surface of the antireflection film, the sample was rubbed with a reciprocation of 100 times at a stroke strength of 3.5 cm and a rubbing speed of 1.8 cm/s under the conditions of 25° C. and 60% RH, then the eraser attached thereto was removed, and then the rubbed portion of the sample was visually confirmed and the degree of flows on the surface was evaluated. The sample was evaluated into four steps by repeating the test three times and taking an average.

AA: Scratch is not visually recognized.

A: Scratch is slightly seen.

B: Scratch is certainly seen.

C: Strong scratch is seen on the entire surface after rubbing.

(4) Measurement of Surface Resistance Value

The sample was allowed to stand under the conditions of 20° C. and 15% RH for 2 hours and then measured by using a superinsulation resistance/microammeter TR8601 (manufactured by Advantest Corp.), and the surface resistance value was shown by the common logarithm (log SR) thereof. A lower log SR indicates better antistatic properties, and in the present invention, the value is preferably less than 11.0.

(5) White Turbidity

An A4 sized sample was prepared by painting an oily black ink on the rear surface of the sample to suppress light reflection on the rear surface thereof. The sample was evaluated according to the following criteria by blocking all the light and visually observing the sample under the solar light source in a room all surrounded by black.

A: The film surface is not found to be white turbid even if observed very carefully.

AB: The film surface is found to be slightly white turbid if observed very carefully, but the white turbidity is not unpleasant.

B: The film surface is white turbide and thus the white turbidity is unpleasant.

C: The film surface may be found to be white turbid by only one glance, and thus the white turbidity is too unpleasant.

(6) White Stain

An A4 sized sample was prepared by painting an oily black ink on the rear surface of the sample to suppress light reflection on the rear surface thereof. Some portions of the sample was wiped with a cotton cloth, and then the sample was evaluated according to the following criteria by blocking all the light and visually observing the sample under the solar light source in a room all surrounded by black.

A: No wiped trace is found even if observed very carefully.

B: It is very slightly seen that the white tint has disappeared on the wiped portion.

C: It is certainly seen that the white tint has disappeared on the wiped portion.

(7) Evaluation of Point Defect

A sample was prepared by painting an oily black ink on the rear surface of the sample to suppress light reflection on the rear surface thereof. All the light was blocked in a room all surrounded by black, a sample surface was irradiated with an electric desk lamp (a diffusion sheet is attached to the fluorescent lamp portion to use the portion as a diffusion light) equipped with a three-wavelength fluorescent lamp (FL20SS•EX-N/18 (manufactured by Matsushita Electric Industrial Co., Ltd.)), and the number of point defects were counted by visually observing a sample having a size of 30 $m^2$.

(8) Test of Antifouling Properties

<Magic Wiping Durability>

The film was fixed on a glass surface with an adhesive, and three circles having a diameter of 5 mm were written on the film under the conditions of 25° C. and 60% with the tip (fine) of a black felt pen "McKee extra fine (trade name, manufactured by ZEBRA CO., LTD.)" and, 5 seconds later, the circles were wiped with a reciprocation of 5 times with BEMCOT (trade name, manufactured by Asahi Kasei Corporation) folded in ten sheets by applying a load to the degree that the BEMCOT bundles are depressed. The above-described writing and wiping were repeated under the above-mentioned conditions until the time when the trace of felt pen ink was eliminated by wiping, and antifouling properties were evaluated by the number of wiping.

The number until the trace is eliminated is preferably 5 times or more and more preferably 10 times or more, and still more preferably 11 times or more.

TABLE 6

| | Performance | | | | | | | | |
|---|---|---|---|---|---|---|---|---|---|
| Sample No. | Reflectance | SW scratch resistance | Eraser abrasion resistance | Surface resistance | White turbidity | White stain | Point defect (ea./$m^2$) | Antifouling properties | Remark |
| 1 | 1.02% | A | B | 9.7 | A | A | 0 | 11 times or more | Example |
| 2 | 1.11% | C | B | 9.7 | C | A | 0 | 8 times | Comparative Example |
| 3 | 1.02% | A | B | 14.8 | A | A | 0 | 11 times or more | Comparative Example |
| 4 | 1.11% | B | B | 14.8 | A | A | 0 | 8 times | Comparative Example |
| 5 | 0.99% | C | B | 9.7 | A | A | 0 | 10 times | Comparative Example |
| 6 | 1.20% | B | B | 14.8 | A | A | 0 | 8 times | Comparative Example |
| 7 | 1.31% | B | B | 14.8 | A | A | 0 | 8 times | Comparative Example |
| 8 | 1.20% | B | A | 14.8 | B | A | 0 | 8 times | Comparative Example |
| 9 | 1.20% | C | A | 9.7 | C | A | 0 | 8 times | Comparative Example |
| 10 | 1.11% | A | AA | 9.7 | A | A | 0 | 11 times or more | Example |
| 11 | 1.11% | A | AA | 9.7 | A | A | 0 | 11 times or more | Example |
| 12 | 1.39% | AB | AA | 9.7 | A | A | 0 | 11 times or more | Example |
| 13 | 1.11% | A | AA | 9.7 | B | B | 0 | 11 times or more | Example |
| 14 | 1.11% | B | AA | 9.7 | A | A | 0 | 5 times | Example |
| 15 | 1.15% | AA | AA | 9.7 | A | A | 0 | 11 times or more | Example |
| 16 | 1.15% | AA | AA | 9.7 | A | A | 0 | 11 times or more | Example |
| 17 | 1.15% | AA | AA | 9.7 | A | A | 0 | 11 times or more | Example |
| 18 | 1.19% | AA | AA | 9.7 | A | A | 0 | 11 times or more | Example |
| 19 | 1.12% | AA | AA | 9.7 | A | A | 0 | 11 times or more | Example |
| 20 | 1.09% | A | AA | 9.7 | A | A | 0 | 11 times or more | Example |
| 21 | 1.05% | C | B | 9.7 | C | A | 0 | 11 times or more | Comparative Example |
| 22 | 1.32% | C | A | 9.7 | C | A | 0 | 7 times | Comparative Example |
| 23 | 1.17% | AA | AA | 9.7 | A | A | 0 | 11 times or more | Example |
| 24 | 1.17% | AA | AA | 10.5 | A | A | 0 | 11 times or more | Example |
| 25 | 1.17% | AA | AA | 9.8 | A | A | 0 | 11 times or more | Example |
| 26 | 1.17% | AA | AA | 10.2 | A | A | 0 | 11 times or more | Example |
| 27 | 1.17% | AB | AA | 9.7 | A | A | 0 | 11 times or more | Example |
| 28 | 1.17% | AA | AA | 9.7 | A | A | 5 | 11 times or more | Example |
| 29 | 1.11% | AA | B | 9.7 | A | A | 0 | 11 times or more | Example |
| 30 | 1.06% | A | B | 9.7 | B | B | 0 | 11 times or more | Example |

TABLE 6-continued

| | Performance | | | | | | | | |
|---|---|---|---|---|---|---|---|---|---|
| Sample No. | Reflectance | SW scratch resistance | Eraser abrasion resistance | Surface resistance | White turbidity | White stain | Point defect (ea./$m^2$) | Antifouling properties | Remark |
| 31 | 1.55% | A | B | 9.7 | B | A | 0 | 11 times or more | Comparative Example |
| 32 | 1.19% | AA | AA | 9.7 | A | A | 0 | 11 times or more | Example |
| 33 | 1.12% | AA | AA | 9.7 | A | A | 0 | 11 times or more | Example |
| 34 | 1.11% | AA | AA | 9.7 | A | A | 0 | 11 times or more | Example |
| 35 | 1.12% | A | AA | 9.7 | AB | A | 0 | 11 times or more | Example |

Further, even in the optical film of any Example and even when a cellulose triacetate film (TDH80UF) having a film thickness of 80 nm or a cellulose triacetate film (T40UZ) having a film thickness of 40 μm (all manufactured by Fujifilm Corporation, refractive index 1.48) was used instead of a cellulose triacetate film having a film thickness of 60 μm as a transparent support, the same effects as those in Examples of the present invention could be obtained.

(Manufacture of Polarizing Plate)

A cellulose triacetate film having a thickness of 80 μm (TAC-TD80U, manufactured by Fujifilm Corporation), which had been immersed in an NaOH aqueous solution of 1.5 mol/L at 55° C. for 2 minutes, neutralized and then washed with water and an antireflection film having been subjected to saponification treatment, were adhered to both surfaces of a polarizer which had been prepared by adsorbing iodine onto polyvinyl alcohol and stretched, and thus, the surfaces is protected, thereby manufacturing a polarizing plate (Sample A).

(Manufacture of Circular Polarizing Plate)

A λ/4 plate was laminated on the surface of on a side opposite to the low refractive index layer of the polarizing plate sample A with an adhesive to manufacture a circular polarizing plate (Sample B), and Sample B was adhered to the surface of an organic EL display with an adhesive such that the low refractive index layer was arranged to face outward. In the case of a sample using the antireflection film of an exemplarly embodiment in the present invention, scratching or surface unevenness was not caused, dust was hardly attached, and thus a good display performance could be obtained.

Sample A was used as a polarizing plate on the surface of each of a reflective liquid crystal display and a semi-transmissive liquid crystal display by arranging the low refractive index layer to face outward, and as a result, in the case of a sample using the antireflection film of an exemplarly embodiment in the present invention, scratching or surface unevenness was not caused, dust was hardly attached, and a good display performance could be obtained.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An antistatic antireflection film, comprising, a support;

a hardcoat layer formed from a composition for a hardcoat layer containing at least a compound having a quaternary ammonium salt group; and a low refractive index layer formed from a composition for a low refractive index layer containing at least the following (a), (b), (c) and (d), in this order, wherein, (a) is an ethylenically unsaturated group-containing fluoropolymer, (b) is a fluorine-containing polyfunctional monomer having a surface free energy of 23 mN/m or more when a film is formed alone, four or less —$CF_3$ groups in a molecule, a fluorine content of 30% or more, and at least three reactive functional groups in one molecule, (c) is hollow silica fine particles having an average particle size of 10 nm to 100 nm, and (d) is a compound having a dimethylsiloxane structure, wherein the refractive index of the low refractive index layer is 1.30 to 1.51, wherein the compound having a quaternary ammonium salt group is a polymer having a quaternary ammonium having, as a polymerization unit, a compound having an alkylene oxide chain, and an alkyl (meth)acrylate, wherein the compound (d) having a dimethylsiloxane structure is at least two of a silicone compound (d-1) having a number average molecular weight of 4,000 or more and a silicone compound (d-2) having a number average molecular weight of 1,000 or more and less than 4,000, wherein the silicone compound (d-1) is a compound having a (meth)acryloyl group at a terminal thereof, a compound having (meth)acryloyl groups at both terminals thereof or a compound having a (meth)acryloyl group at a side chain of the siloxane structure, and wherein the silicone compound (d-2) has a siloxane structure and two or more (meth)acryloyl groups.

2. The antistatic antireflection film according to claim 1, wherein the composition for a low refractive index layer further comprises (e) solid silica particles having an average particle size of 40 nm to 100 nm in an amount of 0.1% by mass to 10% by mass, based on a total solid of the composition for a low refractive index layer.

3. The antistatic antireflection film according to claim 1, wherein the fluorine-containing polyfunctional monomer (b) is a compound represented by the following Formula (1):

Formula (1)

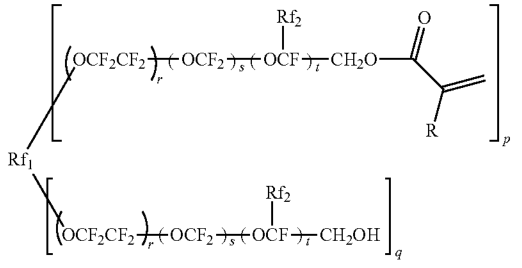

wherein, $Rf_1$ represents a (p+q) valent perfluoro saturated hydrocarbon group which may have an ether linkage, $Rf_2$ represents a monovalent chained or cyclic fluorinated hydrocarbon group which contains at least a carbon atom and a fluorine atom and may contain an oxygen atom or a hydrogen atom, p represents an integer of 3 to 10, q represents an integer of 0 to 7, and (p+q) represents an integer of 3 to 10, r represents an integer of 0 to 100, and each of s and t independently represents 0 or 1, and R represents a hydrogen atom, a methyl group or a fluorine atom, when (p+q) is 5 or more, t is 0, and an order of ($OCF_2CF_2$), ($OCF_2$) and ($OCFRf_2$) is not particularly limited.

4. The antistatic antireflection film according to claim 3, wherein in the Formula (1), r represents 1 to 5, s represents 0 or 1, t represents 0 or 1, p represents 3 to 6, and q represents 0.

5. The antistatic antireflection film according to claim 1, wherein the composition for a low refractive index layer further contains (f) a fluorine-free polyfunctional monomer having at least three or more reactive functional groups in one molecule.

6. The antistatic antireflection film according to claim 1, wherein the composition for a hardcoat layer contains a fluoroaliphatic group-containing copolymer having a repeating unit derived from a monomer containing a fluoroaliphatic group represented by the following Formula (F1) and a repeating unit derived from a monomer which does not contain a fluoroaliphatic group represented by the following Formula (F2):

Formula (F1)

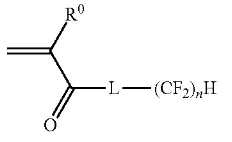

wherein, $R^0$ represents a hydrogen atom, a halogen atom or a methyl group,

L represents a divalent linking group, and n represents an integer of 1 to 18:

Formula (F2)

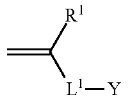

wherein, $R^1$ represents a hydrogen atom, a halogen atom or a methyl group, $L_1$ represents a divalent linking group, Y represents a straight-chained, branched or cyclic alkyl group having of 1 to 20 carbon atoms, which may be substituted, or an aromatic group which may be substituted.

7. A polarizing plate comprising the antistatic antireflection film according to claim 1 as a protective film for a polarizing plate.

8. An image display device comprising the polarizing plate according to claim 7.

9. An image display device comprising the antistatic antireflection film according to claim 1.

10. The antistatic antireflection film according to claim 1, wherein a content of the polymer having a quaternary ammonium is 1% by mass to 30% by mass, based on a total solid amount in the composition for a hardcoat layer.

11. The antistatic antireflection film according to claim 1, wherein the silicone compound (d-1) has a number average molecular weight of 9,000 or more.

12. A method for manufacturing an antistatic antireflection film comprising, a support, a hardcoat layer containing a compound having a quaternary ammonium salt group, and a low refractive index layer, in this order, the method comprising:

coating and curing a composition for a low refractive index layer containing at least the following (a), (b), (c) and (d), wherein, (a) is an ethylenically unsaturated group-containing fluoropolymer, (b) is a fluorine-containing polyfunctional monomer having a surface free energy of 23 mN/m or more when a film is formed alone, four or less $-CF_3$ groups in a molecule, a fluorine content of 30% or more, and at least three reactive functional groups in one molecule, (c) is hollow silica fine particles having an average particle size of 10 nm to 100 nm, and (d) is a compound having a dimethylsiloxane structure, wherein the refractive index of the low refractive index layer is 1.30 to 1.51, wherein the compound having a quaternary ammonium salt group is a polymer having a quaternary ammonium having, as a polymerization unit, a compound having an alkylene oxide chain, and an alkyl (meth)acrylate, wherein the compound (d) having a dimethylsiloxane structure is at least two of a silicone compound (d-1) having a number average molecular weight of 4,000 or more and a silicone compound (d-2) having a number average molecular weight of 1,000 or more and less than 4,000, wherein the silicone compound (d-1) is a compound having a (meth)acryloyl group at a terminal thereof, a compound having (meth)acryloyl groups at both terminals thereof or a compound having a (meth)acryloyl group at a side chain of the siloxane structure, and wherein the silicone compound (d-2) has a siloxane structure and two or more (meth)acryloyl groups.

13. The method for manufacturing an antistatic antireflection film according to claim 12, wherein the composition for a low refractive index layer further comprises (e) solid silica particles having an average particle size of 40 nm to 100 nm in an amount of 0.1% by mass to 10% by mass, based on a total solid of the composition for a low refractive index layer.

14. The method for manufacturing an antistatic antireflection film according to claim 12, wherein the fluorine-containing polyfunctional monomer (b) is a compound represented by the following Formula (1):

Formula (1)

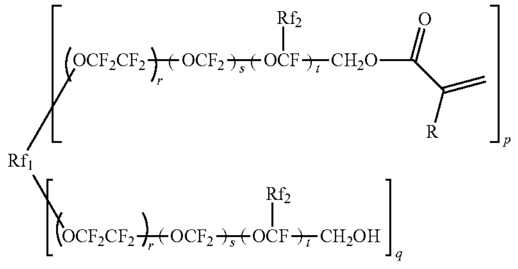

wherein, $Rf_1$ represents a (p+q) valent perfluoro saturated hydrocarbon group which may have an ether linkage, $Rf_2$ represents a monovalent chained or cyclic fluorinated hydrocarbon group which contains at least a carbon atom and a fluorine atom and may contain an oxygen atom or a hydrogen atom, p represents an integer of 3 to 10, q represents an integer of 0 to 7, and (p+q) represents an integer of 3 to 10, r represents an integer of 0 to 100, and each of s and t independently represents 0 or 1, and R represents a hydrogen atom, a methyl group or a fluorine atom, when (p+q) is 5 or more, t is 0, and an order of $(OCF_2CF_2)$, $(OCF_2)$ and $(OCFRf_2)$ is not particularly limited.

15. The method for manufacturing an antistatic antireflection film according to claim 14, wherein in the Formula (1), r represents 1 to 5, s represents 0 or 1, t represents 0 or 1, p represents 3 to 6, and q represents 0.

16. The method for manufacturing an antistatic antireflection film according to claim 12, wherein the composition for a low refractive index layer further contains (f) a fluorine-free polyfunctional monomer having at least three or more reactive functional groups in one molecule.

17. The method for manufacturing an antistatic antireflection film according to claim 12, wherein the composition for a hardcoat layer contains a fluoroaliphatic group-containing copolymer having a repeating unit derived from a monomer containing a fluoroaliphatic group represented by the following Formula (F1) and a repeating unit derived from a monomer which does not contain a fluoroaliphatic group represented by the following Formula (F2):

Formula (F1)

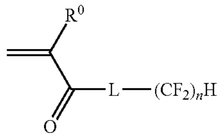

wherein, $R^0$ represents a hydrogen atom, a halogen atom or a methyl group,

L represents a divalent linking group, and n represents an integer of 1 to 18:

Formula (F2)

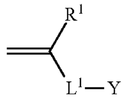

wherein, $R^1$ represents a hydrogen atom, a halogen atom or a methyl group, $L_1$ represents a divalent linking group, Y represents a straight-chained, branched or cyclic alkyl group having of 1 to 20 carbon atoms, which may be substituted, or an aromatic group which may be substituted.

* * * * *